(12) United States Patent
Hoffmann

(10) Patent No.: US 12,486,540 B2
(45) Date of Patent: Dec. 2, 2025

(54) POST-SURGICAL RISK STRATIFICATION BASED ON PDE4D VARIANT EXPRESSION, SELECTED ACCORDING TO TMPRSS2-ERG FUSION STATUS, AND POST-SURGICAL CLINICAL VARIABLES

(71) Applicant: KONINKLIJKE PHILIPS N.V., Eindhoven (NL)

(72) Inventor: Ralf Dieter Hoffmann, Brueggen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 149 days.

(21) Appl. No.: 17/041,534

(22) PCT Filed: Mar. 28, 2019

(86) PCT No.: PCT/EP2019/057829
§ 371 (c)(1),
(2) Date: Sep. 25, 2020

(87) PCT Pub. No.: WO2019/185773
PCT Pub. Date: Oct. 3, 2019

(65) Prior Publication Data
US 2021/0025010 A1 Jan. 28, 2021

(30) Foreign Application Priority Data
Mar. 29, 2018 (EP) .................... 18164842

(51) Int. Cl.
*C12Q 1/6886* (2018.01)
(52) U.S. Cl.
CPC ...... *C12Q 1/6886* (2013.01); *C12Q 2600/112* (2013.01); *C12Q 2600/118* (2013.01); *C12Q 2600/156* (2013.01); *C12Q 2600/158* (2013.01)
(58) Field of Classification Search
CPC ............ C12Q 1/6886; C12Q 2600/112; C12Q 2600/118; C12Q 2600/156; C12Q 2600/158
See application file for complete search history.

(56) References Cited

U.S. PATENT DOCUMENTS

2016/0024591 A1 1/2016 Xu
2017/0073778 A1* 3/2017 Hoffmann ............ C12Q 1/6886

FOREIGN PATENT DOCUMENTS

WO 2016193110 A1 12/2016

OTHER PUBLICATIONS

Cooperberg, J. Clin. Oncology, 2013, vol. 31, No. 11, pp. 1428-1434.*

International Search Report and Written Opinion of PCT/EP2019/057829, dated Jun. 21, 2019.
Bottcher, R et al "Human Phosphodiesterase 4D7 (PDE4D7) Expression is Increased in TMPRSS2-ERG-Positive Primary Prostate Cancer and Independently adds to a Reduced Risk of Post-Surgical Disease Progression", British Journal of Cancer, vol. 113, No. 10, Nov. 2016, pp. 1502-1511.
Geybels, Milan S. et al "Epigenomic Profiling of Prostate Cancer Identifies Differentially Methylated Genes in TMPRSS2:ERG Fusion-Positive Versus Fusion-Negative Tumors", Clinical Epigenetics, vol. 7, No. 1, 2015.
Alves De Inda, Marcia et al "Validation of Cyclic Adenosine Monophosphate Phosphodiesterase-4D7 for its Independent Contribution to Risk Stratification in a Prostate Cancer Patent Cohort with Longitudinal Biological Outcomes", European Urology Focus, Oct. 2016.
Wang, Zhu et al "Significance of the TMPRSS2:ERG Gene Fusion in Prostate Cancer", Molecular Medicine Reports, vol. 16, No. 4, 2017, pp. 5450-5458.
Punnen, Sanoj et al "Multi-Institutional validation of the CAPRA-S Score to predent Disease Recurrence and Mortaligy after radical prostatectomy", European Urology, vol. 65, No. 6, pp. 1171-1177, 2014.
Ferlay, Jacques et al., "Cancer Incidence and Mortality Worldwide: Sources, Methods and Major Patterns in Globocan", 2012, International Journal of Cancer, vol. 136, 2014.
Lughezzani, Giovanni et al, "Predictive and prognostic models in radical prostatectomy candidates: A critical analysis of the literature", European Urology, vol. 58, No. 5, pp. 687-700, 2010.
Merkle, Dennis et al., "Roles of cAMP and cAMP-dependent protein kinase in the progression of prostate cancer: Cross-talk with the androgen receptor", Cellular Signalling, vol. 23, No. 3, pp. 507-515, 2011.
Conti, Marco et al, "Biochemistry and physiology of cyclic nucleotide phosphodiesterases: essential components in cyclic nucleotide signaling", Annual Review of Biochemistry, vol. 76, pp. 481-511, 2007.
Cooperberg, Matthew R. et al., "The CAPRA-S score: A straightforward tool for improved prediction of outcomes after radical prostatectomy", Cancer, vol. 117, No. 22, pp. 5039-5046, 2011.

* cited by examiner

*Primary Examiner* — Sarae L Bausch

(57) ABSTRACT

The invention relates to a method of post-surgical risk stratification of a prostate cancer subject, comprising determining a transmembrane protease, serine 2-ETS-related gene (TMPRSS2-ERG) fusion status in a biological sample obtained from the subject, determining a gene expression profile for each of one or more phosphodiesterase 4D variants in a biological sample obtained from the subject, determining an expression based risk score for the subject based on the gene expression profile for a selected phosphodiesterase 4D variant, and determining a post-surgical prognostic risk score for the subject based on the expression based risk score and post-surgical clinical variables of the subject, wherein the selected phosphodiesterase 4D variant is selected depending on the TM-PRSS2-ERG fusion status. This may allow for an improved stratification of the subject in a post-surgical setting that may result in better post-surgical, secondary treatment decisions.

8 Claims, 12 Drawing Sheets

Specification includes a Sequence Listing.

SEQUENCE LISTING

```
<160> NUMBER OF SEQ ID NOS: 65

<210> SEQ ID NO 1
<211> LENGTH: 7979
<212> TYPE: DNA
<213> ORGANISM: Homo sapiens

<400> SEQUENCE: 1
cagcagcagg ctcagacctg cttccctgga catttccggg accgtgagcg agggaaccac      60
gttgccctgg attcttgcca gctgtacaaa gttgaccagg aaaatggctc agcagacaag     120
cccggacact taacagtac ctgaagtgga taatccgcat tgtccaaacc cgtggctgaa     180
cgaagacctt gtgaaatcct tgcgagaaaa cctgttgcag catgagaagt ccaagacagc     240
gaggaaatcg gtttctccca agctctctcc agtgatctct ccgagaaatt cccccaggct     300
tctgcgcaga atgcttctca gcagcaacat ccccaaacag cggcgtttca cggtggcaca     360
tacatgtttt gatgtggaca atggcacatc tgcgggacgg agtcccttgg atcccatgac     420
cagcccagga tccgggctaa ttctccaagc aaatttgtc cacagtcaac gacgggagtc     480
cttcctgtat cgatccgaca gcgattatga cctctctcca aagtctatgt cccggaactc     540
ctccattgcc agtgatatac acgagatga cttgattgtg actccatttg ctcaggtctt     600
```

```
ggccagtctg cgaactgtac gaaacaactt tgctgcatta actaatttgc aagatcgagc    660
acctagcaaa agatcaccca tgtgcaacca accatccatc aacaaagcca ccataacaga    720
ggaggcctac cagaaactgg ccagcgagac cctggaggag ctggactggt gtctggacca    780
gctagagacc ctacagacca ggcactccgt cagtgagatg gcctccaaca agtttaaaag    840
gatgcttaat cgggagctca cccatctctc tgaaatgagt cggtctggaa atcaagtgtc    900
agagtttata tcaaacacat tcttagataa gcaacatgaa gtggaaattc cttctccaac    960
tcagaaggaa aaggagaaaa agaaaagacc aatgtctcag atcagtggag tcaagaaatt   1020
gatgcacagc tctagtctga ctaattcaag tatcccaagg tttggagtta aaactgaaca   1080
agaagatgtc cttgccaagg aactagaaga tgtgaacaaa tggggtcttc atgttttcag   1140
aatagcagag ttgtctggta accggcccct gactgttatc atgcacacca tttttcagga   1200
acgggattta ttaaaaacat ttaaaattcc agtagatact ttaattacat atcttatgac   1260
tctcgaagac cattaccatg ctgatgtggc ctatcacaac aatatccatg ctgcagatgt   1320
tgtccagtct actcatgtgc tattatctac acctgctttg gaggctgtgt tacagatttt   1380
ggagattctt gcagcaattt ttgccagtgc aatacatgat gtagatcatc ctggtgtgtc   1440
caatcaattt ctgatcaata caaactctga acttgccttg atgtacaatg attcctcagt   1500
cttagagaac catcatttgg ctgtgggctt taaattgctt caggaagaaa actgtgacat   1560
tttccagaat ttgaccaaaa acaaagaca atctttaagg aaaatggtca ttgacatcgt   1620
acttgcaaca gatatgtcaa acacatgaa tctactggct gatttgaaga ctatggttga   1680
aactaagaaa gtgacaagct ctggagttct tcttcttgat aattattccg ataggattca   1740
ggttcttcag aatatggtgc actgtgcaga tctgagcaac ccaacaaagc ctctccagct   1800
gtaccgccag tggacggacc ggataatgga ggagttcttc cgccaaggag accgagagag   1860
ggaacgtggc atgagataa gccccatgtg tgacaagcac aatgcttccg tggaaaaatc   1920
acaggtgggc ttcatagact atattgttca tcccctctgg gagacatggg cagacctcgt   1980
ccaccctgac gcccaggata tttttggacac tttggaggac aatcgtgaat ggtaccagag   2040
cacaatccct cagagcccct ctcctgcacc tgatgaccca gaggagggcc ggcagggtca   2100
aactgagaaa ttccagtttg aactaacttt agaggaagat ggtgagtcag acacggaaaa   2160
ggacagtggc agtcaagtgg aagaagacac tagctgcagt gactccaaga ctctttgtac   2220
tcaagactca gagtctactg aaattcccct tgatgaacag gttgaagagg aggcagtagg   2280
ggaagaagag gaaagccagc ctgaagcctg tgtcatagat gatcgttctc ctgacacgta   2340
acagtgcaaa aactttcatg cctttttttt ttttaagtag aaaaattgtt tccaaagtgc   2400
atgtcacatg ccacaaccac ggtcacacct cactgtcatc tgccaggacg tttgttgaac   2460
aaaactgacc ttgactactc agtccagcgc tcaggaatat cgtaaccagt tttttcacct   2520
ccatgtcatc cgagcaaggt ggacatcttc acgaacagcg ttttaacaa gatttcagct   2580 tggtagagct gacaaagcag ataaaatcta ctccaaatta ttttcaagag agtgtgactc   2640
atcaggcagc ccaaaagttt attggacttg gggtttctat tcctttttat ttgtttgcaa   2700
tattttcaga agaaaggcat tgcacagagt gaacttaatg gacgaagcaa caaatatgtc   2760
aagaacagga catagcacga atctgttacc agtaggagga ggatgagcca cagaaattgc   2820
ataattttct aatttcaagt cttcctgata catgactgaa tagtgtggtt cagtgagctg   2880
cactgacctc tacattttgt atgatatgta aaacagattt tttgtagagc ttactttat   2940
```

```
tattaaatgt attgaggtat tatatttaaa aaaaactatg ttcagaactt catctgccac    3000
tggttatttt tttctaagga gtaacttgca agttttcagt acaaatctgt gctacactgg    3060
ataaaaatct aatttatgaa ttttacttgc accttatagt tcatagcaat taactgattt    3120
gtagtgattc attgtttgtt ttatatacca atgacttcca tattttaaaa gagaaaaaca    3180
actttatgtt gcaggaaacc cttttgtaa gtctttatta tttactttgc attttgtttc     3240
actctttcca gataagcaga gttgctcttc accagtgttt ttcttcatgt gcaaagtgac    3300
tatttgttct ataatacttt tatgtgtgtt atatcaaatg tgtcttaagc ttcatgcaaa    3360
ctcagtcatc agttcgtgtt gtctgaagca agtgggagat atataaatac ccagtagcta    3420
aaatggtcag tcttttttag atgttttcct acttagtatc tcctaataac gttttgctgt    3480
gtcactagat gttcatttca caagtgcatg tctttctaat aatccacaca tttcatgctc    3540
taataatcca cacatttcat gctcattttt attgttttta cagccagtta tagtaagaaa    3600 aaggttttc cccttgtgct gctttataat ttagcgtgtg tctgaacctt atccatgttt     3660
gctagatgag gtcttgtcaa atatatcact accattgtca ccggtgaaaa gaaacaggta    3720
gttaagttag ggttaacatt catttcaacc acgaggttgt atatcatgac tagcttttac    3780
tcttggttta cagagaaaag ttaaacagcc aactaggcag tttttaagaa tattaacaat    3840
atattaacaa acaccaatac aactaatcct atttggtttt aatgatttca ccatgggatt    3900
aagaactata tcaggaacat ccctgagaaa cggttttaag tgtagcaact actcttcctt    3960
aatggacagc cacataacgt gtaggaagtc ctttatcact tatcctcgat ccataagcat    4020
atcttgcaga ggggaactac ttcttttaaac acatggaggg aaagaagatg atgccactgg   4080
caccagaggg ttagtactgt gatgcatcct aaaatattta ttatattggt aaaaattctg    4140
gttaaataaa aaattagaga tcactcttgg ctgatttcag caccaggaac tgtattacag    4200
ttttagagat taattcctag tgtttacctg attatagcag ttggcatcat ggggcattta    4260
attctgactt tatccccacg tcagcctaa taaagtcttc tttaccttct ctatgaagac     4320
tttaaagccc aaataatcat ttttcacatt gatattcaag aattgagata gatagaagcc    4380
aaagtgggta tctgacaagt ggaaaatcaa acgtttaaga agaattacaa ctctgaaaag    4440
catttatatg tggaacttct caaggagcct cctggggact ggaaagtaag tcatcagcca    4500
ggcaaatgac tcatgctgaa gagagtcccc atttcagtcc cctgagatct agctgatgct    4560
tagatccttt gaaataaaaa ttatgtcttt ataactctga tcttttacat aaagcagaag    4620
aggaatcaac tagttaattg caaggtttct actctgtttc ctctgtaaag atcagatggt    4680
aatctttcaa ataagaaaaa aataaagacg tatgtttgac caagtagttt cacaagaata    4740
tttgggaact tgtttctttt aattttattt gtccctgagt gaagtctaga agaaaggta    4800 aagagtctag agtttattcc tctttccaaa acattctcat tcctctcctc cctacactta    4860
gtatttcccc cacagagtgc ctagaatctt aataatgaat aaaataaaaa gcagcaatat    4920
gtcattaaca aatccagacc tgaaagggta aagggtttat aactgcacta ataaagagag    4980
gctctttttt tttcttccag tttgttggtt tttaatggta ccgtgttgta aagatcccca    5040
ctaatggaca atcaaattgc agaaaaggct caatatccaa gagacaggga ctaatgcact    5100
gtacaatctg cttatccttg cccttctctc ttgccaaagt gtgcttcaga aatatatact    5160
gctttaaaaa agaataaaag aatatccttt tacaagtggc tttacatttc ctaaaatgcc    5220
ataagaaaat gcaatatctg ggtactgtat ggggaaaaaa atgtccaagt ttgtgtaaaa    5280
ccagtgcatt tcagcttgca agttactgaa cacaataatg ctgttttaat tttgttttat    5340
```

```
atcagttaaa attcacaata atgtagatag aacaaattac agacaaggaa agaaaaaact      5400
tgaatgaaat ggattttaca gaaagcttta tgataatttt tgaatgcatt atttattttt      5460
tgtgccatgc attttttttc tcaccaaatg accttacctg taatacagtc ttgtttgtct      5520
gtttacaacc atgtatttat tgcaatgtac atactgtaat gttaattgta aattatctgt      5580
tcttattaaa acatcatccc atgatgggat ggtgttgata tatttggaaa ctcttggtga      5640
gagaatgaat ggtgtgtata catactctgt acattttttct tttctcctgt aatatagtct      5700
tgtcacctta gagcttgttt atggaagatt caagaaaact ataaaatact taaagatata      5760
taaatttaaa aaaacatagc tgcaggtctt tggtcccagg gctgtgcctt aactttaacc      5820
aatattttct tctgttttgc tgcatttgaa aggtaacagt ggagctaggg ctggcattt       5880 tacatccagg ctttttaattg attagaattc tgccaatagg tggattttac aaaaccacag     5940
acaacctctg aaagattctg agacccttttt gagacagaag ctcttaagta cttcttgcca    6000
gggagcagca ctgcatgtgt gatggttgtt tgccatctgt tgatcaggaa ctacttcagc     6060
tacttgcatt tgattatttc cttttttttt tttttaact cggaaacaca actggggaaa       6120
tatattcttt cccagtgatt ataaacaatc ttttctttt ttttaagtcc ttttggcttc       6180
tagagctcat aggaaaatgg acttgatttg aaattggagc cagagtttac tcgtgttggt     6240
tatctattca tcagcttcct gacatgttaa gagaatacat taaagagaaa atactgttttt    6300 ttaatcctaa aattttttctt ccactaagat aaaccaaatg tccttacata tatgtaaacc    6360 catctatta aacgcaaagg tgggttgatg tcagtttaca tagcagaaag cattcactat       6420
cctctaagat ttgtttctgc aaaactttca ttgctttaga atttttaaaat ttcaccttgt    6480 acaatggcca gccctaaag caggaaacat ttataatgga ttatatgaa acatcctccc         6540 agtacttgcc cagcccttga atcatgtggc ttttcagtga aaggaaagat tcttttttcta    6600 ggaaaaatga gcctattttta ttttatttta ttttattttt tgacacaaac tgtagatttt    6660
agcagccctg gcccaaagga atttgattac ttttgtttta aacagtacaa aggggacact     6720
ataattacaa aaacatcctt aactgatttg agttgtttt atttctttgg atatattttc      6780
agagtggtaa attgtgtgtg agaattacaa atgattattc ttttagtggt ttcttagcct     6840
ctcttacagc ccacggggat agtactgtac atcaatacct tcatatgaaa tttttatatg     6900
caatgaaaat aaaagcatgg gttgattctg cctatttatg actcaatctt ttacaaataa      6960
aagattattc attttaaatt atagttcaat cagcatgtct cttaggatac tgaacgtggt     7020
tgaaatgaaa ggatagtgac atcataagtt agtactgata ttcataacca aataaagcca   7080
acttgagtaa ttttgctaca ttaaaaatta ccaaaattac ttagatggcc tataagatta    7140
agcatggtgt tttctaagca agctttgaaa ggggccttcc atacttactt aattgaatat    7200
tctgggatat tgaaaattat tcagatactt gacaattatt tttggttacc tactccgcaa    7260
actacaaagt tttaaggact caacaataag ttaatgagac acagtgtttg ctttcatgga   7320
gcttacagtc tggaggggac aaaggcttaa acaatactca tataattata tatgtgatca    7380
gtacaatgaa ggagctcagt ggggtaaata agcaggaacc tgaacttgat ctgttccgga    7440
gggccacaga aggcttcctt gaggccttga gaaagtgatt tgcatctgag ttctgaagga   7500
ttgtaagagg taactaggga aaaagttgac aggaagagga aggggatcca gacaagaaac    7560
atttgcaaag atcttgaggc ataaatgagc ttgagacatc tggagaaact gaggaaaagt    7620
gagagagtag gcagggcctg gagccgcaga gccattgcta accatcctgt gtgagatatc    7680
```

-continued

```
cccccattctg tagctttatt ctcataaccc tgctcaattt tctttataac acttctcaca    7740
gatttatata cgtgtttgtt tttgttatct gtctctccca ccagaccaca gctccatgag    7800
agcaaggtct ttgcttacca atatatcact agcacttaaa actatgcctg gtacacagta    7860
ggttcttaat atgtgttgaa tatagccatc aaattgatat tggatataat tcaatctgat    7920
aagatatttt gagatattaa agagtttta acttgatacc ataaaaaaaa aaaaaaaa      7979
```

<210> SEQ ID NO 2
<211> LENGTH: 745
<212> TYPE: PRT
<213> ORGANISM: Homo sapiens

<400> SEQUENCE: 2

```
Met Ala Gln Gln Thr Ser Pro Asp Thr Leu Thr Val Pro Glu Val Asp
1               5                   10                  15

Asn Pro His Cys Pro Asn Pro Trp Leu Asn Glu Asp Leu Val Lys Ser
                20                  25                  30

Leu Arg Glu Asn Leu Leu Gln His Glu Lys Ser Lys Thr Ala Arg Lys
            35                  40                  45

Ser Val Ser Pro Lys Leu Ser Pro Val Ile Ser Pro Arg Asn Ser Pro
        50                  55                  60

Arg Leu Leu Arg Arg Met Leu Leu Ser Ser Asn Ile Pro Lys Gln Arg
65                  70                  75                  80

Arg Phe Thr Val Ala His Thr Cys Phe Asp Val Asp Asn Gly Thr Ser
                85                  90                  95

Ala Gly Arg Ser Pro Leu Asp Pro Met Thr Ser Pro Gly Ser Gly Leu
            100                 105                 110

Ile Leu Gln Ala Asn Phe Val His Ser Gln Arg Arg Glu Ser Phe Leu
        115                 120                 125

Tyr Arg Ser Asp Ser Asp Tyr Asp Leu Ser Pro Lys Ser Met Ser Arg
    130                 135                 140

Asn Ser Ser Ile Ala Ser Asp Ile His Gly Asp Asp Leu Ile Val Thr
145                 150                 155                 160

Pro Phe Ala Gln Val Leu Ala Ser Leu Arg Thr Val Arg Asn Asn Phe
                165                 170                 175

Ala Ala Leu Thr Asn Leu Gln Asp Arg Ala Pro Ser Lys Arg Ser Pro
            180                 185                 190

Met Cys Asn Gln Pro Ser Ile Asn Lys Ala Thr Ile Thr Glu Glu Ala
        195                 200                 205

Tyr Gln Lys Leu Ala Ser Glu Thr Leu Glu Glu Leu Asp Trp Cys Leu
    210                 215                 220

Asp Gln Leu Glu Thr Leu Gln Thr Arg His Ser Val Ser Glu Met Ala
225                 230                 235                 240

Ser Asn Lys Phe Lys Arg Met Leu Asn Arg Glu Leu Thr His Leu Ser
                245                 250                 255

Glu Met Ser Arg Ser Gly Asn Gln Val Ser Glu Phe Ile Ser Asn Thr
            260                 265                 270

Phe Leu Asp Lys Gln His Glu Val Glu Ile Pro Ser Pro Thr Gln Lys
        275                 280                 285

Glu Lys Glu Lys Lys Arg Pro Met Ser Gln Ile Ser Gly Val Lys
    290                 295                 300

Lys Leu Met His Ser Ser Ser Leu Thr Asn Ser Ser Ile Pro Arg Phe
305                 310                 315                 320

Gly Val Lys Thr Glu Gln Glu Asp Val Leu Ala Lys Glu Leu Glu Asp
```

```
                325                 330                 335
Val Asn Lys Trp Gly Leu His Val Phe Arg Ile Ala Glu Leu Ser Gly
            340                 345                 350

Asn Arg Pro Leu Thr Val Ile Met His Thr Ile Phe Gln Glu Arg Asp
            355                 360                 365

Leu Leu Lys Thr Phe Lys Ile Pro Val Asp Thr Leu Ile Thr Tyr Leu
            370                 375                 380

Met Thr Leu Glu Asp His Tyr His Ala Asp Val Ala Tyr His Asn Asn
385                 390                 395                 400

Ile His Ala Ala Asp Val Val Gln Ser Thr His Val Leu Leu Ser Thr
                405                 410                 415

Pro Ala Leu Glu Ala Val Phe Thr Asp Leu Glu Ile Leu Ala Ala Ile
            420                 425                 430

Phe Ala Ser Ala Ile His Asp Val Asp His Pro Gly Val Ser Asn Gln
            435                 440                 445

Phe Leu Ile Asn Thr Asn Ser Glu Leu Ala Leu Met Tyr Asn Asp Ser
            450                 455                 460

Ser Val Leu Glu Asn His His Leu Ala Val Gly Phe Lys Leu Leu Gln
465                 470                 475                 480

Glu Glu Asn Cys Asp Ile Phe Gln Asn Leu Thr Lys Lys Gln Arg Gln
                485                 490                 495

Ser Leu Arg Lys Met Val Ile Asp Ile Val Leu Ala Thr Asp Met Ser
            500                 505                 510

Lys His Met Asn Leu Leu Ala Asp Leu Lys Thr Met Val Glu Thr Lys
            515                 520                 525

Lys Val Thr Ser Ser Gly Val Leu Leu Leu Asp Asn Tyr Ser Asp Arg
            530                 535                 540

Ile Gln Val Leu Gln Asn Met Val His Cys Ala Asp Leu Ser Asn Pro
545                 550                 555                 560

Thr Lys Pro Leu Gln Leu Tyr Arg Gln Trp Thr Asp Arg Ile Met Glu
                565                 570                 575

Glu Phe Phe Arg Gln Gly Asp Arg Glu Arg Glu Arg Gly Met Glu Ile
            580                 585                 590

Ser Pro Met Cys Asp Lys His Asn Ala Ser Val Glu Lys Ser Gln Val
            595                 600                 605

Gly Phe Ile Asp Tyr Ile Val His Pro Leu Trp Glu Thr Trp Ala Asp
            610                 615                 620

Leu Val His Pro Asp Ala Gln Asp Ile Leu Asp Thr Leu Glu Asp Asn
625                 630                 635                 640

Arg Glu Trp Tyr Gln Ser Thr Ile Pro Gln Ser Pro Ser Pro Ala Pro
                645                 650                 655

Asp Asp Pro Glu Glu Gly Arg Gln Gly Gln Thr Glu Lys Phe Gln Phe
            660                 665                 670

Glu Leu Thr Leu Glu Glu Asp Gly Glu Ser Asp Thr Glu Lys Asp Ser
            675                 680                 685

Gly Ser Gln Val Glu Glu Asp Thr Ser Cys Ser Asp Ser Lys Thr Leu
            690                 695                 700

Cys Thr Gln Asp Ser Glu Ser Thr Glu Ile Pro Leu Asp Glu Gln Val
705                 710                 715                 720

Glu Glu Glu Ala Val Gly Glu Glu Glu Ser Gln Pro Glu Ala Cys
                725                 730                 735

Val Ile Asp Asp Arg Ser Pro Asp Thr
            740                 745
```

<210> SEQ ID NO 3
<211> LENGTH: 19
<212> TYPE: DNA
<213> ORGANISM: Artificial Sequence
<220> FEATURE:
<223> OTHER INFORMATION: PDE4D5_forward primer

<400> SEQUENCE: 3
gcttctcagc agcaacatc                                                     19

<210> SEQ ID NO 4
<211> LENGTH: 20
<212> TYPE: DNA
<213> ORGANISM: Artificial Sequence
<220> FEATURE:
<223> OTHER INFORMATION: PDE4D5_reverse primer

<400> SEQUENCE: 4
tgccattgtc cacatcaaaa                                                    20

<210> SEQ ID NO 5
<211> LENGTH: 24
<212> TYPE: DNA
<213> ORGANISM: Artificial Sequence
<220> FEATURE:
<223> OTHER INFORMATION: PDE4D5 probe

<400> SEQUENCE: 5
acagcggcgt ttcacggtgg caca                                               24

<210> SEQ ID NO 6
<211> LENGTH: 8130
<212> TYPE: DNA
<213> ORGANISM: Homo sapiens

<400> SEQUENCE: 6
agattatagc ccagcgtacg agaagcacga gtcctatagt tggcgtaccc tgaggcctgc        60
cagttcctgc cttaatgcat atgtagtcgt aattgagttc tgacacggcc ttggatgttt       120
ctgtcctaaa tagctgacat tgcatcttca agactgtcat tccagttggc ttttgagtgg       180
atacgtgcag tgagatcatt gacactggaa acactagttc ccattttaat tacttaaaac       240
accacgatga aaagaaatac ctgtgatttg ctttctcgga gcaaaagtgc ctctgaggaa       300
acactacatt ccagtaatga agaggaagac cctttccgcg gaatggaacc ctatcttgtc       360
cggagacttt catgtcgcaa tattcagctt cccctctcg ccttcagaca gttgaacaa        420 gctgacttga aaagtgaatc agagaacatt caacgaccaa ccagcctccc cctgaagatt       480
ctgccgctga ttgctatcac ttctgcagaa tccagtggtt ttgatgtgga caatggcaca       540
tctgcgggac ggagtccctt ggatcccatg accagcccag atccgggct aattctccaa       600 gcaaattttg tccacagtca acgacgggag tccttcctgt atcgatccga cagcgattat       660
gacctctctc caaagtctat gtcccggaac tcctccattg ccagtgatat acacggagat       720
gacttgattg tgactccatt tgctcaggtc ttggccagtc tgcgaactgt acgaaacaac       780
tttgctgcat taactaatttt gcaagatcga gcacctagca aaagatcacc catgtgcaac       840
caaccatcca tcaacaaagc caccataaca gaggaggcct accagaaact ggccagcgag       900 acctggagg agctggactg gtgtctggac cagctagaga ccctacagac caggcactcc       960
gtcagtgaga tggcctccaa caagtttaaa aggatgctta atcgggagct cacccatctc      1020

```
tctgaaatga gtcggtctgg aaatcaagtg tcagagttta tatcaaacac attcttagat    1080
aagcaacatg aagtggaaat tccttctcca actcagaagg aaaaggagaa aaagaaaaga    1140
ccaatgtctc agatcagtgg agtcaagaaa ttgatgcaca gctctagtct gactaattca    1200
agtatcccaa ggtttggagt taaaactgaa caagaagatg tccttgccaa ggaactagaa    1260
gatgtgaaca atgggggtct tcatgttttc agaatagcag agttgtctgg taaccggccc    1320
ttgactgtta tcatgcacac cattttttcag gaacgggatt tattaaaaac atttaaaatt    1380
ccagtagata ctttaattac atatcttatg actctcgaag accattacca tgctgatgtg    1440
gcctatcaca acaatatcca tgctgcagat gttgtccagt ctactcatgt gctattatct    1500
acacctgctt tggaggctgt gtttacagat ttggagattc ttgcagcaat ttttgccagt    1560
gcaatacatg atgtagatca tcctggtgtg tccaatcaat ttctgatcaa tacaaactct    1620
gaacttgcct tgatgtacaa tgattcctca gtcttagaga accatcattt ggctgtgggc    1680
tttaaattgc ttcaggaaga aaactgtgac attttccaga atttgaccaa aaaacaaaga    1740
caatctttaa ggaaaatggt cattgacatc gtacttgcaa cagatatgtc aaaacacatg    1800
aatctactgg ctgatttgaa gactatggtt gaaactaaga aagtgacaag ctctggagtt    1860
cttcttcttg ataattattc cgataggatt caggttcttc agaatatggt gcactgtgca    1920
gatctgagca acccaacaaa gcctctccag ctgtaccgcc agtggacgga ccggataatg    1980
gaggagttct tccgccaagg agaccgagag agggaacgtg gcatggagat aagccccatg    2040
tgtgacaagc acaatgcttc cgtggaaaaa tcacaggtgg gcttcataga ctatattgtt    2100
catccctct gggagacatg gcagacctc gtccaccctg acgcccagga tattttggac    2160
actttggagg acaatcgtga atggtaccag agcacaatcc ctcagagccc ctctcctgca    2220
cctgatgacc cagaggaggg ccggcagggt caaactgaga aattccagtt tgaactaact    2280
ttagaggaag atggtgagtc agacacggaa aaggacagtg gcagtcaagt ggaagaagac    2340
actagctgca gtgactccaa gactcttttgt actcaagact cagagtctac tgaaaattcc    2400
cttgatgaac aggttgaaga ggaggcagta ggggaagaag aggaaagcca gcctgaagcc    2460
tgtgtcatag atgatcgttc tcctgacacg taacagtgca aaaactttca tgccttttt    2520
tttttttaagt agaaaaattg tttccaaagt gcatgtcaca tgccacaacc acggtcacac    2580
ctcactgtca tctgccagga cgtttgttga acaaaactga ccttgactac tcagtccagc    2640
gctcaggaat atcgtaacca gttttttcac ctccatgtca tccgagcaag gtggacatct    2700
tcacgaacag cgttttttaac aagatttcag cttggtagag ctgacaaagc agataaaatc    2760
tactccaaat tatttttcaag agagtgtgac tcatcaggca gcccaaaagt ttattggact    2820
tgggggtttct attcctttttt attttgtttgc aatattttca gaagaaaggc attgcacaga    2880
gtgaacttaa tggacgaagc aacaaatatg tcaagaacag gacatagcac gaatctgtta    2940
ccagtaggag gaggatgagc cacagaaatt gcataatttt ctaatttcaa gtcttcctga    3000
tacatgactg aatagtgtgg ttcagtgagc tgcactgacc tctacatttt gtatgatatg    3060
taaaacagat ttttttgtaga gcttacttttt attattaaat gtattgaggt attatattta    3120
aaaaaaacta tgttcagaac ttcatctgcc actggttatt tttttctaag gagtaacttg    3180
caagttttca gtacaaatct gtgctacact ggataaaaat ctaatttatg aattttactt    3240
gcaccttata gttcatagca attaactgat ttgtagtgat tcattgtttg ttttatatac    3300
caatgacttc catattttaa aagagaaaaa caacttatg ttgcaggaaa cccttttttgt    3360
aagtctttat tatttacttt gcattttgtt tcactctttc cagataagca gagttgctct    3420
```

```
tcaccagtgt ttttcttcat gtgcaaagtg actatttgtt ctataatact tttatgtgtg    3480
ttatatcaaa tgtgtcttaa gcttcatgca aactcagtca tcagttcgtg ttgtctgaag    3540
caagtgggag atatataaat acccagtagc taaaatggtc agtcttttt agatgttttc     3600 ctacttagta tctcctaata acgttttgct gtgtcactag atgttcattt cacaagtgca    3660
tgtctttcta ataatccaca catttcatgc tctaataatc cacacatttc atgctcattt    3720
ttattgtttt tacagccagt tatagtaaga aaaaggtttt tccccttgtg ctgctttata    3780
atttagcgtg tgtctgaacc ttatccatgt ttgctagatg aggtcttgtc aaatatatca    3840
ctaccattgt caccggtgaa aagaaacagg tagttaagtt agggttaaca ttcatttcaa    3900
ccacgaggtt gtatatcatg actagctttt actcttggtt tacagagaaa agttaaacag    3960
ccaactaggc agttttaag aatattaaca atatattaac aaacaccaat acaactaatc     4020
ctatttggtt ttaatgattt caccatggga ttaagaacta tcaggaac atccctgaga      4080 aacggtttta agtgtagcaa ctactcttcc ttaatggaca gccacataac gtgtaggaag    4140
tcctttatca cttatcctcg atccataagc atatcttgca gagggaact acttctttaa     4200 acacatggag ggaagaaga tgatgccact ggcaccagag ggttagtact gtgatgcatc     4260
ctaaaatatt tattatattg gtaaaaattc tggttaaata aaaaattaga gatcactctt    4320
ggctgatttc agcaccagga actgtattac agttttagag attaattcct agtgtttacc    4380
tgattatagc agttggcatc atggggcatt taattctgac tttatcccca cgtcagcctt    4440
aataaagtct tctttacctt ctctatgaag actttaaagc ccaaataatc atttttcaca    4500
ttgatattca agaattgaga tagatagaag ccaagtggg tatctgacaa gtggaaaatc     4560
aaacgtttaa gaagaattac aactctgaaa agcatttata tgtggaactt ctcaaggagc    4620
ctcctgggga ctgaaagta agtcatcagc caggcaaatg actcatgctg aagagagtcc     4680
ccatttcagt cccctgagat ctagctgatg cttagatcct ttgaaataaa aattatgtct    4740
ttataactct gatcttttac ataaagcaga agaggaatca actagttaat tgcaaggttt    4800
ctactctgtt tcctctgtaa agatcagatg gtaatctttc aaataagaaa aaaataaaga    4860
cgtatgtttg accaagtagt ttcacaagaa tatttgggaa cttgtttctt ttaattttat    4920
ttgtccctga gtgaagtcta gaaagaaagg taaagagtct agagtttatt cctctttcca    4980
aaacattctc attcctctcc tccctacact tagtatttcc cccacagagt gcctagaatc    5040
ttaataatga ataaaataaa aagcagcaat atgtcattaa caaatccaga cctgaaaggg    5100
taaagggttt ataactgcac taataaagag aggctctttt tttttcttcc agtttgttgg    5160
tttttaatgg taccgtgttg taaagatacc cactaatgga caatcaaatt gcagaaaagg    5220
ctcaatatcc aagagacagg gactaatgca ctgtacaatc tgcttatcct tgcccttctc    5280
tcttgccaaa gtgtgcttca gaatatata ctgctttaaa aagaataaa agaatatcct      5340 tttacaagtg gctttacatt tcctaaaatg ccataagaaa atgcaatatc tgggtactgt    5400
atggggaaaa aaatgtccaa gtttgtgtaa aaccagtgca tttcagcttg caagttactg    5460
aacacaataa tgctgtttta attttgtttt atatcagtta aaattcacaa taatgtagat    5520
agaacaaatt acagacaagg aaagaaaaaa cttgaatgaa atggattta cagaaagctt     5580 tatgataatt tttgaatgca ttatttattt tttgtgccat gcatttttt tctcaccaaa     5640 tgaccttacc tgtaatacag tcttgtttgt ctgtttacaa ccatgtattt attgcaatgt    5700
acatactgta atgttaattg taaattatct gttcttatta aaacatcatc ccatgatggg    5760
```

-continued

```
atggtgttga tatatttgga aactcttggt gagagaatga atggtgtgta tacatactct    5820
gtacattttt cttttctcct gtaatatagt cttgtcacct tagagcttgt ttatggaaga    5880
ttcaagaaaa ctataaaata cttaaagata tataaattta aaaaaacata gctgcaggtc    5940
tttggtccca gggctgtgcc ttaacttta ccaatatttt cttctgtttt gctgcatttg     6000
aaaggtaaca gtggagctag ggctgggcat tttacatcca ggcttttaat tgattagaat    6060
tctgccaata ggtggatttt acaaaaccac agacaacctc tgaaagattc tgagacccctt   6120
ttgagacaga agctcttaag tacttcttgc cagggagcag cactgcatgt gtgatggttg    6180
tttgccatct gttgatcagg aactacttca gctacttgca tttgattatt tccttttttt    6240
tttttttaa ctcggaaaca caactgggga aatatattct ttcccagtga ttataaacaa     6300
tcttttctt tttttaagt cctttggct tctagagctc ataggaaaat ggacttgatt       6360
tgaaattgga gccagagttt actcgtgttg gttatctatt catcagcttc ctgacatgtt    6420
aagagaatac attaaagaga aaatactgtt tttaatcct aaaattttc ttccactaag      6480
ataaaccaaa tgtccttaca tatatgtaaa cccatctatt taaacgcaaa ggtgggttga    6540
tgtcagttta catagcagaa agcattcact atcctctaag atttgtttct gcaaaacttt    6600
cattgcttta gaattttaaa atttcacctt gtacaatggc cagcccctaa agcaggaaac    6660
atttataatg gattatatgg aaacatcctc ccagtacttg cccagcccctt gaatcatgtg   6720
gcttttcagt gaaggaaag attctttttc taggaaaaat gagcctattt tattttattt     6780
tattttattt tttgacacaa actgtagatt ttagcagccc tggcccaaag gaatttgatt    6840
acttttgttt taaacagtac aaaggggaca ctataattac aaaaacatcc ttaactgatt    6900
tgagttgttt ttatttcttt ggatatattt tcagagtggt aaattgtgtg tgagaattac    6960
aaatgattat tcttttagtg gtttcttagc ctctcttaca gcccacgggg atagtactgt    7020
acatcaatac cttcatatga aatttttata tgcaatgaaa ataaaagcat gggttgattc    7080
tgcctattta tgactcaatc ttttacaaat aaaagattat tcattttaaa ttatagttca    7140
atcagcatgt ctcttaggat actgaacgtg gttgaaatga aggatagtg acatcataag     7200
ttagtactga tattcataac caaataaagc caacttgagt aattttgcta cattaaaaat    7260
taccaaaatt acttagatgg cctataagat taagcatggt gttttctaag caagctttga    7320
aaggggcctt ccatacttac ttaattgaat attctgggat attgaaaatt attcagatac    7380
ttgacaatta ttttttggtta cctactccgc aaactacaaa gttttaagga ctcaacaata   7440
agttaatgag acacagtgtt tgctttcatg gagcttacag tctggagggg acaaaggctt    7500
aaacaatact catataatta tatatgtgat cagtacaatg aaggagctca gtggggtaaa    7560
taagcaggaa cctgaacttg atctgttccg gagggccaca gaaggcttcc ttgaggcctt    7620
gagaaagtga tttgcatctg agttctgaag gattgtaaga ggtaactagg gaaaaagttg    7680
acaggaagag gaaggggatc cagacaagaa acatttgcaa agatcttgag gcataaatga    7740
gcttgagaca tctggagaaa ctgaggaaaa gtgagagagt aggcagggcc tggagccgca    7800
gagccattgc taaccatcct gtgtgagata tcccccattc tgtagcttta ttctcataac    7860
cctgctcaat tttctttata acacttctca cagatttata tacgtgtttg ttttttgttat   7920
ctgtctctcc caccagacca cagctccatg agagcaaggt ctttgcttac caatatatca    7980
ctagcactta aaactatgcc tggtacacag taggttctta atatgtgttg aatatagcca    8040
tcaaattgat attggatata attcaatctg ataagatatt ttgagatatt aaagagtttt    8100
taacttgata ccataaaaaa aaaaaaaaaa                                     8130
```

<210> SEQ ID NO 7
<211> LENGTH: 748
<212> TYPE: PRT
<213> ORGANISM: Homo sapiens

<400> SEQUENCE: 7

```
Met Lys Arg Asn Thr Cys Asp Leu Leu Ser Arg Ser Lys Ser Ala Ser
1               5                   10                  15

Glu Glu Thr Leu His Ser Ser Asn Glu Glu Asp Pro Phe Arg Gly
            20                  25                  30

Met Glu Pro Tyr Leu Val Arg Arg Leu Ser Cys Arg Asn Ile Gln Leu
            35                  40                  45

Pro Pro Leu Ala Phe Arg Gln Leu Glu Gln Ala Asp Leu Lys Ser Glu
    50                  55                  60

Ser Glu Asn Ile Gln Arg Pro Thr Ser Leu Pro Leu Lys Ile Leu Pro
65                  70                  75                  80

Leu Ile Ala Ile Thr Ser Ala Glu Ser Ser Gly Phe Asp Val Asp Asn
                85                  90                  95

Gly Thr Ser Ala Gly Arg Ser Pro Leu Asp Pro Met Thr Ser Pro Gly
            100                 105                 110

Ser Gly Leu Ile Leu Gln Ala Asn Phe Val His Ser Gln Arg Arg Glu
        115                 120                 125

Ser Phe Leu Tyr Arg Ser Asp Ser Asp Tyr Asp Leu Ser Pro Lys Ser
    130                 135                 140

Met Ser Arg Asn Ser Ser Ile Ala Ser Asp Ile His Gly Asp Asp Leu
145                 150                 155                 160

Ile Val Thr Pro Phe Ala Gln Val Leu Ala Ser Leu Arg Thr Val Arg
                165                 170                 175

Asn Asn Phe Ala Ala Leu Thr Asn Leu Gln Asp Arg Ala Pro Ser Lys
            180                 185                 190

Arg Ser Pro Met Cys Asn Gln Pro Ser Ile Asn Lys Ala Thr Ile Thr
        195                 200                 205

Glu Glu Ala Tyr Gln Lys Leu Ala Ser Glu Thr Leu Glu Glu Leu Asp
    210                 215                 220

Trp Cys Leu Asp Gln Leu Glu Thr Leu Gln Thr Arg His Ser Val Ser
225                 230                 235                 240

Glu Met Ala Ser Asn Lys Phe Lys Arg Met Leu Asn Arg Glu Leu Thr
                245                 250                 255

His Leu Ser Glu Met Ser Arg Ser Gly Asn Gln Val Ser Glu Phe Ile
            260                 265                 270

Ser Asn Thr Phe Leu Asp Lys Gln His Glu Val Glu Ile Pro Ser Pro
        275                 280                 285

Thr Gln Lys Glu Lys Glu Lys Lys Arg Pro Met Ser Gln Ile Ser
    290                 295                 300

Gly Val Lys Lys Leu Met His Ser Ser Ser Leu Thr Asn Ser Ser Ile
305                 310                 315                 320

Pro Arg Phe Gly Val Lys Thr Glu Gln Glu Asp Val Leu Ala Lys Glu
                325                 330                 335

Leu Glu Asp Val Asn Lys Trp Gly Leu His Val Phe Arg Ile Ala Glu
            340                 345                 350

Leu Ser Gly Asn Arg Pro Leu Thr Val Ile Met His Thr Ile Phe Gln
        355                 360                 365

Glu Arg Asp Leu Leu Lys Thr Phe Lys Ile Pro Val Asp Thr Leu Ile
```

```
                  370             375             380
Thr Tyr Leu Met Thr Leu Glu Asp His Tyr His Ala Asp Val Ala Tyr
385                 390                 395                 400

His Asn Asn Ile His Ala Ala Asp Val Val Gln Ser Thr His Val Leu
                405                 410                 415

Leu Ser Thr Pro Ala Leu Glu Ala Val Phe Thr Asp Leu Glu Ile Leu
                420                 425                 430

Ala Ala Ile Phe Ala Ser Ala Ile His Asp Val Asp His Pro Gly Val
                435                 440                 445

Ser Asn Gln Phe Leu Ile Asn Thr Asn Ser Glu Leu Ala Leu Met Tyr
                450                 455                 460

Asn Asp Ser Ser Val Leu Glu Asn His His Leu Ala Val Gly Phe Lys
465                 470                 475                 480

Leu Leu Gln Glu Glu Asn Cys Asp Ile Phe Gln Asn Leu Thr Lys Lys
                485                 490                 495

Gln Arg Gln Ser Leu Arg Lys Met Val Ile Asp Ile Val Leu Ala Thr
                500                 505                 510

Asp Met Ser Lys His Met Asn Leu Leu Ala Asp Leu Lys Thr Met Val
                515                 520                 525

Glu Thr Lys Lys Val Thr Ser Ser Gly Val Leu Leu Leu Asp Asn Tyr
                530                 535                 540

Ser Asp Arg Ile Gln Val Leu Gln Asn Met Val His Cys Ala Asp Leu
545                 550                 555                 560

Ser Asn Pro Thr Lys Pro Leu Gln Leu Tyr Arg Gln Trp Thr Asp Arg
                565                 570                 575

Ile Met Glu Glu Phe Phe Arg Gln Gly Asp Arg Glu Arg Glu Arg Gly
                580                 585                 590

Met Glu Ile Ser Pro Met Cys Asp Lys His Asn Ala Ser Val Glu Lys
                595                 600                 605

Ser Gln Val Gly Phe Ile Asp Tyr Ile Val His Pro Leu Trp Glu Thr
                610                 615                 620

Trp Ala Asp Leu Val His Pro Asp Ala Gln Asp Ile Leu Asp Thr Leu
625                 630                 635                 640

Glu Asp Asn Arg Glu Trp Tyr Gln Ser Thr Ile Pro Gln Ser Pro Ser
                645                 650                 655

Pro Ala Pro Asp Asp Pro Glu Glu Gly Arg Gln Gly Gln Thr Glu Lys
                660                 665                 670

Phe Gln Phe Glu Leu Thr Leu Glu Glu Asp Gly Glu Ser Asp Thr Glu
                675                 680                 685

Lys Asp Ser Gly Ser Gln Val Glu Glu Asp Thr Ser Cys Ser Asp Ser
                690                 695                 700

Lys Thr Leu Cys Thr Gln Asp Ser Glu Ser Thr Glu Ile Pro Leu Asp
705                 710                 715                 720

Glu Gln Val Glu Glu Glu Ala Val Gly Glu Glu Glu Ser Gln Pro
                725                 730                 735

Glu Ala Cys Val Ile Asp Asp Arg Ser Pro Asp Thr
                740                 745
```

<210> SEQ ID NO 8
<211> LENGTH: 20
<212> TYPE: DNA
<213> ORGANISM: Artificial Sequence
<220> FEATURE:
<223> OTHER INFORMATION: PDE4D7_forward primer

```
<400> SEQUENCE: 8
gaacattcaa cgaccaacca                                              20

<210> SEQ ID NO 9
<211> LENGTH: 20
<212> TYPE: DNA
<213> ORGANISM: Artificial Sequence
<220> FEATURE:
<223> OTHER INFORMATION: PDE4D7_reverse primer

<400> SEQUENCE: 9
tgccattgtc cacatcaaaa                                              20

<210> SEQ ID NO 10
<211> LENGTH: 27
<212> TYPE: DNA
<213> ORGANISM: Artificial Sequence
<220> FEATURE:
<223> OTHER INFORMATION: PDE4D7 probe

<400> SEQUENCE: 10
ctgccgctga ttgctatcac ttctgca                                      27

<210> SEQ ID NO 11
<211> LENGTH: 22
<212> TYPE: DNA
<213> ORGANISM: Artificial Sequence
<220> FEATURE:
<223> OTHER INFORMATION: PDE4D7 Forward Primer 2

<400> SEQUENCE: 11
cgctgattgc tatcacttct gc                                           22

<210> SEQ ID NO 12
<211> LENGTH: 24
<212> TYPE: DNA
<213> ORGANISM: Artificial Sequence
<220> FEATURE:
<223> OTHER INFORMATION: PDE4D7 Reverse primer

<400> SEQUENCE: 12
gtcgttgact gtggacaaaa tttg                                         24

<210> SEQ ID NO 13
<211> LENGTH: 34
<212> TYPE: DNA
<213> ORGANISM: Artificial Sequence
<220> FEATURE:
<223> OTHER INFORMATION: PDE4D7 Probe 2

<400> SEQUENCE: 13
ttcccttgga tcccatgacc agcccataag ggaa                              34

<210> SEQ ID NO 14
<211> LENGTH: 8395
<212> TYPE: DNA
<213> ORGANISM: Homo sapiens

<400> SEQUENCE: 14
ttctcactgc cctgcggtgt tttgaactgc cttcttacag acgtcataca gcccttgagg    60
aatagtttct gcctggtgag attgaatgat agttctcatt cacaaaaccc tggattctaa   120
gcagggacac acagaaatta cttttcgcagg taaatcagcc cacccagcca agtgtggag   180 agatttgttc cttggctgac ttctttgctc cacggagagg agtgttttcc tgtgcttgcc   240
```

```
ctgaaatgga acttccttga cagctctccc gtgttacagt acctcccggt cattttcttt      300
ttctctctct ctacctgcgc tcttcgagtg tcagaaacct ttaaagctgt tactatggaa      360
ttgcaaaaaa gagatcaagt gactctttca ctatgctggt ttcccttgtg acccagatga      420
agaatcaatt cagaattcag ttcctcccct tggcattgca agacacagaa gaaactgtca c    480 ttcctaacag cctagtactg gagtaaattc agtatgaagg aagaaagcgc tcctgcgtgt      540
tagaaccttg cccatgagct ggaccgagga caggagatgg actccaggaa aattggattt      600
cttcaagcag cctcccttgg aaatggaata tctttaaaat cttctttgca gaaagacagt      660
tagaatgtat taatcagaat agttgaagac ttattttcct ttttattttt tttcaaaatg      720
agcattatta tgaagccaag atcccgatct acaagttccc taaggactgc agaggcagtt      780
tgttttgatg tggacaatgg cacatctgcg ggacggagtc ccttggatcc catgaccagc      840
ccaggatccg ggctaattct ccaagcaaat tttgtccaca gtcaacgacg ggagtccttc      900
ctgtatcgat ccgacagcga ttatgacctc tctccaaagt ctatgtcccg gaactcctcc      960
attgccagtg atatacacgg agatgacttg attgtgactc catttgctca ggtcttggcc     1020
agtctgcgaa ctgtacgaaa caactttgct gcattaacta atttgcaaga tcgagcacct     1080
agcaaaagat cacccatgtg caaccaacca tccatcaaca aagccaccat aacagaggag     1140
gcctaccaga aactggccag cgagaccctg gaggagctgg actggtgtct ggaccagcta     1200
gagaccctac agaccaggca ctccgtcagt gagatggcct ccaacaagtt taaaaggatg     1260
cttaatcggg agctcaccca tctctctgaa atgagtcggt ctggaaatca agtgtcagag     1320
tttatatcaa acacattctt agataagcaa catgaagtgg aaattccttc tccaactcag     1380
aaggaaaagg agaaaaagaa aagaccaatg tctcagatca gtggagtcaa gaaattgatg     1440
cacagctcta gtctgactaa ttcaagtatc ccaaggtttg gagttaaaac tgaacaagaa     1500
gatgtccttg ccaaggaact agaagatgtg aacaaatggg gtcttcatgt tttcagaata     1560
gcagagttgt ctggtaaccg gcccttgact gttatcatgc acaccatttt tcaggaacgg     1620
gatttattaa aaacatttaa aattccagta gatactttaa ttacatatct tatgactctc     1680
gaagaccatt accatgctga tgtggcctat cacaacaata tccatgctgc agatgttgtc     1740
cagtctactc atgtgctatt atctacacct gctttggagg ctgtgtttac agatttggag     1800
attcttgcag caattttttgc cagtgcaata catgatgtag atcatcctgg tgtgtccaat     1860
caatttctga tcaatacaaa ctctgaactt gccttgatgt acaatgattc ctcagtctta     1920
gagaaccatc atttggctgt gggctttaaa ttgcttcagg aagaaaactg tgacattttc     1980
cagaatttga ccaaaaaaca aagacaatct ttaaggaaaa tggtcattga catcgtactt     2040
gcaacagata tgtcaaaaca catgaatcta ctggctgatt tgaagactat ggttgaaact     2100
aagaaagtga caagctctgg agttcttctt cttgataatt attccgatag gattcaggtt     2160
cttcagaata tggtgcactg tgcagatctg agcaacccaa caaagcctct ccagctgtac     2220
cgccagtgga cggaccggat aatggaggag ttcttccgcc aaggagaccg agagagggaa     2280
cgtggcatgg agataagccc catgtgtgac aagcacaatg cttccgtgga aaaatcacag     2340
gtgggcttca tagactatat tgttcatccc ctctgggaga catgggcaga cctcgtccac     2400
cctgacgccc aggatatttt ggacactttg gaggacaatc gtgaatggta ccagagcaca     2460
atccctcaga gccctctcc tgcacctgat gacccagagg agggccggca gggtcaaact     2520
gagaaattcc agtttgaact aactttagag gaagatggtg agtcagacac ggaaaaggac     2580
```

-continued

```
agtggcagtc aagtggaaga agacactagc tgcagtgact ccaagactct ttgtactcaa    2640
gactcagagt ctactgaaat tccccttgat gaacaggttg aagaggaggc agtaggggaa    2700
gaagaggaaa gccagcctga agcctgtgtc atagatgatc gttctcctga cacgtaacag    2760
tgcaaaaact ttcatgcctt tttttttttt aagtagaaaa attgtttcca aagtgcatgt    2820
cacatgccac aaccacggtc acacctcact gtcatctgcc aggacgtttg ttgaacaaaa    2880
ctgaccttga ctactcagtc cagcgctcag gaatatcgta accagttttt tcacctccat    2940
gtcatccgag caaggtggac atcttcacga acagcgtttt taacaagatt tcagcttggt    3000
agagctgaca aagcagataa aatctactcc aaattatttt caagagagtg tgactcatca    3060
ggcagcccaa aagtttattg gacttggggt ttctattcct ttttatttgt ttgcaatatt    3120
ttcagaagaa aggcattgca cagagtgaac ttaatggacg aagcaacaaa tatgtcaaga    3180
acaggacata gcacgaatct gttaccagta ggaggaggat gagccacaga aattgcataa    3240 tttttctaatt tcaagtcttc ctgatacatg actgaatagt gtggttcagt gagctgcact    3300
gacctctaca ttttgtatga tatgtaaaac agatttttttg tagagcttac ttttattatt    3360
aaatgtattg aggtattata tttaaaaaaa actatgttca gaacttcatc tgccactggt    3420 tattttttttc taaggagtaa cttgcaagtt ttcagtacaa atctgtgcta cactggataa    3480
aaatctaatt tatgaatttt acttgcacct tatagttcat agcaattaac tgatttgtag    3540
tgattcattg tttgttttat ataccaatga cttccatatt ttaaaagaga aaacaacatt    3600
tatgttgcag gaaacccttt ttgtaagtct ttattattta ctttgcattt tgtttcactc    3660
tttccagata agcagagttg ctcttcacca gtgttttttct tcatgtgcaa agtgactatt    3720
tgttctataa tacttttatg tgtgttatat caaatgtgtc ttaagcttca tgcaaactca    3780
gtcatcagtt cgtgttgtct gaagcaagtg ggagatatat aaatacccag tagctaaaat    3840
ggtcagtctt ttttagatgt tttcctactt agtatctcct aataacgttt tgctgtgtca    3900
ctagatgttc atttcacaag tgcatgtctt tctaataatc cacacatttc atgctctaat    3960
aatccacaca tttcatgctc atttttattg ttttttacagc cagttatagt aagaaaaagg    4020 ttttttcccct tgtgctgctt tataatttag cgtgtgtctg aaccttatcc atgtttgcta    4080
gatgaggtct tgtcaaatat atcactacca ttgtcaccgg tgaaaagaaa caggtagtta    4140
agttagggtt aacattcatt tcaaccacga ggttgtatat catgactagc ttttactctt    4200
ggtttacaga gaaagttaa acagccaact aggcagtttt taagaatatt aacaatatat    4260
taacaaacac caatacaact aatcctattt ggttttaatg atttcaccat gggattaaga    4320
actatatcag gaacatccct gagaaacggt tttaagtgta gcaactactc ttccttaatg    4380
gacagccaca taacgtgtag gaagtccttt atcacttatc ctcgatccat aagcatatct    4440
tgcagagggg aactacttct ttaaacacat ggagggaaag aagatgatgc cactggcacc    4500
agagggttag tactgtgatg catcctaaaa tatttattat attggtaaaa attctggtta    4560
aataaaaaat tagagatcac tcttggctga tttcagcacc aggaactgta ttacagtttt    4620
agagattaat tcctagtgtt tacctgatta tagcagttgg catcatgggg catttaattc    4680
tgactttatc cccacgtcag ccttaataaa gtcttcttta ccttctctat gaagactttta   4740 aagcccaaat aatcattttt cacattgata ttcaagaatt gagatagata gaagccaaag    4800
tgggtatctg acaagtggaa aatcaaacgt ttaagaagaa ttacaactct gaaaagcatt    4860
tatatgtgga acttctcaag gagcctcctg gggactggaa agtaagtcat cagccaggca    4920
aatgactcat gctgaagaga gtccccatttt cagtcccctg agatctagct gatgcttaga    4980
```

```
tcctttgaaa taaaaattat gtctttataa ctctgatctt ttacataaag cagaagagga    5040
atcaactagt taattgcaag gtttctactc tgtttcctct gtaaagatca gatggtaatc    5100
tttcaaataa gaaaaaaata aagacgtatg tttgaccaag tagtttcaca agaatatttg    5160
ggaacttgtt tcttttaatt ttatttgtcc ctgagtgaag tctagaaaga aaggtaaaga    5220
gtctagagtt tattcctctt tccaaaacat tctcattcct ctcctcccta cacttagtat    5280
ttcccccaca gagtgcctag aatcttaata atgaataaaa taaaaagcag caatatgtca    5340
ttaacaaatc cagacctgaa agggtaaagg gtttataact gcactaataa agagaggctc    5400 ttttttttc ttccagtttg ttggtttta atggtaccgt gttgtaaaga tacccactaa     5460
tggacaatca aattgcagaa aaggctcaat atccaagaga cagggactaa tgcactgtac    5520
aatctgctta tccttgccct tctctcttgc caaagtgtgc ttcagaaata tatactgctt    5580 taaaaagaa taaagaata tccttttaca agtggcttta catttcctaa aatgccataa      5640
gaaaatgcaa tatctgggta ctgtatgggg aaaaaaatgt ccaagtttgt gtaaaaccag    5700
tgcatttcag cttgcaagtt actgaacaca ataatgctgt tttaattttg ttttatatca    5760
gttaaaattc acaataatgt agatagaaca aattacagac aaggaaagaa aaaacttgaa    5820
tgaaatggat tttacagaaa gctttatgat aattttttgaa tgcattattt attttttgtg   5880
ccatgcattt tttttctcac caaatgacct tacctgtaat acagtcttgt ttgtctgttt    5940
acaaccatgt atttattgca atgtacatac tgtaatgtta attgtaaatt atctgttctt    6000
attaaaacat catcccatga tgggatggtg ttgatatatt tggaaactct tggtgagaga    6060
atgaatggtg tgtatacata ctctgtacat ttttctttc cctgtaata tagtcttgtc      6120 accttagagc ttgtttatgg aagattcaag aaaactataa aatacttaaa gatatataaa    6180
tttaaaaaaa catagctgca ggtctttggt cccagggctg tgccttaact ttaaccaata    6240
ttttcttctg ttttgctgca tttgaaaggt aacagtggag ctagggctgg gcattttaca    6300
tccaggcttt taattgatta gaattctgcc aataggtgga ttttacaaaa ccacagacaa    6360
cctctgaaag attctgagac ccttttgaga cagaagctct taagtacttc ttgccaggga   6420
gcagcactgc atgtgtgatg gttgtttgcc atctgttgat caggaactac ttcagctact    6480
tgcatttgat tatttccttt tttttttttt ttaactcgga aacacaactg gggaaatata    6540
ttctttccca gtgattataa acaatctttt tctttttttt aagtccttt ggcttctaga     6600 gctcatagga aaatggactt gatttgaaat tggagccaga gtttactcgt gttggttatc    6660
tattcatcag cttcctgaca tgttaagaga atacattaaa gagaaaatac tgtttttaa     6720 tcctaaaatt tttcttccac taagataaac caaatgtcct tacatatatg taaacccatc    6780
tatttaaacg caaggtgggg ttgatgtcag tttacatagc agaaagcatt cactatcctc    6840
taagatttgt ttctgcaaaa cttttcattgc tttagaattt taaaatttca ccttgtacaa   6900
tggccagccc ctaaagcagg aaacatttat aatggattat atgaaacat cctcccagta     6960 cttgcccagc ccttgaatca tgtggctttt cagtgaaagg aaagattctt tttctaggaa    7020
aaatgagcct attttatttt attttatttt attttttgac acaaactgta gattttagca    7080
gccctggccc aaaggaattt gattactttt gttttaaaca gtacaagggg acactataa    7140 ttacaaaaac atccttaact gatttgagtt gttttatttt ctttggatat attttcagag    7200
tggtaaattg tgtgtgagaa ttacaaatga ttattctttt agtggtttct tagcctctct    7260
tacagcccac ggggatagta ctgtacatca ataccttcat atgaaatttt tatatgcaat    7320
```

-continued

```
gaaaataaaa gcatgggttg attctgccta tttatgactc aatcttttac aaataaaaga    7380
ttattcattt taaattatag ttcaatcagc atgtctctta ggatactgaa cgtggttgaa    7440
atgaaaggat agtgacatca taagttagta ctgatattca taaccaaata aagccaactt    7500
gagtaatttt gctacattaa aaattaccaa aattacttag atggcctata agattaagca    7560
tggtgttttc taagcaagct ttgaaagggg ccttccatac ttacttaatt gaatattctg    7620
ggatattgaa aattattcag atacttgaca attatttttg gttacctact ccgcaaacta    7680
caaagtttta aggactcaac aataagttaa tgagacacag tgtttgcttt catggagctt    7740
acagtctgga ggggacaaag gcttaaacaa tactcatata attatatatg tgatcagtac    7800
aatgaaggag ctcagtgggg taaataagca ggaacctgaa cttgatctgt tccggagggc    7860
cacagaaggc ttccttgagg ccttgagaaa gtgatttgca tctgagttct gaaggattgt    7920
aagaggtaac tagggaaaaa gttgacagga agaggaaggg gatccagaca agaaacattt    7980
gcaaagatct tgaggcataa atgagcttga gacatctgga gaaactgagg aaaagtgaga    8040
gagtaggcag ggcctggagc cgcagagcca ttgctaacca tcctgtgtga gatatccccc    8100
attctgtagc tttattctca taaccctgct caattttctt tataacactt ctcacagatt    8160
tatatacgtg tttgtttttg ttatctgtct ctcccaccag accacagctc catgagagca    8220
aggtctttgc ttaccaatat atcactagca cttaaaacta tgcctggtac acagtaggtt    8280
cttaatatgt gttgaatata gccatcaaat tgatattgga tataattcaa tctgataaga    8340
tattttgaga tattaaagag tttttaactt gataccataa aaaaaaaaaa aaaaa         8395
```

<210> SEQ ID NO 15
<211> LENGTH: 679
<212> TYPE: PRT
<213> ORGANISM: Homo sapiens

<400> SEQUENCE: 15

```
Met Ser Ile Ile Met Lys Pro Arg Ser Arg Ser Thr Ser Ser Leu Arg
1               5                   10                  15

Thr Ala Glu Ala Val Cys Phe Asp Val Asp Asn Gly Thr Ser Ala Gly
            20                  25                  30

Arg Ser Pro Leu Asp Pro Met Thr Ser Pro Gly Ser Gly Leu Ile Leu
        35                  40                  45

Gln Ala Asn Phe Val His Ser Gln Arg Arg Glu Ser Phe Leu Tyr Arg
    50                  55                  60

Ser Asp Ser Asp Tyr Asp Leu Ser Pro Lys Ser Met Ser Arg Asn Ser
65                  70                  75                  80

Ser Ile Ala Ser Asp Ile His Gly Asp Asp Leu Ile Val Thr Pro Phe
                85                  90                  95

Ala Gln Val Leu Ala Ser Leu Arg Thr Val Arg Asn Asn Phe Ala Ala
            100                 105                 110

Leu Thr Asn Leu Gln Asp Arg Ala Pro Ser Lys Arg Ser Pro Met Cys
        115                 120                 125

Asn Gln Pro Ser Ile Asn Lys Ala Thr Ile Thr Glu Glu Ala Tyr Gln
    130                 135                 140

Lys Leu Ala Ser Glu Thr Leu Glu Glu Leu Asp Trp Cys Leu Asp Gln
145                 150                 155                 160

Leu Glu Thr Leu Gln Thr Arg His Ser Val Ser Glu Met Ala Ser Asn
                165                 170                 175

Lys Phe Lys Arg Met Leu Asn Arg Glu Leu Thr His Leu Ser Glu Met
            180                 185                 190
```

Ser Arg Ser Gly Asn Gln Val Ser Glu Phe Ile Ser Asn Thr Phe Leu
    195                 200                 205

Asp Lys Gln His Glu Val Glu Ile Pro Ser Pro Thr Gln Lys Glu Lys
210                 215                 220

Glu Lys Lys Lys Arg Pro Met Ser Gln Ile Ser Gly Val Lys Lys Leu
225                 230                 235                 240

Met His Ser Ser Ser Leu Thr Asn Ser Ser Ile Pro Arg Phe Gly Val
                245                 250                 255

Lys Thr Glu Gln Glu Asp Val Leu Ala Lys Glu Leu Glu Asp Val Asn
            260                 265                 270

Lys Trp Gly Leu His Val Phe Arg Ile Ala Glu Leu Ser Gly Asn Arg
        275                 280                 285

Pro Leu Thr Val Ile Met His Thr Ile Phe Gln Glu Arg Asp Leu Leu
    290                 295                 300

Lys Thr Phe Lys Ile Pro Val Asp Thr Leu Ile Thr Tyr Leu Met Thr
305                 310                 315                 320

Leu Glu Asp His Tyr His Ala Asp Val Ala Tyr His Asn Asn Ile His
                325                 330                 335

Ala Ala Asp Val Val Gln Ser Thr His Val Leu Leu Ser Thr Pro Ala
            340                 345                 350

Leu Glu Ala Val Phe Thr Asp Leu Glu Ile Leu Ala Ala Ile Phe Ala
        355                 360                 365

Ser Ala Ile His Asp Val Asp His Pro Gly Val Ser Asn Gln Phe Leu
    370                 375                 380

Ile Asn Thr Asn Ser Glu Leu Ala Leu Met Tyr Asn Asp Ser Ser Val
385                 390                 395                 400

Leu Glu Asn His His Leu Ala Val Gly Phe Lys Leu Leu Gln Glu Glu
                405                 410                 415

Asn Cys Asp Ile Phe Gln Asn Leu Thr Lys Lys Gln Arg Gln Ser Leu
            420                 425                 430

Arg Lys Met Val Ile Asp Ile Val Leu Ala Thr Asp Met Ser Lys His
        435                 440                 445

Met Asn Leu Leu Ala Asp Leu Lys Thr Met Val Glu Thr Lys Lys Val
    450                 455                 460

Thr Ser Ser Gly Val Leu Leu Leu Asp Asn Tyr Ser Asp Arg Ile Gln
465                 470                 475                 480

Val Leu Gln Asn Met Val His Cys Ala Asp Leu Ser Asn Pro Thr Lys
                485                 490                 495

Pro Leu Gln Leu Tyr Arg Gln Trp Thr Asp Arg Ile Met Glu Glu Phe
            500                 505                 510

Phe Arg Gln Gly Asp Arg Glu Arg Glu Arg Gly Met Glu Ile Ser Pro
        515                 520                 525

Met Cys Asp Lys His Asn Ala Ser Val Glu Lys Ser Gln Val Gly Phe
    530                 535                 540

Ile Asp Tyr Ile Val His Pro Leu Trp Glu Thr Trp Ala Asp Leu Val
545                 550                 555                 560

His Pro Asp Ala Gln Asp Ile Leu Asp Thr Leu Glu Asp Asn Arg Glu
                565                 570                 575

Trp Tyr Gln Ser Thr Ile Pro Gln Ser Pro Ser Pro Ala Pro Asp Asp
            580                 585                 590

Pro Glu Glu Gly Arg Gln Gly Gln Thr Glu Lys Phe Gln Phe Glu Leu
        595                 600                 605

```
Thr Leu Glu Glu Asp Gly Glu Ser Asp Thr Glu Lys Asp Ser Gly Ser
    610                 615                 620

Gln Val Glu Glu Asp Thr Ser Cys Ser Asp Ser Lys Thr Leu Cys Thr
625                 630                 635                 640

Gln Asp Ser Glu Ser Thr Glu Ile Pro Leu Asp Glu Gln Val Glu Glu
            645                 650                 655

Glu Ala Val Gly Glu Glu Glu Ser Gln Pro Glu Ala Cys Val Ile
        660                 665                 670

Asp Asp Arg Ser Pro Asp Thr
        675

<210> SEQ ID NO 16
<211> LENGTH: 26
<212> TYPE: DNA
<213> ORGANISM: Artificial Sequence
<220> FEATURE:
<223> OTHER INFORMATION: PDE4D9_forward primer

<400> SEQUENCE: 16
atgagcatta ttatgaagcc aagatc                                          26

<210> SEQ ID NO 17
<211> LENGTH: 22
<212> TYPE: DNA
<213> ORGANISM: Artificial Sequence
<220> FEATURE:
<223> OTHER INFORMATION: PDE4D9_reverse primer

<400> SEQUENCE: 17
gtgccattgt ccacatcaaa ac                                              22

<210> SEQ ID NO 18
<211> LENGTH: 27
<212> TYPE: DNA
<213> ORGANISM: Artificial Sequence
<220> FEATURE:
<223> OTHER INFORMATION: PDE4D9 probe

<400> SEQUENCE: 18
ctacaagttc cctaaggact gcagagg                                         27

<210> SEQ ID NO 19
<211> LENGTH: 1435
<212> TYPE: DNA
<213> ORGANISM: Homo sapiens

<400> SEQUENCE: 19
ggcggggcct gcttctcctc agcttcaggc ggctgcgacg agccctcagg cgaacctctc     60
ggctttcccg cgcggcgccg cctcttgctg cgcctccgcc tcctcctctg ctccgccacc    120
ggcttcctcc tcctgagcag tcagcccgcg cgccggccgg ctccgttatg gcgacccgca    180
gccctggcgt cgtgattagt gatgatgaac caggttatga ccttgattta ttttgcatac    240
ctaatcatta tgctgaggat ttggaaaggg tgtttattcc tcatggacta attatggaca    300
ggactgaacg tcttgctcga gatgtgatga aggagatggg aggccatcac attgtagccc    360
tctgtgtgct caagggggc tataaattct ttgctgacct gctggattac atcaaagcac    420
tgaatagaaa tagtgataga tccattccta tgactgtaga ttttatcaga ctgaagagct    480
attgtaatga ccagtcaaca ggggacataa aagtaattgg tggagatgat ctctcaactt    540
taactggaaa gaatgtcttg attgtggaag atataattga cactggcaaa acaatgcaga    600
```

```
ctttgctttc cttggtcagg cagtataatc caaagatggt caaggtcgca agcttgctgg    660
tgaaaaggac cccacgaagt gttggatata agccagactt tgttggattt gaaattccag    720
acaagtttgt tgtaggatat gcccttgact ataatgaata cttcagggat ttgaatcatg    780
tttgtgtcat tagtgaaact ggaaaagcaa aatacaaagc ctaagatgag agttcaagtt    840
gagtttggaa acatctggag tcctattgac atcgccagta aaattatcaa tgttctagtt    900
ctgtggccat ctgcttagta gacttttttg catgtatctt ctaagaattt tatctgtttt    960
gtactttaga aatgtcagtt gctgcattcc taaactgttt atttgcacta tgagcctata   1020
gactatcagt tccctttggg cggattgttg tttaacttgt aaatgaaaaa attctcttaa   1080
accacagcac tattgagtga acattgaac tcatatctgt aagaaataaa gagaagatat    1140
attagttttt taattggtat tttaattttt atatatgcag gaaagaatag aagtgattga   1200
atattgttaa ttataccacc gtgtgttaga aaagtaagaa gcagtcaatt ttcacatcaa   1260
agacagcatc taagaagttt tgttctgtcc tggaattatt ttagtagtgt ttcagtaatg   1320
ttgactgtat tttccaactt gttcaaatta ttaccagtga atctttgtca gcagttccct   1380
tttaaatgca aatcaataaa ttcccaaaaa tttaaaaaaa aaaaaaaaaa aaaaa         1435
```

<210> SEQ ID NO 20
<211> LENGTH: 218
<212> TYPE: PRT
<213> ORGANISM: Homo sapiens

<400> SEQUENCE: 20

```
Met Ala Thr Arg Ser Pro Gly Val Val Ile Ser Asp Asp Glu Pro Gly
1               5                   10                  15

Tyr Asp Leu Asp Leu Phe Cys Ile Pro Asn His Tyr Ala Glu Asp Leu
            20                  25                  30

Glu Arg Val Phe Ile Pro His Gly Leu Ile Met Asp Arg Thr Glu Arg
        35                  40                  45

Leu Ala Arg Asp Val Met Lys Glu Met Gly Gly His His Ile Val Ala
    50                  55                  60

Leu Cys Val Leu Lys Gly Gly Tyr Lys Phe Phe Ala Asp Leu Leu Asp
65                  70                  75                  80

Tyr Ile Lys Ala Leu Asn Arg Asn Ser Asp Arg Ser Ile Pro Met Thr
                85                  90                  95

Val Asp Phe Ile Arg Leu Lys Ser Tyr Cys Asn Asp Gln Ser Thr Gly
            100                 105                 110

Asp Ile Lys Val Ile Gly Gly Asp Asp Leu Ser Thr Leu Thr Gly Lys
        115                 120                 125

Asn Val Leu Ile Val Glu Asp Ile Ile Asp Thr Gly Lys Thr Met Gln
    130                 135                 140

Thr Leu Leu Ser Leu Val Arg Gln Tyr Asn Pro Lys Met Val Lys Val
145                 150                 155                 160

Ala Ser Leu Leu Val Lys Arg Thr Pro Arg Ser Val Gly Tyr Lys Pro
                165                 170                 175

Asp Phe Val Gly Phe Glu Ile Pro Asp Lys Phe Val Val Gly Tyr Ala
            180                 185                 190

Leu Asp Tyr Asn Glu Tyr Phe Arg Asp Leu Asn His Val Cys Val Ile
        195                 200                 205

Ser Glu Thr Gly Lys Ala Lys Tyr Lys Ala
    210                 215
```

```
<210> SEQ ID NO 21
<211> LENGTH: 24
<212> TYPE: DNA
<213> ORGANISM: Artificial Sequence
<220> FEATURE:
<223> OTHER INFORMATION: HPRT1_forward primer

<400> SEQUENCE: 21
gaggatttgg aaagggtgtt tatt                                          24

<210> SEQ ID NO 22
<211> LENGTH: 21
<212> TYPE: DNA
<213> ORGANISM: Artificial Sequence
<220> FEATURE:
<223> OTHER INFORMATION: HPRT1_reverse primer

<400> SEQUENCE: 22
acagagggct acaatgtgat g                                             21

<210> SEQ ID NO 23
<211> LENGTH: 26
<212> TYPE: DNA
<213> ORGANISM: Artificial Sequence
<220> FEATURE:
<223> OTHER INFORMATION: HPRT1 probe

<400> SEQUENCE: 23
acgtcttgct cgagatgtga tgaagg                                        26

<210> SEQ ID NO 24
<211> LENGTH: 1771
<212> TYPE: DNA
<213> ORGANISM: Homo sapiens

<400> SEQUENCE: 24
ggcggccagg ccgggcgcgg agtgggcgcg cggggccgga ggaggggcca gcgaccgcgg    60
caccgcctgt gcccgcccgc ccctccgcag ccgctactta agaggctcca gcgccggccc   120
cgccctagtg cgttacttac ctcgactctt agcttgtcgg ggacggtaac cgggacccgg   180
tgtctgctcc tgtcgccttc gcctcctaat ccctagccac tatgcgtgag tgcatctcca   240
tccacgttgg ccaggctggt gtccagattg gcaatgcctg ctgggagctc tactgcctgg   300
aacacggcat ccagcccgat ggccagatgc caagtgacaa gaccattggg ggaggagatg   360
actccttcaa caccttcttc agtgagacgg gcgctggcaa gcacgtgccc cgggctgtgt   420
ttgtagactt ggaacccaca gtcattgatg aagttcgcac tggcacctac cgccagctct   480
tccaccctga gcagctcatc acaggcaagg aagatgctgc caataactat gcccgagggc   540
actacaccat tggcaaggag atcattgacc ttgtgttgga ccgaattcgc aagctggctg   600
accagtgcac cggtcttcag ggcttcttgg ttttccacag ctttggtggg gaactggtt   660 ctgggttcac ctcccctgctc atggaacgtc tctcagttga ttatgcaag aagtccaagc   720 tggagttctc catttaccca gcaccccagg tttccacagc tgtagttgag ccctacaact   780
ccatcctcac cacccacacc accctggagc actctgattg tgccttcatg gtagacaatg   840
aggccatcta tgacatctgt cgtagaaacc tcgatatcga gcgccaacc tacactaacc   900 ttaaccgcct tattagccag attgtgtcct ccatcactgc ttccctgaga tttgatggag   960
ccctgaatgt tgacctgaca gaattccaga ccaacctggt gccctacccc cgcatccact  1020
tccctctggc cacatatgcc cctgtcatct ctgctgagaa agcctaccat gaacagcttt  1080
```

```
ctgtagcaga gatcaccaat gcttgctttg agccagccaa ccagatggtg aaatgtgacc   1140
ctcgccatgg taaatacatg gcttgctgcc tgttgtaccg tggtgacgtg gttcccaaag   1200
atgtcaatgc tgccattgcc accatcaaaa ccaagcgcag catccagttt gtggattggt   1260
gccccactgg cttcaaggtt ggcatcaact accagcctcc cactgtggtg cctggtggag   1320
acctggccaa ggtacagaga gctgtgtgca tgctgagcaa caccacagcc attgctgagg   1380
cctgggctcg cctggaccac aagtttgacc tgatgtatgc caagcgtgcc tttgttcact   1440
ggtacgtggg tgaggggatg gaggaaggcg agttttcaga ggcccgtgaa gatatggctg   1500
cccttgagaa ggattatgag gaggttggtg tggattctgt tgaaggagag ggtgaggaag   1560
aaggagagga atactaatta ccattccttt tggccctgc agcatgtcat gctcccagaa    1620
tttcagcttc agcttaactg acagacgtta aagctttctg gttagattgt tttcacttgg   1680
tgatcatgtc ttttccatgt gtacctgtaa tattttccat tcatatctca aagtaaagtc   1740
attaacatca aaaaaaaaaa aaaaaaaaa a                                    1771
```

<210> SEQ ID NO 25
<211> LENGTH: 451
<212> TYPE: PRT
<213> ORGANISM: Homo sapiens

<400> SEQUENCE: 25

```
Met Arg Glu Cys Ile Ser Ile His Val Gly Gln Ala Gly Val Gln Ile
1               5                   10                  15

Gly Asn Ala Cys Trp Glu Leu Tyr Cys Leu Glu His Gly Ile Gln Pro
            20                  25                  30

Asp Gly Gln Met Pro Ser Asp Lys Thr Ile Gly Gly Gly Asp Asp Ser
        35                  40                  45

Phe Asn Thr Phe Phe Ser Glu Thr Gly Ala Gly Lys His Val Pro Arg
    50                  55                  60

Ala Val Phe Val Asp Leu Glu Pro Thr Val Ile Asp Glu Val Arg Thr
65                  70                  75                  80

Gly Thr Tyr Arg Gln Leu Phe His Pro Glu Gln Leu Ile Thr Gly Lys
                85                  90                  95

Glu Asp Ala Ala Asn Asn Tyr Ala Arg Gly His Tyr Thr Ile Gly Lys
            100                 105                 110

Glu Ile Ile Asp Leu Val Leu Asp Arg Ile Arg Lys Leu Ala Asp Gln
        115                 120                 125

Cys Thr Gly Leu Gln Gly Phe Leu Val Phe His Ser Phe Gly Gly Gly
    130                 135                 140

Thr Gly Ser Gly Phe Thr Ser Leu Leu Met Glu Arg Leu Ser Val Asp
145                 150                 155                 160

Tyr Gly Lys Lys Ser Lys Leu Glu Phe Ser Ile Tyr Pro Ala Pro Gln
                165                 170                 175

Val Ser Thr Ala Val Val Glu Pro Tyr Asn Ser Ile Leu Thr Thr His
            180                 185                 190

Thr Thr Leu Glu His Ser Asp Cys Ala Phe Met Val Asp Asn Glu Ala
        195                 200                 205

Ile Tyr Asp Ile Cys Arg Arg Asn Leu Asp Ile Glu Arg Pro Thr Tyr
    210                 215                 220

Thr Asn Leu Asn Arg Leu Ile Ser Gln Ile Val Ser Ser Ile Thr Ala
225                 230                 235                 240

Ser Leu Arg Phe Asp Gly Ala Leu Asn Val Asp Leu Thr Glu Phe Gln
                245                 250                 255
```

```
Thr Asn Leu Val Pro Tyr Pro Arg Ile His Phe Pro Leu Ala Thr Tyr
            260                 265                 270

Ala Pro Val Ile Ser Ala Glu Lys Ala Tyr His Glu Gln Leu Ser Val
        275                 280                 285

Ala Glu Ile Thr Asn Ala Cys Phe Glu Pro Ala Asn Gln Met Val Lys
    290                 295                 300

Cys Asp Pro Arg His Gly Lys Tyr Met Ala Cys Cys Leu Leu Tyr Arg
305                 310                 315                 320

Gly Asp Val Val Pro Lys Asp Val Asn Ala Ala Ile Ala Thr Ile Lys
                325                 330                 335

Thr Lys Arg Ser Ile Gln Phe Val Asp Trp Cys Pro Thr Gly Phe Lys
            340                 345                 350

Val Gly Ile Asn Tyr Gln Pro Pro Thr Val Val Pro Gly Gly Asp Leu
        355                 360                 365

Ala Lys Val Gln Arg Ala Val Cys Met Leu Ser Asn Thr Thr Ala Ile
    370                 375                 380

Ala Glu Ala Trp Ala Arg Leu Asp His Lys Phe Asp Leu Met Tyr Ala
385                 390                 395                 400

Lys Arg Ala Phe Val His Trp Tyr Val Gly Glu Gly Met Glu Glu Gly
                405                 410                 415

Glu Phe Ser Glu Ala Arg Glu Asp Met Ala Ala Leu Glu Lys Asp Tyr
            420                 425                 430

Glu Glu Val Gly Val Asp Ser Val Glu Gly Glu Gly Glu Glu Glu Gly
        435                 440                 445

Glu Glu Tyr
    450

<210> SEQ ID NO 26
<211> LENGTH: 22
<212> TYPE: DNA
<213> ORGANISM: Artificial Sequence
<220> FEATURE:
<223> OTHER INFORMATION: K-ALPHA-1_forward primer

<400> SEQUENCE: 26
tgactccttc aacaccttct tc                                              22

<210> SEQ ID NO 27
<211> LENGTH: 18
<212> TYPE: DNA
<213> ORGANISM: Artificial Sequence
<220> FEATURE:
<223> OTHER INFORMATION: K-ALPHA-1_reverse primer

<400> SEQUENCE: 27
tgccagtgcg aacttcat                                                   18

<210> SEQ ID NO 28
<211> LENGTH: 24
<212> TYPE: DNA
<213> ORGANISM: Artificial Sequence
<220> FEATURE:
<223> OTHER INFORMATION: K-ALPHA-1 probe

<400> SEQUENCE: 28
ccgggctgtg tttgtagact tgga                                            24

<210> SEQ ID NO 29
<211> LENGTH: 5416
```

<212> TYPE: DNA
<213> ORGANISM: Homo sapiens

<400> SEQUENCE: 29

```
agtgggccgc catgttgtcg gagtgaaagg taaggggggag cgagagcgcc agagagagaa      60
gatcgggggg ctgaaatcca tcttcatcct accgctccgc ccgtgttggt ggaatgagcg     120
ttgcatgtgt cttgaagaga aaagcagtgc tttggcagga ctctttcagc ccccacctga     180
aacatcaccc tcaagaacca gctaatccca acatgcctgt tgttttgaca tctgaacag      240
ggtcgcaagc gcagccacaa ccagctgcaa atcaggctct tgcagctggg actcactcca     300
gccctgtccc aggatctata ggagttgcag gccgttccca ggacgacgct atggtggact     360
acttctttca gaggcagcat ggtgagcagc ttggggagg aggaagtgga ggaggcggct      420
ataataatag caaacatcga tggcctactg gggataacat tcatgcagaa catcaggtgc     480
gttccatgga tgaactgaat catgattttc aagcacttgc tctggaggga gagcgatgg      540
gagagcagct cttgccaggt aaaaagtttt gggaaacaga tgaatccagc aaagatggac     600
caaaaggaat attcctgggt gatcaatggc gagacagtgc ctggggaaca tcagatcatt     660
cagtttccca gccaatcatg gtgcagagaa gacctggtca gagtttccat gtgaacagtg     720
aggtcaattc tgtactgtcc ccacgatcgg agagtggggg actaggcgtt agcatggtgg     780
agtatgtgtt gagctcatcc ccgggcgatt cctgtctaag aaaaggagga tttgcccaa      840
gggatgcaga cagtgatgaa aacgacaaag gtgaaaagaa gaacaagggt acgtttgatg     900
gagataagct aggagatttg aaggaggagg gtgatgtgat ggacaagacc aatggtttac     960
cagtgcagaa tgggattgat gcagacgtca aagatttttag ccgtacccct ggtaattgcc    1020
agaactctgc taatgaagtg gatcttctgg gtccaaacca gaatggttct gagggcttag    1080
cccagctgac cagcaccaat ggtgccaagc ctgtggagga tttctccaac atggagtccc    1140
agagtgtccc cttggacccc atggaacatg tgggcatgga gcctcttcag tttgattatt    1200
caggcacgca ggtacctgtg gactcagcag cagcaactgt gggacttttt gactacaatt    1260
ctcaacaaca gctgttccaa agacctaatg cgcttgctgt ccagcagttg acagctgctc    1320
agcagcagca gtatgcactg gcagctgctc atcagccgca catcggttta gctcccgctg    1380
cgtttgtccc caatccatac atcatcagcg ctgctccccc agggacggac ccctacacag    1440
ctggattggc tgcagcagcg acactaggcc cagctgtggg ccctcaccag tattatggag    1500
ttactccctg gggagtctac cctgccagtc ttttccagca gcaagctgcc gctgccgctg    1560
cagcaactaa ttcagctaat caacagacca ccccacaggc tcagcaagga cagcagcagg    1620
ttctccgtgg aggagccagc caacgtcctt tgaccccaaa ccagaaccag cagggacagc    1680
aaacggatcc ccttgtggca gctgcagcag tgaattctgc ccttgcattt ggacaaggtc    1740
tggcagcagg catgccaggt tatccggtgt tggctcctgc tgcttactat gaccaaactg    1800
gtgcccttgt agtgaatgca ggcgcgagaa atggtcttgg agctcctgtt cgacttgtag    1860
ctcctgcccc agtcatcatt agttcctcag ctgcacaagc agctgttgca gcagccgcag    1920
cttcagcaaa tggagcagct ggtggtcttg ctggaacaac aaatggacca tttcgcccctt    1980
taggaacaca gcagcctcag ccccagcccc agcagcagcc aataacaac ctggcatcca     2040
gttcttttcta cggcaacaac tctctgaaca gcaattcaca gagcagctcc ctcttctccc    2100
agggctctgc ccagctgcc aacacatcct tgggattcgg aagtagcagt tctctcggcg     2160
ccacccctggg atccgcccctt gggagggtttg gaacagcagt tgcaaactcc aacactggca    2220
```

```
gtggctcccg ccgtgactcc ctgactggca gcagtgacct ttataagagg acatcgagca    2280
gcttgacccc cattggacac agttttata acggccttag cttttcctcc tctcctggac     2340
ccgtgggcat gcctctccct agtcagggac caggacattc acagacacca cctccttccc    2400
tctcttcaca tggatcctct tcaagcttaa acctgggagg actcacgaat ggcagtggaa    2460
gatacatctc tgctgctcca ggcgctgaag ccaagtaccg cagtgcaagc agcgcctcca    2520
gcctcttcag cccgagcagc actctttct cttcctctcg tttgcgatat ggaatgtctg     2580
atgtcatgcc ttctggcagg agcaggcttt tggaagattt tcgaaacaac cggtacccca    2640
atttacaact gcgggagatt gctggacata aatggaatt ttcccaagac cagcatgggt     2700
ccagattcat tcagctgaaa ctggagcgtg ccacaccagc tgagcgccag cttgtcttca    2760
atgaaatcct ccaggctgcc taccaactca tggtggatgt gtttggtaat tacgtcattc    2820
agaagttctt tgaatttggc agtcttgaac agaagctggc tttggcagaa cggattcgag    2880
gccacgtcct gtcattggca ctacagatgt atggctgccg tgttatccag aaagctcttg    2940
agtttattcc ttcagaccag caggtaatta tgagatggt tcgggaacta gatggccatg     3000
tcttgaagtg tgtgaaagat cagaatggca atcacgtggt tcagaaatgc attgaatgtg    3060
tacagcccca gtctttgcaa tttatcatcg atgcgtttaa gggacaggta tttgccttat    3120
ccacacatcc ttatggctgc cgagtgattc agagaatcct ggagcactgt ctccctgacc    3180
agacactccc tattttagag gagcttcacc agcacacaga gcagcttgta caggatcaat    3240
atggaaatta tgtaatccaa catgtactgg agcacggtcg tcctgaggat aaaagcaaaa    3300
ttgtagcaga aatccgaggc aatgtacttg tattgagtca gcacaaattt gcaagcaatg    3360
ttgtggagaa gtgtgttact cacgcctcac gtacggagcg cgctgtgctc atcgatgagg    3420
tgtgcaccat gaacgacggt ccccacagtg ccttatacac catgatgaag gaccagtatg    3480
ccaactacgt ggtccagaag atgattgacg tggcggagcc aggccagcgg aagatcgtca    3540
tgcataagat ccggccccac atcgcaactc ttcgtaagta cacctatggc aagcacattc    3600
tggccaagct ggagaagtac tacatgaaga acggtgttga cttagggccc atctgtggcc    3660
cccctaatgg tatcatctga ggcagtgtca cccgctgttc cctcattccc gctgacctca    3720
ctggcccact ggcaaatcca accagcaacc agaaatgttc tagtgtagag tctgagacgg    3780
gcaagtggtt gctccaggat tactccctcc tccaaaaaag gaatcaaatc cacgagtgga    3840
aaagcctttg taaatttaat tttattacac ataacatgta ctattttttt taattgacta    3900
attgccctgc tgttttactg gtgtatagga tacttgtaca taggtaacca atgtacatgg    3960
gaggccacat attttgttca ctgttgtatc tatatttcac atgtggaaac tttcagggtg    4020
gttggtttaa caaaaaaaaa aagctttaaa aaaaaagaa aaaaggaaa aggttttag       4080
ctcatttgcc tggccggcaa gttttgcaaa tagctcttcc ccacctcctc attttagtaa    4140
aaaacaaaca aaaacaaaaa aacctgagaa gtttgaattg tagttaaatg accccaaact    4200
ggcatttaac actgttttata aaaatatat atatatatat atatatatat aatgaaaaag    4260
gtttcagagt tgctaaagct tcagtttgtg acattaagtt tatgaaattc taaaaaatgc    4320
ctttttggga gactatatta tgctgaagaa ggctgttcgt gaggaggaga tgcgagcacc    4380
cagaacgtct tttgaggctg gcgggtgtg attgtttact gcctactgga tttttttcta    4440
ttaacattga aaggtaaaat ctgattattt agcatgagaa aaaaaaatcc aactctgctt    4500
ttggtcttgc ttctataaat atatagtgta tacttggtgt agactttgca tatatacaaa    4560
tttgtagtat tttcttgttt tgatgtctaa tctgtatcta taatgtaccc tagtagtcga    4620
```

| | |
|---|---|
| acatactttt gattgtacaa ttgtacattt gtatacctgt aatgtaaatg tggagaagtt | 4680 |
| tgaatcaaca taaacacgtt ttttggtaag aaaagagaat tagccagccc tgtgcattca | 4740 |
| gtgtatattc tcaccttta tggtcgtagc atatagtgtt gtatattgta aattgtaatt | 4800 |
| tcaaccagaa gtaaatttt ttcttttgaa ggaataaatg ttctttatac agcctagtta | 4860 |
| atgtttaaaa agaaaaaaat agcttggttt tatttgtcat ctagtctcaa gtatagcgag | 4920 |
| attctttcta aatgttattc aagattgagt tctcactagt gttttttaa tcctaaaaaa | 4980 |
| gtaatgtttt gattttgtga cagtcaaaag gacgtgcaaa agtctagcct tgcccgagct | 5040 |
| ttccttacaa tcagagcccc tctcaccttg taaagtgtga atcgccctc cctttttgtac | 5100 |
| agaagatgaa ctgtattttg cattttgtct acttgtaagt gaatgtaaca tactgtcaat | 5160 |
| tttccttgtt tgaatataga attgtaacac tacacggtgt acatttccag agccttgtgt | 5220 |
| atatttccaa tgaactttt tgcaagcaca cttgtaacca tatgtgtata attaacaaac | 5280 |
| ctgtgtatgc ttatgcctgg gcaactattt ttttgtaactc ttgtgtagat tgtctctaaa | 5340 |
| caatgtgtga tctttatttt gaaaaataca gaactttgga atctgaaaaa aaaaaaaaa | 5400 |
| aaaaaaaaaa aaaaa | 5416 |

<210> SEQ ID NO 30
<211> LENGTH: 5410
<212> TYPE: DNA
<213> ORGANISM: Homo sapiens

<400> SEQUENCE: 30

| | |
|---|---|
| agtgggccgc catgttgtcg gagtgaaagg taaggggag cgagagcgcc agagagagaa | 60 |
| gatcgggggg ctgaaatcca tcttcatcct accgctccgc ccgtgttggt ggaatgagcg | 120 |
| ttgcatgtgt cttgaagaga aaagcagtgc tttggcagga ctctttcagc ccccacctga | 180 |
| aacatcaccc tcaagaacca gctaatccca acatgcctgt tgttttgaca tctggaacag | 240 |
| ggtcgcaagc gcagccacaa ccagctgcaa atcaggctct tgcagctggg actcactcca | 300 |
| gccctgtccc aggatctata ggagttgcag gccgttccca ggacgacgct atggtggact | 360 |
| acttctttca gaggcagcat ggtgagcagc ttggggagg aggaagtgga ggaggcggct | 420 |
| ataataatag caaacatcga tggcctactg gggataacat tcatgcagaa catcaggtgc | 480 |
| gttccatgga tgaactgaat catgattttc aagcacttgc tctggaggga agagcgatgg | 540 |
| gagagcagct cttgccaggt aaaaagtttt gggaaacaga tgaatccagc aaagatggac | 600 |
| caaaaggaat attcctgggt gatcaatggc gagacagtgc ctggggaaca tcagatcatt | 660 |
| cagtttccca gccaatcatg gtgcagagaa gacctggtca gagtttccat gtgaacagtg | 720 |
| aggtcaattc tgtactgtcc ccacgatcgg agagtggggg actaggcgtt agcatggtgg | 780 |
| agtatgtgtt gagctcatcc ccgggcgatt cctgtctaag aaaaggagga tttggcccaa | 840 |
| gggatgcaga cagtgatgaa aacgacaaag gtgaaaagaa gaacaagggt acgtttgatg | 900 |
| gagataagct aggagatttg aaggaggagg gtgatgtgat ggacaagacc aatggtttac | 960 |
| cagtgcagaa tgggattgat gcagacgtca aagattttag ccgtaccccct ggtaattgcc | 1020 |
| agaactctgc taatgaagtg atcttctgg gtccaaacca gaatggttct gagggcttag | 1080 |
| cccagctgac cagcaccaat ggtgccaagc ctgtggagga tttctccaac atggagtccc | 1140 |
| agagtgtccc cttggacccc atggaacatg tgggcatgga gcctcttcag tttgattatt | 1200 |
| caggcacgca ggtacctgtg gactcagcag cagcaactgt gggactttt gactacaatt | 1260 |

-continued

```
ctcaacaaca gctgttccaa agacctaatg cgcttgctgt ccagcagttg acagctgctc    1320
agcagcagca gtatgcactg gcagctgctc atcagccgca catcggttta gctcccgctg    1380
cgtttgtccc caatccatac atcatcagcg ctgctccccc agggacggac ccctacacag    1440
ctggattggc tgcagcagcg acactaggcc cagctgtggt ccctcaccag tattatggag    1500
ttactccctg gggagtctac cctgccagtc ttttccagca gcaagctgcc gctgccgctg    1560
cagcaactaa ttcagctaat caacagacca ccccacaggc tcagcaagga cagcagcagg    1620
ttctccgtgg aggagccagc caacgtcctt tgaccccaaa ccagaaccag cagggacagc    1680
aaacggatcc ccttgtggca gctgcagcag tgaattctgc ccttgcattt ggacaaggtc    1740
tggcagcagg catgccaggt tatccggtgt tggctcctgc tgcttactat gaccaaactg    1800
gtgcccttgt agtgaatgca ggcgcgagaa atggtcttgg agctcctgtt cgacttgtag    1860
ctcctgcccc agtcatcatt agttcctcag ctgcacaagc agctgttgca gcagccgcag    1920
cttcagcaaa tggagcagct ggtggtcttg ctggaacaac aaatggacca tttcgccctt    1980
taggaacaca gcagcctcag ccccagcccc agcagcagcc caataacaac ctggcatcca    2040
gttctttcta cggcaacaac tctctgaaca gcaattcaca gagcagctcc ctcttctccc    2100
agggctctgc ccagcctgcc aacacatcct gggattcgg aagtagcagt tctctcggcg    2160
ccaccctggg atccgccctt ggagggtttg aacagcagt tgcaaactcc aacactggca    2220
gtggctcccg ccgtgactcc ctgactggca gcagtgacct ttataagagg acatcgagca    2280
gcttgacccc cattggacac agttttata cggccttag cttttcctcc tctcctggac    2340
ccgtgggcat gcctctccct agtcagggac caggacattc acagacacca cctccttccc    2400
tctcttcaca tggatcctct tcaagcttaa acctgggagg actcacgaat ggcagtggaa    2460
gatacatctc tgctgctcca ggcgctgaag ccaagtaccg cagtgcaagc agcgcctcca    2520
gcctcttcag cccgagcagc actctttttct cttcctctcg tttgcgatat ggaatgtctg    2580
atgtcatgcc ttctggcagg agcaggcttt tggaagattt tcgaaacaac cggtaccca    2640
atttacaact gcgggagatt gctggacata taatggaatt ttcccaagac cagcatgggt    2700
ccagattcat tcagctgaaa ctggagcgtg ccacaccagc tgagcgccag cttgtcttca    2760
atgaaatcct ccaggctgcc taccaactca tggtggatgt gtttggtaat tacgtcattc    2820
agaagttctt tgaatttggc agtcttgaac agaagctggc tttggcagaa cggattcgag    2880
gccacgtcct gtcattggca ctacagatgt atggctgccg tgttatccag aaagctcttg    2940
agtttattcc ttcagaccag cagaatgaga tggttcggga actagatggc catgtcttga    3000
agtgtgtgaa agatcagaat ggcaatcacg tggttcagaa atgcattgaa tgtgtacagc    3060
cccagtctt gcaatttatc atcgatgcgt ttaagggaca ggtatttgcc ttatccacac    3120
atccttatgg ctgccgagtg attcagagaa tcctggagca ctgtctccct gaccagacac    3180
tccctatttt agaggagctt caccagcaca cagagcagct tgtacaggat caatatggaa    3240
attatgtaat ccaacatgta ctggagcacg tcgtcctga ggataaaagc aaaattgtag    3300
cagaaatccg aggcaatgta cttgtattga gtcagcacaa atttgcaagc aatgttgtgg    3360
agaagtgtgt tactcacgcc tcacgtacgg agcgcgctgt gctcatcgat gaggtgtgca    3420
ccatgaacga cggtccccac agtgccttat acaccatgat gaaggaccag tatgccaact    3480
acgtggtcca gaagatgatt gacgtggcgg agccaggcca gcggaagatc gtcatgcata    3540
agatccggcc ccacatcgca actcttcgta agtacaccta tggcaagcac attctggcca    3600
agctggagaa gtactacatg aagaacggtg ttgacttagg gcccatctgt ggccccccta    3660
```

-continued

```
atggtatcat ctgaggcagt gtcacccgct gttccctcat tcccgctgac ctcactggcc    3720
cactggcaaa tccaaccagc aaccagaaat gttctagtgt agagtctgag acgggcaagt    3780
ggttgctcca ggattactcc ctcctccaaa aaggaatcaa atccacgag tggaaaagcc     3840
tttgtaaatt taattttatt acacataaca tgtactattt ttttttaattg actaattgcc   3900
ctgctgtttt actggtgtat aggatacttg tacataggta accaatgtac atgggaggcc   3960
acatattttg ttcactgttg tatctatatt tcacatgtgg aaactttcag ggtggttggt   4020
ttaacaaaaa aaaaaagctt taaaaaaaaa agaaaaaaag gaaaaggttt ttagctcatt    4080
tgcctggccg gcaagttttg caaatagctc ttccccacct cctcatttta gtaaaaaaca   4140
aacaaaaaca aaaaaacctg agaagtttga attgtagtta aatgacccca aactggcatt   4200
taacactgtt tataaaaaat atatatatat atatatatat atataatgaa aaaggtttca   4260
gagttgctaa agcttcagtt tgtgacatta agtttatgaa attctaaaaa atgcctttt    4320
tggagactat attatgctga agaaggctgt tcgtgaggag gagatgcgag cacccagaac   4380
gtcttttgag gctgggcggg tgtgattgtt tactgcctac tggatttttt tctattaaca   4440
ttgaaaggta aaatctgatt atttagcatg agaaaaaaaa atccaactct gcttttggtc    4500
ttgcttctat aaatatatag tgtatacttg gtgtagactt tgcatatata caaatttgta   4560
gtattttctt gttttgatgt ctaatctgta tctataatgt accctagtag tcgaacatac    4620
ttttgattgt acaattgtac atttgtatac ctgtaatgta aatgtggaga gtttgaatc    4680
aacataaaca cgtttttttgg taagaaaaga gaattagcca gccctgtgca ttcagtgtat   4740
attctcacct tttatggtcg tagcatatag tgttgtatat tgtaaattgt aatttcaacc    4800
agaagtaaat ttttttcttt tgaaggaata aatgttcttt atacagccta gttaatgttt   4860
aaaaagaaaa aaatagcttg gttttatttg tcatctagtc tcaagtatag cgagattctt    4920
tctaaatgtt attcaagatt gagttctcac tagtgttttt ttaatcctaa aaagtaatg    4980
ttttgatttt gtgacagtca aaaggacgtg caaaagtcta gccttgcccg agctttcctt    5040
acaatcagag cccctctcac cttgtaaagt gtgaatcgcc cttcccttttt gtacagaaga   5100
tgaactgtat tttgcatttt gtctacttgt aagtgaatgt aacatactgt caatttttcct   5160
tgtttgaata tagaattgta acactacacg gtgtacattt ccagagcctt gtgtatattt   5220
ccaatgaact ttttttgcaag cacacttgta accatatgtg tataattaac aaacctgtgt    5280
atgcttatgc ctgggcaact attttttgta actcttgtgt agattgtctc taaacaatgt   5340
gtgatcttta ttttgaaaaa tacagaactt tggaatctga aaaaaaaaaa aaaaaaaaa     5400
aaaaaaaaaa                                                          5410
```

<210> SEQ ID NO 31
<211> LENGTH: 1188
<212> TYPE: PRT
<213> ORGANISM: Homo sapiens

<400> SEQUENCE: 31

```
Met Ser Val Ala Cys Val Leu Lys Arg Lys Ala Val Leu Trp Gln Asp
1               5                   10                  15

Ser Phe Ser Pro His Leu Lys His His Pro Gln Glu Pro Ala Asn Pro
            20                  25                  30

Asn Met Pro Val Val Leu Thr Ser Gly Thr Gly Ser Gln Ala Gln Pro
        35                  40                  45

Gln Pro Ala Ala Asn Gln Ala Leu Ala Ala Gly Thr His Ser Ser Pro
```

-continued

```
                50                  55                  60
Val Pro Gly Ser Ile Gly Val Ala Gly Arg Ser Gln Asp Asp Ala Met
 65                  70                  75                  80

Val Asp Tyr Phe Phe Gln Arg Gln His Gly Glu Gln Leu Gly Gly Gly
                 85                  90                  95

Gly Ser Gly Gly Gly Gly Tyr Asn Asn Ser Lys His Arg Trp Pro Thr
                100                 105                 110

Gly Asp Asn Ile His Ala Glu His Gln Val Arg Ser Met Asp Glu Leu
                115                 120                 125

Asn His Asp Phe Gln Ala Leu Ala Leu Glu Gly Arg Ala Met Gly Glu
                130                 135                 140

Gln Leu Leu Pro Gly Lys Lys Phe Trp Glu Thr Asp Glu Ser Ser Lys
145                 150                 155                 160

Asp Gly Pro Lys Gly Ile Phe Leu Gly Asp Gln Trp Arg Asp Ser Ala
                165                 170                 175

Trp Gly Thr Ser Asp His Ser Val Ser Gln Pro Ile Met Val Gln Arg
                180                 185                 190

Arg Pro Gly Gln Ser Phe His Val Asn Ser Glu Val Asn Ser Val Leu
                195                 200                 205

Ser Pro Arg Ser Glu Ser Gly Gly Leu Gly Val Ser Met Val Glu Tyr
210                 215                 220

Val Leu Ser Ser Ser Pro Gly Asp Ser Cys Leu Arg Lys Gly Gly Phe
225                 230                 235                 240

Gly Pro Arg Asp Ala Asp Ser Asp Glu Asn Asp Lys Gly Glu Lys Lys
                245                 250                 255

Asn Lys Gly Thr Phe Asp Gly Asp Lys Leu Gly Asp Leu Lys Glu Glu
                260                 265                 270

Gly Asp Val Met Asp Lys Thr Asn Gly Leu Pro Val Gln Asn Gly Ile
                275                 280                 285

Asp Ala Asp Val Lys Asp Phe Ser Arg Thr Pro Gly Asn Cys Gln Asn
                290                 295                 300

Ser Ala Asn Glu Val Asp Leu Leu Gly Pro Asn Gln Asn Gly Ser Glu
305                 310                 315                 320

Gly Leu Ala Gln Leu Thr Ser Thr Asn Gly Ala Lys Pro Val Glu Asp
                325                 330                 335

Phe Ser Asn Met Glu Ser Gln Ser Val Pro Leu Asp Pro Met Glu His
                340                 345                 350

Val Gly Met Glu Pro Leu Gln Phe Asp Tyr Ser Gly Thr Gln Val Pro
                355                 360                 365

Val Asp Ser Ala Ala Ala Thr Val Gly Leu Phe Asp Tyr Asn Ser Gln
                370                 375                 380

Gln Gln Leu Phe Gln Arg Pro Asn Ala Leu Ala Val Gln Gln Leu Thr
385                 390                 395                 400

Ala Ala Gln Gln Gln Gln Tyr Ala Leu Ala Ala Ala His Gln Pro His
                405                 410                 415

Ile Gly Leu Ala Pro Ala Ala Phe Val Pro Asn Pro Tyr Ile Ile Ser
                420                 425                 430

Ala Ala Pro Pro Gly Thr Asp Pro Tyr Thr Ala Gly Leu Ala Ala Ala
                435                 440                 445

Ala Thr Leu Gly Pro Ala Val Val Pro His Gln Tyr Tyr Gly Val Thr
                450                 455                 460

Pro Trp Gly Val Tyr Pro Ala Ser Leu Phe Gln Gln Gln Ala Ala Ala
465                 470                 475                 480
```

```
Ala Ala Ala Ala Thr Asn Ser Ala Asn Gln Gln Thr Thr Pro Gln Ala
            485                 490                 495
Gln Gln Gly Gln Gln Val Leu Arg Gly Gly Ala Ser Gln Arg Pro
        500                 505                 510
Leu Thr Pro Asn Gln Asn Gln Gln Gly Gln Gln Thr Asp Pro Leu Val
            515                 520                 525
Ala Ala Ala Ala Val Asn Ser Ala Leu Ala Phe Gly Gln Gly Leu Ala
            530                 535                 540
Ala Gly Met Pro Gly Tyr Pro Val Leu Ala Pro Ala Ala Tyr Tyr Asp
545                 550                 555                 560
Gln Thr Gly Ala Leu Val Val Asn Ala Gly Ala Arg Asn Gly Leu Gly
                565                 570                 575
Ala Pro Val Arg Leu Val Ala Pro Ala Pro Val Ile Ile Ser Ser Ser
                580                 585                 590
Ala Ala Gln Ala Ala Val Ala Ala Ala Ala Ser Ala Asn Gly Ala
                595                 600                 605
Ala Gly Gly Leu Ala Gly Thr Thr Asn Gly Pro Phe Arg Pro Leu Gly
        610                 615                 620
Thr Gln Gln Pro Gln Pro Gln Pro Gln Gln Pro Asn Asn Asn Leu
625                 630                 635                 640
Ala Ser Ser Ser Phe Tyr Gly Asn Asn Ser Leu Asn Ser Asn Ser Gln
                645                 650                 655
Ser Ser Ser Leu Phe Ser Gln Gly Ser Ala Gln Pro Ala Asn Thr Ser
                660                 665                 670
Leu Gly Phe Gly Ser Ser Ser Leu Gly Ala Thr Leu Gly Ser Ala
            675                 680                 685
Leu Gly Gly Phe Gly Thr Ala Val Ala Asn Ser Asn Thr Gly Ser Gly
            690                 695                 700
Ser Arg Arg Asp Ser Leu Thr Gly Ser Ser Asp Leu Tyr Lys Arg Thr
705                 710                 715                 720
Ser Ser Ser Leu Thr Pro Ile Gly His Ser Phe Tyr Asn Gly Leu Ser
                725                 730                 735
Phe Ser Ser Ser Pro Gly Pro Val Gly Met Pro Leu Pro Ser Gln Gly
            740                 745                 750
Pro Gly His Ser Gln Thr Pro Pro Ser Leu Ser Ser His Gly Ser
            755                 760                 765
Ser Ser Ser Leu Asn Leu Gly Gly Leu Thr Asn Gly Ser Gly Arg Tyr
    770                 775                 780
Ile Ser Ala Ala Pro Gly Ala Glu Ala Lys Tyr Arg Ser Ala Ser Ser
785                 790                 795                 800
Ala Ser Ser Leu Phe Ser Pro Ser Ser Thr Leu Phe Ser Ser Ser Arg
                805                 810                 815
Leu Arg Tyr Gly Met Ser Asp Val Met Pro Ser Gly Arg Ser Arg Leu
            820                 825                 830
Leu Glu Asp Phe Arg Asn Asn Arg Tyr Pro Asn Leu Gln Leu Arg Glu
            835                 840                 845
Ile Ala Gly His Ile Met Glu Phe Ser Gln Asp Gln His Gly Ser Arg
850                 855                 860
Phe Ile Gln Leu Lys Leu Glu Arg Ala Thr Pro Ala Glu Arg Gln Leu
865                 870                 875                 880
Val Phe Asn Glu Ile Leu Gln Ala Ala Tyr Gln Leu Met Val Asp Val
                885                 890                 895
```

-continued

```
Phe Gly Asn Tyr Val Ile Gln Lys Phe Phe Glu Gly Ser Leu Glu
                900                 905                 910

Gln Lys Leu Ala Leu Ala Glu Arg Ile Arg Gly His Val Leu Ser Leu
        915                 920                 925

Ala Leu Gln Met Tyr Gly Cys Arg Val Ile Gln Lys Ala Leu Glu Phe
            930                 935                 940

Ile Pro Ser Asp Gln Gln Val Ile Asn Glu Met Val Arg Glu Leu Asp
945                 950                 955                 960

Gly His Val Leu Lys Cys Val Lys Asp Gln Asn Gly Asn His Val Val
                965                 970                 975

Gln Lys Cys Ile Glu Cys Val Gln Pro Gln Ser Leu Gln Phe Ile Ile
            980                 985                 990

Asp Ala Phe Lys Gly Gln Val Phe Ala Leu Ser Thr His Pro Tyr Gly
        995                 1000                1005

Cys Arg Val Ile Gln Arg Ile Leu Glu His Cys Leu Pro Asp Gln
    1010                1015                1020

Thr Leu Pro Ile Leu Glu Glu Leu His Gln His Thr Glu Gln Leu
    1025                1030                1035

Val Gln Asp Gln Tyr Gly Asn Tyr Val Ile Gln His Val Leu Glu
    1040                1045                1050

His Gly Arg Pro Glu Asp Lys Ser Lys Ile Val Ala Glu Ile Arg
    1055                1060                1065

Gly Asn Val Leu Val Leu Ser Gln His Lys Phe Ala Ser Asn Val
    1070                1075                1080

Val Glu Lys Cys Val Thr His Ala Ser Arg Thr Glu Arg Ala Val
    1085                1090                1095

Leu Ile Asp Glu Val Cys Thr Met Asn Asp Gly Pro His Ser Ala
    1100                1105                1110

Leu Tyr Thr Met Met Lys Asp Gln Tyr Ala Asn Tyr Val Val Gln
    1115                1120                1125

Lys Met Ile Asp Val Ala Glu Pro Gly Gln Arg Lys Ile Val Met
    1130                1135                1140

His Lys Ile Arg Pro His Ile Ala Thr Leu Arg Lys Tyr Thr Tyr
    1145                1150                1155

Gly Lys His Ile Leu Ala Lys Leu Glu Lys Tyr Tyr Met Lys Asn
    1160                1165                1170

Gly Val Asp Leu Gly Pro Ile Cys Gly Pro Pro Asn Gly Ile Ile
    1175                1180                1185

<210> SEQ ID NO 32
<211> LENGTH: 1186
<212> TYPE: PRT
<213> ORGANISM: Homo sapiens

<400> SEQUENCE: 32

Met Ser Val Ala Cys Val Leu Lys Arg Lys Ala Val Leu Trp Gln Asp
1               5                   10                  15

Ser Phe Ser Pro His Leu Lys His His Pro Gln Glu Pro Ala Asn Pro
            20                  25                  30

Asn Met Pro Val Val Leu Thr Ser Gly Thr Gly Ser Gln Ala Gln Pro
        35                  40                  45

Gln Pro Ala Ala Asn Gln Ala Leu Ala Ala Gly Thr His Ser Ser Pro
    50                  55                  60

Val Pro Gly Ser Ile Gly Val Ala Gly Arg Ser Gln Asp Asp Ala Met
65                  70                  75                  80
```

-continued

```
Val Asp Tyr Phe Phe Gln Arg Gln His Gly Glu Gln Leu Gly Gly Gly
                85                  90                  95
Gly Ser Gly Gly Gly Gly Tyr Asn Asn Ser Lys His Arg Trp Pro Thr
            100                 105                 110
Gly Asp Asn Ile His Ala Glu His Gln Val Arg Ser Met Asp Glu Leu
            115                 120                 125
Asn His Asp Phe Gln Ala Leu Ala Leu Glu Gly Arg Ala Met Gly Glu
        130                 135                 140
Gln Leu Leu Pro Gly Lys Lys Phe Trp Glu Thr Asp Glu Ser Ser Lys
145                 150                 155                 160
Asp Gly Pro Lys Gly Ile Phe Leu Gly Asp Gln Trp Arg Asp Ser Ala
                165                 170                 175
Trp Gly Thr Ser Asp His Ser Val Ser Gln Pro Ile Met Val Gln Arg
                180                 185                 190
Arg Pro Gly Gln Ser Phe His Val Asn Ser Glu Val Asn Ser Val Leu
            195                 200                 205
Ser Pro Arg Ser Glu Ser Gly Gly Leu Gly Val Ser Met Val Glu Tyr
    210                 215                 220
Val Leu Ser Ser Ser Pro Gly Asp Ser Cys Leu Arg Lys Gly Gly Phe
225                 230                 235                 240
Gly Pro Arg Asp Ala Asp Ser Asp Glu Asn Asp Lys Gly Glu Lys Lys
                245                 250                 255
Asn Lys Gly Thr Phe Asp Gly Asp Lys Leu Gly Asp Leu Lys Glu Glu
                260                 265                 270
Gly Asp Val Met Asp Lys Thr Asn Gly Leu Pro Val Gln Asn Gly Ile
            275                 280                 285
Asp Ala Asp Val Lys Asp Phe Ser Arg Thr Pro Gly Asn Cys Gln Asn
    290                 295                 300
Ser Ala Asn Glu Val Asp Leu Leu Gly Pro Asn Gln Asn Gly Ser Glu
305                 310                 315                 320
Gly Leu Ala Gln Leu Thr Ser Thr Asn Gly Ala Lys Pro Val Glu Asp
                325                 330                 335
Phe Ser Asn Met Glu Ser Gln Ser Val Pro Leu Asp Pro Met Glu His
            340                 345                 350
Val Gly Met Glu Pro Leu Gln Phe Asp Tyr Ser Gly Thr Gln Val Pro
    355                 360                 365
Val Asp Ser Ala Ala Ala Thr Val Gly Leu Phe Asp Tyr Asn Ser Gln
    370                 375                 380
Gln Gln Leu Phe Gln Arg Pro Asn Ala Leu Ala Val Gln Gln Leu Thr
385                 390                 395                 400
Ala Ala Gln Gln Gln Gln Tyr Ala Leu Ala Ala His Gln Pro His
                405                 410                 415
Ile Gly Leu Ala Pro Ala Ala Phe Val Pro Asn Pro Tyr Ile Ile Ser
                420                 425                 430
Ala Ala Pro Pro Gly Thr Asp Pro Tyr Thr Ala Gly Leu Ala Ala Ala
            435                 440                 445
Ala Thr Leu Gly Pro Ala Val Val Pro His Gln Tyr Tyr Gly Val Thr
    450                 455                 460
Pro Trp Gly Val Tyr Pro Ala Ser Leu Phe Gln Gln Gln Ala Ala Ala
465                 470                 475                 480
Ala Ala Ala Ala Thr Asn Ser Ala Asn Gln Gln Thr Thr Pro Gln Ala
                485                 490                 495
```

```
Gln Gln Gly Gln Gln Gln Val Leu Arg Gly Gly Ala Ser Gln Arg Pro
                500                 505                 510

Leu Thr Pro Asn Gln Asn Gln Gln Gly Gln Gln Thr Asp Pro Leu Val
            515                 520                 525

Ala Ala Ala Ala Val Asn Ser Ala Leu Ala Phe Gly Gln Gly Leu Ala
        530                 535                 540

Ala Gly Met Pro Gly Tyr Pro Val Leu Ala Pro Ala Ala Tyr Tyr Asp
545                 550                 555                 560

Gln Thr Gly Ala Leu Val Val Asn Ala Gly Ala Arg Asn Gly Leu Gly
                565                 570                 575

Ala Pro Val Arg Leu Val Ala Pro Ala Pro Val Ile Ile Ser Ser Ser
            580                 585                 590

Ala Ala Gln Ala Ala Val Ala Ala Ala Ala Ser Ala Asn Gly Ala
        595                 600                 605

Ala Gly Gly Leu Ala Gly Thr Thr Asn Gly Pro Phe Arg Pro Leu Gly
        610                 615                 620

Thr Gln Gln Pro Gln Pro Gln Pro Gln Gln Pro Asn Asn Asn Leu
625                 630                 635                 640

Ala Ser Ser Ser Phe Tyr Gly Asn Asn Ser Leu Asn Ser Asn Ser Gln
                645                 650                 655

Ser Ser Ser Leu Phe Ser Gln Gly Ser Ala Gln Pro Ala Asn Thr Ser
            660                 665                 670

Leu Gly Phe Gly Ser Ser Ser Leu Gly Ala Thr Leu Gly Ser Ala
            675                 680                 685

Leu Gly Gly Phe Gly Thr Ala Val Ala Asn Ser Asn Thr Gly Ser Gly
    690                 695                 700

Ser Arg Arg Asp Ser Leu Thr Gly Ser Ser Asp Leu Tyr Lys Arg Thr
705                 710                 715                 720

Ser Ser Ser Leu Thr Pro Ile Gly His Ser Phe Tyr Asn Gly Leu Ser
            725                 730                 735

Phe Ser Ser Ser Pro Gly Pro Val Gly Met Pro Leu Pro Ser Gln Gly
                740                 745                 750

Pro Gly His Ser Gln Thr Pro Pro Ser Leu Ser Ser His Gly Ser
            755                 760                 765

Ser Ser Ser Leu Asn Leu Gly Gly Leu Thr Asn Gly Ser Gly Arg Tyr
770                 775                 780

Ile Ser Ala Ala Pro Gly Ala Glu Ala Lys Tyr Arg Ser Ala Ser Ser
785                 790                 795                 800

Ala Ser Ser Leu Phe Ser Pro Ser Ser Thr Leu Phe Ser Ser Ser Arg
            805                 810                 815

Leu Arg Tyr Gly Met Ser Asp Val Met Pro Ser Gly Arg Ser Arg Leu
            820                 825                 830

Leu Glu Asp Phe Arg Asn Asn Arg Tyr Pro Asn Leu Gln Leu Arg Glu
            835                 840                 845

Ile Ala Gly His Ile Met Glu Phe Ser Gln Asp Gln His Gly Ser Arg
850                 855                 860

Phe Ile Gln Leu Lys Leu Glu Arg Ala Thr Pro Ala Glu Arg Gln Leu
865                 870                 875                 880

Val Phe Asn Glu Ile Leu Gln Ala Ala Tyr Gln Leu Met Val Asp Val
                885                 890                 895

Phe Gly Asn Tyr Val Ile Gln Lys Phe Phe Glu Phe Gly Ser Leu Glu
            900                 905                 910

Gln Lys Leu Ala Leu Ala Glu Arg Ile Arg Gly His Val Leu Ser Leu
```

```
            915                 920                 925
Ala Leu Gln Met Tyr Gly Cys Arg Val Ile Gln Lys Ala Leu Glu Phe
    930                 935                 940

Ile Pro Ser Asp Gln Gln Asn Glu Met Val Arg Glu Leu Asp Gly His
945                 950                 955                 960

Val Leu Lys Cys Val Lys Asp Gln Asn Gly Asn His Val Val Gln Lys
                965                 970                 975

Cys Ile Glu Cys Val Gln Pro Gln Ser Leu Gln Phe Ile Ile Asp Ala
                980                 985                 990

Phe Lys Gly Gln Val Phe Ala Leu Ser Thr His Pro Tyr Gly Cys Arg
            995                 1000                1005

Val Ile Gln Arg Ile Leu Glu His Cys Leu Pro Asp Gln Thr Leu
    1010                1015                1020

Pro Ile Leu Glu Glu Leu His Gln His Thr Glu Gln Leu Val Gln
    1025                1030                1035

Asp Gln Tyr Gly Asn Tyr Val Ile Gln His Val Leu Glu His Gly
    1040                1045                1050

Arg Pro Glu Asp Lys Ser Lys Ile Val Ala Glu Ile Arg Gly Asn
    1055                1060                1065

Val Leu Val Leu Ser Gln His Lys Phe Ala Ser Asn Val Val Glu
    1070                1075                1080

Lys Cys Val Thr His Ala Ser Arg Thr Glu Arg Ala Val Leu Ile
    1085                1090                1095

Asp Glu Val Cys Thr Met Asn Asp Gly Pro His Ser Ala Leu Tyr
    1100                1105                1110

Thr Met Met Lys Asp Gln Tyr Ala Asn Tyr Val Gln Lys Met
    1115                1120                1125

Ile Asp Val Ala Glu Pro Gly Gln Arg Lys Ile Val Met His Lys
    1130                1135                1140

Ile Arg Pro His Ile Ala Thr Leu Arg Lys Tyr Thr Tyr Gly Lys
    1145                1150                1155

His Ile Leu Ala Lys Leu Glu Lys Tyr Tyr Met Lys Asn Gly Val
    1160                1165                1170

Asp Leu Gly Pro Ile Cys Gly Pro Pro Asn Gly Ile Ile
    1175                1180                1185

<210> SEQ ID NO 33
<211> LENGTH: 22
<212> TYPE: DNA
<213> ORGANISM: Artificial Sequence
<220> FEATURE:
<223> OTHER INFORMATION: PUM1_forward primer

<400> SEQUENCE: 33
gccagcttgt cttcaatgaa at                                          22

<210> SEQ ID NO 34
<211> LENGTH: 21
<212> TYPE: DNA
<213> ORGANISM: Artificial Sequence
<220> FEATURE:
<223> OTHER INFORMATION: PUM1_reverse primer

<400> SEQUENCE: 34
caaagccagc ttctgttcaa g                                           21

<210> SEQ ID NO 35
```

```
<211> LENGTH: 24
<212> TYPE: DNA
<213> ORGANISM: Artificial Sequence
<220> FEATURE:
<223> OTHER INFORMATION: PUM1 probe

<400> SEQUENCE: 35
atccaccatg agttggtagg cagc                                              24

<210> SEQ ID NO 36
<211> LENGTH: 1921
<212> TYPE: DNA
<213> ORGANISM: Homo sapiens

<400> SEQUENCE: 36
ggcggaagtg acattatcaa cgcgcgccag gggttcagtg aggtcgggca ggttcgctgt         60
ggcgggcgcc tgggccgccg gctgtttaac ttcgcttccg ctggcccata gtgatctttg        120
cagtgaccca gcatcactgt ttcttggcgt gtgaagataa cccaaggaat tgaggaagtt        180
gctgagaaga gtgtgctgga gatgctctag gaaaaaattg aatagtgaga cgagttccag        240
cgcaagggtt tctggtttgc caagaagaaa gtgaacatca tggatcagaa caacagcctg        300
ccaccttacg ctcagggctt ggcctcccct caggtgccat gactcccgg aatccctatc         360 tttagtccaa tgatgcctta tggcactgga ctgaccccac agcctattca gaacaccaat        420
agtctgtcta ttttggaaga gcaacaaagg cagcagcagc aacaacaaca gcagcagcag        480
cagcagcagc agcaacagca acagcagcag cagcagcagc agcagcagca gcagcagcag        540
cagcagcagc agcagcagca acaggcagtg gcagctgcag ccgttcagca gtcaacgtcc        600
cagcaggcaa cacagggaac ctcaggccag gcaccacagc tcttccactc acagactctc        660
acaactgcac ccttgccggg caccactcca ctgtatccct cccccatgac tcccatgacc        720
cccatcactc ctgccacgcc agcttcggag agttctggga ttgtaccgca gctgcaaaat        780
attgtatcca cagtgaatct tggttgtaaa cttgacctaa agaccattgc acttcgtgcc        840
cgaaacgccg aatataatcc caagcggttt gctgcggtaa tcatgaggat aagagagcca        900
cgaaccacgg cactgatttt cagttctggg aaaatggtgt gcacaggagc caagagtgaa        960
gaacagtcca gactggcagc aagaaaatat gctagagttg tacagaagtt gggttttcca       1020
gctaagttct tggacttcaa gattcagaat atggtgggga gctgtgatgt gaagtttcct       1080
ataaggttag aaggccttgt gctcacccac caacaattta gtagttatga gccagagtta       1140
tttcctggtt taatctacag aatgatcaaa cccagaattg ttctccttat ttttgtttct       1200
ggaaaagttg tattaacagg tgctaaagtc agagcagaaa tttatgaagc atttgaaaac       1260
atctacccta ttctaaaggg attcaggaag acgacgtaat ggctctcatg tacccttgcc       1320 tccccaccc ccttcttttt tttttttaa acaaatcagt ttgttttggt acctttaaat        1380
ggtggtgttg tgagaagatg gatgttgagt tgcagggtgt ggcaccaggt gatgcccttc       1440
tgtaagtgcc caccgcggga tgccgggaag gggcattatt tgtgcactga aacaccgcg        1500 cagcgtgact gtgagttgct cataccgtgc tgctatctgg gcagcgctgc ccatttattt       1560
atatgtagat tttaaacact gctgttgaca agttggtttg agggagaaaa ctttaagtgt       1620
taaagccacc tctataattg attggacttt ttaatttta tgttttcccc catgaaccac        1680 agttttttata tttctaccag aaaagtaaaa atctttttta aaagtgttgt ttttctaatt       1740
tataactcct aggggttatt tctgtgccag acacattcca cctctccagt attgcaggac       1800
agaatatatg tgttaatgaa aatgaatggc tgtacatatt ttttctttc ttcagagtac        1860
```

```
tctgtacaat aaatgcagtt tataaaagtg ttagattgtt gttaaaaaaa aaaaaaaaa    1920
a                                                                  1921
```

<210> SEQ ID NO 37
<211> LENGTH: 339
<212> TYPE: PRT
<213> ORGANISM: Homo sapiens

<400> SEQUENCE: 37

```
Met Asp Gln Asn Asn Ser Leu Pro Pro Tyr Ala Gln Gly Leu Ala Ser
1               5                   10                  15

Pro Gln Gly Ala Met Thr Pro Gly Ile Pro Ile Phe Ser Pro Met Met
            20                  25                  30

Pro Tyr Gly Thr Gly Leu Thr Pro Gln Pro Ile Gln Asn Thr Asn Ser
        35                  40                  45

Leu Ser Ile Leu Glu Glu Gln Arg Gln Gln Gln Gln Gln Gln Gln Gln
    50                  55                  60

Gln Gln Gln Gln Gln Gln Gln Gln Gln Gln Gln Gln Gln Gln Gln Gln
65                  70                  75                  80

Gln Gln Gln Gln Gln Gln Gln Gln Gln Gln Gln Gln Gln Gln Gln Ala
                85                  90                  95

Val Ala Ala Ala Val Gln Gln Ser Thr Ser Gln Gln Ala Thr Gln
            100                 105                 110

Gly Thr Ser Gly Gln Ala Pro Gln Leu Phe His Ser Gln Thr Leu Thr
            115                 120                 125

Thr Ala Pro Leu Pro Gly Thr Thr Pro Leu Tyr Pro Ser Pro Met Thr
130                 135                 140

Pro Met Thr Pro Ile Thr Pro Ala Thr Pro Ala Ser Glu Ser Ser Gly
145                 150                 155                 160

Ile Val Pro Gln Leu Gln Asn Ile Val Ser Thr Val Asn Leu Gly Cys
                165                 170                 175

Lys Leu Asp Leu Lys Thr Ile Ala Leu Arg Ala Arg Asn Ala Glu Tyr
            180                 185                 190

Asn Pro Lys Arg Phe Ala Ala Val Ile Met Arg Ile Arg Glu Pro Arg
        195                 200                 205

Thr Thr Ala Leu Ile Phe Ser Ser Gly Lys Met Val Cys Thr Gly Ala
210                 215                 220

Lys Ser Glu Glu Gln Ser Arg Leu Ala Ala Arg Lys Tyr Ala Arg Val
225                 230                 235                 240

Val Gln Lys Leu Gly Phe Pro Ala Lys Phe Leu Asp Phe Lys Ile Gln
                245                 250                 255

Asn Met Val Gly Ser Cys Asp Val Lys Phe Pro Ile Arg Leu Glu Gly
            260                 265                 270

Leu Val Leu Thr His Gln Gln Phe Ser Ser Tyr Glu Pro Glu Leu Phe
        275                 280                 285

Pro Gly Leu Ile Tyr Arg Met Ile Lys Pro Arg Ile Val Leu Leu Ile
    290                 295                 300

Phe Val Ser Gly Lys Val Val Leu Thr Gly Ala Lys Val Arg Ala Glu
305                 310                 315                 320

Ile Tyr Glu Ala Phe Glu Asn Ile Tyr Pro Ile Leu Lys Gly Phe Arg
                325                 330                 335

Lys Thr Thr
```

-continued

```
<210> SEQ ID NO 38
<211> LENGTH: 23
<212> TYPE: DNA
<213> ORGANISM: Artificial Sequence
<220> FEATURE:
<223> OTHER INFORMATION: TBP_forward primer

<400> SEQUENCE: 38
gccaagaaga aagtgaacat cat                                              23

<210> SEQ ID NO 39
<211> LENGTH: 20
<212> TYPE: DNA
<213> ORGANISM: Artificial Sequence
<220> FEATURE:
<223> OTHER INFORMATION: TBP_reverse primer

<400> SEQUENCE: 39
atagggattc cgggagtcat                                                  20

<210> SEQ ID NO 40
<211> LENGTH: 24
<212> TYPE: DNA
<213> ORGANISM: Artificial Sequence
<220> FEATURE:
<223> OTHER INFORMATION: TBP probe

<400> SEQUENCE: 40
tcagaacaac agcctgccac ctta                                             24

<210> SEQ ID NO 41
<211> LENGTH: 1852
<212> TYPE: DNA
<213> ORGANISM: Homo sapiens

<400> SEQUENCE: 41
accgccgaga ccgcgtccgc cccgcgagca cagagcctcg cctttgccga tccgccgccc      60
gtccacaccc gccgccagct caccatggat gatgatatcg ccgcgctcgt cgtcgacaac     120
ggctccggca tgtgcaaggc cggcttcgcg ggcgacgatg ccccccgggc cgtcttcccc     180
tccatcgtgg ggcgccccag gcaccagggc gtgatggtgg gcatgggtca gaaggattcc     240
tatgtgggcg acgaggccca gagcaagaga ggcatcctca ccctgaagta ccccatcgag     300
cacggcatcg tcaccaactg ggacgacatg gagaaaatct ggcaccacac cttctacaat     360
gagctgcgtg tggctcccga ggagcacccc gtgctgctga ccgaggcccc cctgaacccc     420
aaggccaacc gcgagaagat gacccagatc atgtttgaga ccttcaacac cccagccatg     480
tacgttgcta tccaggctgt gctatccctg tacgcctctg gccgtaccac tggcatcgtg     540
atggactccg gtgacgggt cacccacact gtgcccatct acgagggta tgccctcccc     600 catgccatcc tgcgtctgga cctggctggc cgggacctga ctgactacct catgaagatc     660
ctcaccgagc gcggctacag cttcaccacc acggccgagc gggaaatcgt gcgtgacatt     720
aaggagaagc tgtgctacgt cgccctggac ttcgagcaag atggccac ggctgcttcc     780 agctcctccc tggagaagag ctacgagctg cctgacggcc aggtcatcac cattggcaat     840
gagcggttcc gctgccctga ggcactcttc agccttcct tcctgggcat ggagtcctgt     900
ggcatccacg aaactacctt caactccatc atgaagtgtg acgtggacat ccgcaaagac     960
ctgtacgcca acacagtgct gtctggcggc accaccatgt accctggcat tgccgacagg    1020
atgcagaagg agatcactgc cctggcaccc agcacaatga agatcaagat cattgctcct    1080
```

```
cctgagcgca agtactccgt gtggatcggc ggctccatcc tggcctcgct gtccaccttc    1140
cagcagatgt ggatcagcaa gcaggagtat gacgagtccg cccctccat  cgtccaccgc    1200 aaatgcttct aggcggacta tgacttagtt gcgttacacc ctttcttgac aaaacctaac    1260
ttgcgcagaa aacaagatga gattggcatg gctttatttg ttttttttgt tttgttttgg    1320
tttttttttt tttttggct tgactcagga tttaaaaact ggaacggtga aggtgacagc     1380
agtcggttgg agcgagcatc ccccaaagtt cacaatgtgg ccgaggactt tgattgcaca    1440
ttgttgtttt tttaatagtc attccaaata tgagatgcgt tgttacagga agtcccttgc    1500
catcctaaaa gccaccccac ttctctctaa ggagaatggc ccagtcctct cccaagtcca    1560
cacaggggag gtgatagcat tgctttcgtg taaattatgt aatgcaaaat ttttttaatc    1620
ttcgccttaa tactttttta ttttgtttta ttttgaatga tgagccttcg tgcccccct     1680 tcccccttt  ttgtccccca acttgagatg tatgaaggct tttggtctcc ctgggagtgg    1740
gtggaggcag ccagggctta cctgtacact gacttgagac cagttgaata aaagtgcaca    1800
ccttaaaaat gaaaaaaaaa aaaaaaaaa  aaaaaaaaaa aa                       1852
```

<210> SEQ ID NO 42
<211> LENGTH: 375
<212> TYPE: PRT
<213> ORGANISM: Homo sapiens

<400> SEQUENCE: 42

```
Met Asp Asp Asp Ile Ala Ala Leu Val Val Asp Asn Gly Ser Gly Met
1               5                   10                  15

Cys Lys Ala Gly Phe Ala Gly Asp Asp Ala Pro Arg Ala Val Phe Pro
            20                  25                  30

Ser Ile Val Gly Arg Pro Arg His Gln Gly Val Met Val Gly Met Gly
        35                  40                  45

Gln Lys Asp Ser Tyr Val Gly Asp Glu Ala Gln Ser Lys Arg Gly Ile
    50                  55                  60

Leu Thr Leu Lys Tyr Pro Ile Glu His Gly Ile Val Thr Asn Trp Asp
65                  70                  75                  80

Asp Met Glu Lys Ile Trp His His Thr Phe Tyr Asn Glu Leu Arg Val
                85                  90                  95

Ala Pro Glu Glu His Pro Val Leu Leu Thr Glu Ala Pro Leu Asn Pro
            100                 105                 110

Lys Ala Asn Arg Glu Lys Met Thr Gln Ile Met Phe Glu Thr Phe Asn
        115                 120                 125

Thr Pro Ala Met Tyr Val Ala Ile Gln Ala Val Leu Ser Leu Tyr Ala
    130                 135                 140

Ser Gly Arg Thr Thr Gly Ile Val Met Asp Ser Gly Asp Gly Val Thr
145                 150                 155                 160

His Thr Val Pro Ile Tyr Glu Gly Tyr Ala Leu Pro His Ala Ile Leu
                165                 170                 175

Arg Leu Asp Leu Ala Gly Arg Asp Leu Thr Asp Tyr Leu Met Lys Ile
            180                 185                 190

Leu Thr Glu Arg Gly Tyr Ser Phe Thr Thr Thr Ala Glu Arg Glu Ile
        195                 200                 205

Val Arg Asp Ile Lys Glu Lys Leu Cys Tyr Val Ala Leu Asp Phe Glu
    210                 215                 220

Gln Glu Met Ala Thr Ala Ala Ser Ser Ser Leu Glu Lys Ser Tyr
225                 230                 235                 240
```

```
Glu Leu Pro Asp Gly Gln Val Ile Thr Ile Gly Asn Glu Arg Phe Arg
                245                 250                 255

Cys Pro Glu Ala Leu Phe Gln Pro Ser Phe Leu Gly Met Glu Ser Cys
            260                 265                 270

Gly Ile His Glu Thr Thr Phe Asn Ser Ile Met Lys Cys Asp Val Asp
        275                 280                 285

Ile Arg Lys Asp Leu Tyr Ala Asn Thr Val Leu Ser Gly Gly Thr Thr
    290                 295                 300

Met Tyr Pro Gly Ile Ala Asp Arg Met Gln Lys Glu Ile Thr Ala Leu
305                 310                 315                 320

Ala Pro Ser Thr Met Lys Ile Lys Ile Ile Ala Pro Pro Glu Arg Lys
                325                 330                 335

Tyr Ser Val Trp Ile Gly Gly Ser Ile Leu Ala Ser Leu Ser Thr Phe
            340                 345                 350

Gln Gln Met Trp Ile Ser Lys Gln Glu Tyr Asp Glu Ser Gly Pro Ser
        355                 360                 365

Ile Val His Arg Lys Cys Phe
    370                 375

<210> SEQ ID NO 43
<211> LENGTH: 18
<212> TYPE: DNA
<213> ORGANISM: Artificial Sequence
<220> FEATURE:
<223> OTHER INFORMATION: ACTB_forward primer

<400> SEQUENCE: 43
ccaaccgcga aagatga                                                         18

<210> SEQ ID NO 44
<211> LENGTH: 20
<212> TYPE: DNA
<213> ORGANISM: Artificial Sequence
<220> FEATURE:
<223> OTHER INFORMATION: ACTB_reverse primer

<400> SEQUENCE: 44
ccagaggcgt acagggatag                                                      20

<210> SEQ ID NO 45
<211> LENGTH: 23
<212> TYPE: DNA
<213> ORGANISM: Artificial Sequence
<220> FEATURE:
<223> OTHER INFORMATION: ACTB probe

<400> SEQUENCE: 45
ccatgtacgt tgctatccag gct                                                  23

<210> SEQ ID NO 46
<211> LENGTH: 1229
<212> TYPE: DNA
<213> ORGANISM: Homo sapiens

<400> SEQUENCE: 46
gtctgacggg cgatggcgca gccaatagac aggagcgcta tccgcggttt ctgattggct          60
actttgttcg cattataaaa ggcacgcgcg ggcgcgaggc ccttctctcg ccaggcgtcc         120
tcgtggaagt gacatcgtct ttaaaccctg cgtggcaatc cctgacgcac cgccgtgatg         180
cccagggaag acaggcgac ctggaagtcc aactacttcc ttaagatcat ccaactattg         240
```

```
gatgattatc cgaaatgttt cattgtggga gcagacaatg tgggctccaa gcagatgcag      300
cagatccgca tgtcccttcg cgggaaggct gtggtgctga tgggcaagaa caccatgatg      360
cgcaaggcca tccgagggca cctggaaaac aacccagctc tggagaaact gctgcctcat      420
atccggggga atgtgggctt tgtgttcacc aaggaggacc tcactgagat cagggacatg      480
ttgctggcca ataaggtgcc agctgctgcc cgtgctggtg ccattgcccc atgtgaagtc      540
actgtgccag cccagaacac tggtctcggg cccgagaaga cctccttttt ccaggcttta      600
ggtatcacca ctaaaatctc cagggcacc attgaaatcc tgagtgatgt gcagctgatc       660
aagactggag acaagtggg agccagcgaa gccacgctgc tgaacatgct caacatctcc       720
cccttctcct ttgggctggt catccagcag gtgttcgaca atggcagcat ctacaaccct      780
gaagtgcttg atatcacaga ggaaactctg cattctcgct tcctggaggg tgtccgcaat      840
gttgccagtg tctgtctgca gattggctac ccaactgttg catcagtacc ccattctatc      900
atcaacgggt acaaacgagt cctggccttg tctgtggaga cggattacac cttcccactt      960
gctgaaaagg tcaaggcctt cttggctgat ccatctgcct tgtggctgc tgcccctgtg     1020 gctgctgcca ccacagctgc tcctgctgct gctgcagccc cagctaaggt tgaagccaag     1080
gaagagtcgg aggagtcgga cgaggatatg ggatttggtc tctttgacta atcaccaaaa     1140
agcaaccaac ttagccagtt ttatttgcaa acaaggaaaa taaaggctta cttctttaaa     1200
aagtaaaaaa aaaaaaaaaa aaaaaaaaa                                       1229
```

<210> SEQ ID NO 47
<211> LENGTH: 317
<212> TYPE: PRT
<213> ORGANISM: Homo sapiens

<400> SEQUENCE: 47

```
Met Pro Arg Glu Asp Arg Ala Thr Trp Lys Ser Asn Tyr Phe Leu Lys
1               5                   10                  15

Ile Ile Gln Leu Leu Asp Asp Tyr Pro Lys Cys Phe Ile Val Gly Ala
            20                  25                  30

Asp Asn Val Gly Ser Lys Gln Met Gln Gln Ile Arg Met Ser Leu Arg
        35                  40                  45

Gly Lys Ala Val Val Leu Met Gly Lys Asn Thr Met Met Arg Lys Ala
    50                  55                  60

Ile Arg Gly His Leu Glu Asn Asn Pro Ala Leu Glu Lys Leu Leu Pro
65                  70                  75                  80

His Ile Arg Gly Asn Val Gly Phe Val Phe Thr Lys Glu Asp Leu Thr
                85                  90                  95

Glu Ile Arg Asp Met Leu Leu Ala Asn Lys Val Pro Ala Ala Ala Arg
            100                 105                 110

Ala Gly Ala Ile Ala Pro Cys Glu Val Thr Val Pro Ala Gln Asn Thr
        115                 120                 125

Gly Leu Gly Pro Glu Lys Thr Ser Phe Phe Gln Ala Leu Gly Ile Thr
    130                 135                 140

Thr Lys Ile Ser Arg Gly Thr Ile Glu Ile Leu Ser Asp Val Gln Leu
145                 150                 155                 160

Ile Lys Thr Gly Asp Lys Val Gly Ala Ser Glu Ala Thr Leu Leu Asn
                165                 170                 175

Met Leu Asn Ile Ser Pro Phe Ser Phe Gly Leu Val Ile Gln Gln Val
            180                 185                 190

Phe Asp Asn Gly Ser Ile Tyr Asn Pro Glu Val Leu Asp Ile Thr Glu
```

```
                195                 200                 205
Glu Thr Leu His Ser Arg Phe Leu Glu Gly Val Arg Asn Val Ala Ser
    210                 215                 220

Val Cys Leu Gln Ile Gly Tyr Pro Thr Val Ala Ser Val Pro His Ser
225                 230                 235                 240

Ile Ile Asn Gly Tyr Lys Arg Val Leu Ala Leu Ser Val Glu Thr Asp
                245                 250                 255

Tyr Thr Phe Pro Leu Ala Glu Lys Val Lys Ala Phe Leu Ala Asp Pro
            260                 265                 270

Ser Ala Phe Val Ala Ala Pro Val Ala Ala Thr Thr Ala Ala
            275                 280                 285

Pro Ala Ala Ala Ala Pro Ala Lys Val Glu Ala Lys Glu Glu Ser
        290                 295                 300

Glu Glu Ser Asp Glu Asp Met Gly Phe Gly Leu Phe Asp
305                 310                 315
```

<210> SEQ ID NO 48
<211> LENGTH: 317
<212> TYPE: PRT
<213> ORGANISM: Homo sapiens

<400> SEQUENCE: 48

```
Met Pro Arg Glu Asp Arg Ala Thr Trp Lys Ser Asn Tyr Phe Leu Lys
1               5                   10                  15

Ile Ile Gln Leu Leu Asp Asp Tyr Pro Lys Cys Phe Ile Val Gly Ala
                20                  25                  30

Asp Asn Val Gly Ser Lys Gln Met Gln Gln Ile Arg Met Ser Leu Arg
            35                  40                  45

Gly Lys Ala Val Val Leu Met Gly Lys Asn Thr Met Met Arg Lys Ala
        50                  55                  60

Ile Arg Gly His Leu Glu Asn Asn Pro Ala Leu Glu Lys Leu Leu Pro
65                  70                  75                  80

His Ile Arg Gly Asn Val Gly Phe Val Phe Thr Lys Glu Asp Leu Thr
                85                  90                  95

Glu Ile Arg Asp Met Leu Leu Ala Asn Lys Val Pro Ala Ala Ala Arg
            100                 105                 110

Ala Gly Ala Ile Ala Pro Cys Glu Val Thr Val Pro Ala Gln Asn Thr
        115                 120                 125

Gly Leu Gly Pro Glu Lys Thr Ser Phe Phe Gln Ala Leu Gly Ile Thr
130                 135                 140

Thr Lys Ile Ser Arg Gly Thr Ile Glu Ile Leu Ser Asp Val Gln Leu
145                 150                 155                 160

Ile Lys Thr Gly Asp Lys Val Gly Ala Ser Glu Ala Thr Leu Leu Asn
                165                 170                 175

Met Leu Asn Ile Ser Pro Phe Ser Phe Gly Leu Val Ile Gln Gln Val
            180                 185                 190

Phe Asp Asn Gly Ser Ile Tyr Asn Pro Glu Val Leu Asp Ile Thr Glu
        195                 200                 205

Glu Thr Leu His Ser Arg Phe Leu Glu Gly Val Arg Asn Val Ala Ser
    210                 215                 220

Val Cys Leu Gln Ile Gly Tyr Pro Thr Val Ala Ser Val Pro His Ser
225                 230                 235                 240

Ile Ile Asn Gly Tyr Lys Arg Val Leu Ala Leu Ser Val Glu Thr Asp
                245                 250                 255
```

```
Tyr Thr Phe Pro Leu Ala Glu Lys Val Lys Ala Phe Leu Ala Asp Pro
            260                 265                 270

Ser Ala Phe Val Ala Ala Pro Val Ala Ala Thr Thr Ala Ala
        275                 280                 285

Pro Ala Ala Ala Ala Pro Ala Lys Val Glu Ala Lys Glu Glu Ser
    290                 295                 300

Glu Glu Ser Asp Glu Asp Met Gly Phe Gly Leu Phe Asp
305             310                 315

<210> SEQ ID NO 49
<211> LENGTH: 18
<212> TYPE: DNA
<213> ORGANISM: Artificial Sequence
<220> FEATURE:
<223> OTHER INFORMATION: RPLP0_forward primer

<400> SEQUENCE: 49
taaaccctgc gtggcaat                                                 18

<210> SEQ ID NO 50
<211> LENGTH: 27
<212> TYPE: DNA
<213> ORGANISM: Artificial Sequence
<220> FEATURE:
<223> OTHER INFORMATION: RPLP0_reverse primer

<400> SEQUENCE: 50
acatttcgga taatcatcca atagttg                                       27

<210> SEQ ID NO 51
<211> LENGTH: 24
<212> TYPE: DNA
<213> ORGANISM: Artificial Sequence
<220> FEATURE:
<223> OTHER INFORMATION: RPLP0 probe

<400> SEQUENCE: 51
aagtagttgg acttccaggt cgcc                                          24

<210> SEQ ID NO 52
<211> LENGTH: 2458
<212> TYPE: DNA
<213> ORGANISM: Homo sapiens

<400> SEQUENCE: 52
cagaagaagg cagcgcccaa ggcgcatgcg cagcggtcac tcccgctgta tattaaggcg    60
ccggcgatcg cggcctgagg ctgctcccgg acaagggcaa cgagcgtttc gtttggactt   120
ctcgacttga gtgcccgcct ccttcgccgc cgcctctgca gtcctcagcg cagttatgcc   180
cagttcttcc cgctgtgggg acacgaccac ggaggaatcc ttgcttcagg gactcgggac   240
cctgctggac cccttcctcg ggtttagggg atgtggggac caggagaaag tcaggatccc   300
taagagtctt ccctgcctgg atggatgagt ggcttcttct ccacctagat tctttccaca   360
ggagccagca tacttcctga acatggagag tgttgttcgc cgctgcccat tcttatcccg   420 agtccccag gcctttctgc agaaagcagg caaatctctg ttgttctatg cccaaaactg   480
ccccaagatg atggaagttg ggccaagcc agccctcgg gcattgtcca ctgcagcagt   540
acactaccaa cagatcaaag aaaccctcc ggccagtgag aaagacaaaa ctgctaaggc   600
caaggtccaa cagactcctg atggatccca gcagagtcca gatggcacac agcttccgtc   660
tggacacccc ttgcctgcca caagccaggg cactgcaagc aaatgcccctt tcctggcagc   720
```

```
acagatgaat cagagaggca gcagtgtctt ctgcaaagcc agtcttgagc ttcaggagga      780
tgtgcaggaa atgaatgccg tgaggaaaga ggttgctgaa acctcagcag gccccagtgt      840
ggttagtgtg aaaaccgatg gagggatcc cagtggactg ctgaagaact tccaggacat       900
catgcaaaag caaagaccag aaagagtgtc tcatcttctt caagataact tgccaaaatc     960
tgtttccact tttcagtatg atcgtttctt tgagaaaaaa attgatgaga aaagaatga      1020 ccacacctat cgagttttta aaactgtgaa ccggcgagca cacatcttcc ccatggcaga    1080
tgactattca gactccctca tcaccaaaaa gcaagtgtca gtctggtgca gtaatgacta   1140
cctaggaatg agtcgccacc cacgggtgtg tggggcagtt atggacactt tgaaacaaca    1200
tggtgctggg gcaggtggta ctagaaatat ttctggaact agtaaattcc atgtggactt    1260
agagcgggag ctggcagacc tccatgggaa agatgccgca ctcttgtttt cctcgtgctt    1320
tgtggccaat gactcaaccc tcttcaccct ggctaagatg atgccaggct gtgagattta    1380
ctctgattct gggaaccatg cctccatgat ccaaggggatt cgaaacagcc gagtgccaaa  1440
gtacatcttc cgccacaatg atgtcagcca cctcagagaa ctgctgcaaa gatctgaccc    1500
ctcagtcccc aagattgtgg catttgaaac tgtccattca atggatgggg cggtgtgccc    1560
actggaagag ctgtgtgatg tggcccatga gtttggagca atcaccttcg tggatgaggt    1620
ccacgcagtg gggctttatg gggctcgagg cggaggatt ggggatcggg atggagtcat    1680
gccaaaaatg gacatcattt ctggaacact tggcaaagcc tttggttgtg ttggagggta   1740
catcgccagc acgagttctc tgattgacac cgtacggtcc tatgctgctg gcttcatctt   1800
caccacctct ctgccaccca tgctgctggc tggagccctg agtctgtgc ggatcctgaa    1860 gagcgctgag ggacgggtgc ttcgccgcca gcaccagcgc aacgtcaaac tcatgagaca   1920
gatgctaatg gatgccggcc tcctgttgt ccactgcccc agccacatca tccctgtgcg    1980
ggttgcagat gctgctaaaa acacagaagt ctgtgatgaa ctaatgagca gacataacat   2040
ctacgtgcaa gcaatcaatt accctacggt gccccgggga gaagagctcc tacggattgc  2100
ccccacccct caccacacac cccagatgat gaactacttc cttgagaatc tgctagtcac   2160
atggaagcaa gtggggctgg aactgaagcc tcattcctca gctgagtgca acttctgcag   2220
gaggccactg cattttgaag tgatgagtga aagagagaag tcctatttct caggcttgag   2280
caagttggta tctgctcagg cctgagcatg acctcaatta tttcacttaa ccccaggcca  2340
ttatcatatc cagatggtct tcagagttgt ctttatatgt gaattaagtt atattaaatt    2400
ttaatctata gtaaaaacat agtcctggaa ataaattctt gcttaaatgg tgaaaaaa      2458
```

<210> SEQ ID NO 53
<211> LENGTH: 2281
<212> TYPE: DNA
<213> ORGANISM: Homo sapiens

<400> SEQUENCE: 53

```
cagaagaagg cagcgcccaa ggcgcatgcg cagcggtcac tcccgctgta tattaaggcg     60
ccggcgatcg cggcctgagg ctgctcccgg acaagggcaa cgagcgtttc gtttggactt    120
ctcgacttga gtgcccgcct ccttcgccgc cgcctctgca gtcctcagcg cagtctttcc    180
acaggagcca gcatacttcc tgaacatgga gagtgttgtt cgccgctgcc cattcttatc    240
ccgagtcccc caggcctttc tgcagaaagc aggcaaatct ctgttgttct atgcccaaaa   300
ctgccccaag atgatggaag ttggggccaa gccagcccct cgggcattgt ccactgcagc  360
```

| | |
|---|---|
| agtacactac caacagatca agaaacccc tccggccagt gagaaagaca aaactgctaa | 420 |
| ggccaaggtc caacagactc ctgatggatc ccagcagagt ccagatggca cacagcttcc | 480 |
| gtctggacac cccttgcctg ccacaagcca gggcactgca agcaaatgcc ctttcctggc | 540 |
| agcacagatg aatcagagag gcagcagtgt cttctgcaaa gccagtcttg agcttcagga | 600 |
| ggatgtgcag gaaatgaatg ccgtgaggaa agaggttgct gaaacctcag caggccccag | 660 |
| tgtggttagt gtgaaaaccg atggagggga tcccagtgga ctgctgaaga acttccagga | 720 |
| catcatgcaa agcaaagac cagaaagagt gtctcatctt cttcaagata acttgccaaa | 780 |
| atctgtttcc acttttcagt atgatcgttt ctttgagaaa aaaattgatg agaaaaagaa | 840 |
| tgaccacacc tatcgagttt ttaaaactgt gaaccggcga gcacacatct tccccatggc | 900 |
| agatgactat tcagactccc tcatcaccaa aaagcaagtg tcagtctggt gcagtaatga | 960 |
| ctacctagga atgagtcgcc acccacgggt gtgtggggca gttatggaca ctttgaaaca | 1020 |
| acatggtgct ggggcaggtg gtactagaaa tatttctgga actagtaaat tccatgtgga | 1080 |
| cttagagcgg gagctggcag acctccatgg gaaagatgcc gcactcttgt tttcctcgtg | 1140 |
| cttttgtggcc aatgactcaa ccctcttcac cctggctaag atgatgccag gctgtgagat | 1200 |
| ttactctgat tctgggaacc atgcctccat gatccaaggg attcgaaaca gccgagtgcc | 1260 |
| aaagtacatc ttccgccaca tgatgtcag ccacctcaga gaactgctgc aaagatctga | 1320 |
| cccctcagtc cccaagattg tggcatttga aactgtccat tcaatggatg gggcggtgtg | 1380 |
| cccactggaa gagctgtgtg atgtggccca tgagtttgga gcaatcacct tcgtggatga | 1440 |
| ggtccacgca gtggggcttt atggggctcg aggcggaggg attggggatc gggatggagt | 1500 |
| catgccaaaa atggacatca tttctggaac acttggcaaa gcctttggtt gtgttggagg | 1560 |
| gtacatcgcc agcacgagtt ctctgattga caccgtacgg tcctatgctg ctggcttcat | 1620 |
| cttcaccacc tctctgccac ccatgctgct ggctggagcc ctggagtctg tgcggatcct | 1680 |
| gaagagcgct gagggacggg tgcttcgccg ccagcaccag cgcaacgtca aactcatgag | 1740 |
| acagatgcta atggatgccg gcctccctgt tgtccactgc cccagccaca tcatccctgt | 1800 |
| gcgggttgca gatgctgcta aaaacacaga agtctgtgat gaactaatga gcagacataa | 1860 |
| catctacgtg caagcaatca attaccctac ggtgccccgg ggagaagagc tcctacggat | 1920 |
| tgcccccacc cctcaccaca cccccagat gatgaactac ttccttgaga atctgctagt | 1980 |
| cacatggaag caagtggggc tggaactgaa gcctcattcc tcagctgagt gcaacttctg | 2040 |
| caggaggcca ctgcatttg aagtgatgag tgaaagagag aagtcctatt tctcaggctt | 2100 |
| gagcaagttg gtatctgctc aggcctgagc atgacctcaa ttatttcact taaccccagg | 2160 |
| ccattatcat atccagatgg tcttcagagt tgtctttata tgtgaattaa gttatattaa | 2220 |
| attttaatct atagtaaaaa catagtcctg gaaataaatt cttgcttaaa tggtgaaaaa | 2280 |
| a | 2281 |

<210> SEQ ID NO 54
<211> LENGTH: 640
<212> TYPE: PRT
<213> ORGANISM: Homo sapiens

<400> SEQUENCE: 54

Met Glu Ser Val Val Arg Arg Cys Pro Phe Leu Ser Arg Val Pro Gln
1               5                   10                  15

Ala Phe Leu Gln Lys Ala Gly Lys Ser Leu Leu Phe Tyr Ala Gln Asn
            20                  25                  30

```
Cys Pro Lys Met Met Glu Val Gly Ala Lys Pro Ala Pro Arg Ala Leu
            35                  40                  45
Ser Thr Ala Ala Val His Tyr Gln Gln Ile Lys Glu Thr Pro Pro Ala
 50                  55                  60
Ser Glu Lys Asp Lys Thr Ala Lys Ala Lys Val Gln Gln Thr Pro Asp
 65              70                  75                  80
Gly Ser Gln Gln Ser Pro Asp Gly Thr Gln Leu Pro Ser Gly His Pro
                85                  90                  95
Leu Pro Ala Thr Ser Gln Gly Thr Ala Ser Lys Cys Pro Phe Leu Ala
                100                 105                 110
Ala Gln Met Asn Gln Arg Gly Ser Ser Val Phe Cys Lys Ala Ser Leu
            115                 120                 125
Glu Leu Gln Glu Asp Val Gln Glu Met Asn Ala Val Arg Lys Glu Val
    130                 135                 140
Ala Glu Thr Ser Ala Gly Pro Ser Val Val Ser Val Lys Thr Asp Gly
145                 150                 155                 160
Gly Asp Pro Ser Gly Leu Leu Lys Asn Phe Gln Asp Ile Met Gln Lys
                165                 170                 175
Gln Arg Pro Glu Arg Val Ser His Leu Leu Gln Asp Asn Leu Pro Lys
            180                 185                 190
Ser Val Ser Thr Phe Gln Tyr Asp Arg Phe Phe Glu Lys Lys Ile Asp
        195                 200                 205
Glu Lys Lys Asn Asp His Thr Tyr Arg Val Phe Lys Thr Val Asn Arg
    210                 215                 220
Arg Ala His Ile Phe Pro Met Ala Asp Asp Tyr Ser Asp Ser Leu Ile
225                 230                 235                 240
Thr Lys Lys Gln Val Ser Val Trp Cys Ser Asn Asp Tyr Leu Gly Met
                245                 250                 255
Ser Arg His Pro Arg Val Cys Gly Ala Val Met Asp Thr Leu Lys Gln
            260                 265                 270
His Gly Ala Gly Ala Gly Gly Thr Arg Asn Ile Ser Gly Thr Ser Lys
        275                 280                 285
Phe His Val Asp Leu Glu Arg Glu Leu Ala Asp Leu His Gly Lys Asp
    290                 295                 300
Ala Ala Leu Leu Phe Ser Ser Cys Phe Val Ala Asn Asp Ser Thr Leu
305                 310                 315                 320
Phe Thr Leu Ala Lys Met Met Pro Gly Cys Glu Ile Tyr Ser Asp Ser
                325                 330                 335
Gly Asn His Ala Ser Met Ile Gln Gly Ile Arg Asn Ser Arg Val Pro
            340                 345                 350
Lys Tyr Ile Phe Arg His Asn Asp Val Ser His Leu Arg Glu Leu Leu
        355                 360                 365
Gln Arg Ser Asp Pro Ser Val Pro Lys Ile Val Ala Phe Glu Thr Val
    370                 375                 380
His Ser Met Asp Gly Ala Val Cys Pro Leu Glu Glu Leu Cys Asp Val
385                 390                 395                 400
Ala His Glu Phe Gly Ala Ile Thr Phe Val Asp Glu Val His Ala Val
                405                 410                 415
Gly Leu Tyr Gly Ala Arg Gly Gly Gly Ile Gly Asp Arg Asp Gly Val
            420                 425                 430
Met Pro Lys Met Asp Ile Ile Ser Gly Thr Leu Gly Lys Ala Phe Gly
        435                 440                 445
```

```
Cys Val Gly Gly Tyr Ile Ala Ser Thr Ser Ser Leu Ile Asp Thr Val
    450                 455                 460
Arg Ser Tyr Ala Ala Gly Phe Ile Phe Thr Thr Ser Leu Pro Pro Met
465                 470                 475                 480
Leu Leu Ala Gly Ala Leu Glu Ser Val Arg Ile Leu Lys Ser Ala Glu
                485                 490                 495
Gly Arg Val Leu Arg Arg Gln His Gln Arg Asn Val Lys Leu Met Arg
                500                 505                 510
Gln Met Leu Met Asp Ala Gly Leu Pro Val Val His Cys Pro Ser His
            515                 520                 525
Ile Ile Pro Val Arg Val Ala Asp Ala Ala Lys Asn Thr Glu Val Cys
        530                 535                 540
Asp Glu Leu Met Ser Arg His Asn Ile Tyr Val Gln Ala Ile Asn Tyr
545                 550                 555                 560
Pro Thr Val Pro Arg Gly Glu Glu Leu Leu Arg Ile Ala Pro Thr Pro
                565                 570                 575
His His Thr Pro Gln Met Met Asn Tyr Phe Leu Glu Asn Leu Leu Val
                580                 585                 590
Thr Trp Lys Gln Val Gly Leu Glu Leu Lys Pro His Ser Ser Ala Glu
            595                 600                 605
Cys Asn Phe Cys Arg Arg Pro Leu His Phe Glu Val Met Ser Glu Arg
        610                 615                 620
Glu Lys Ser Tyr Phe Ser Gly Leu Ser Lys Leu Val Ser Ala Gln Ala
625                 630                 635                 640

<210> SEQ ID NO 55
<211> LENGTH: 640
<212> TYPE: PRT
<213> ORGANISM: Homo sapiens

<400> SEQUENCE: 55

Met Glu Ser Val Val Arg Arg Cys Pro Phe Leu Ser Arg Val Pro Gln
1               5                   10                  15
Ala Phe Leu Gln Lys Ala Gly Lys Ser Leu Leu Phe Tyr Ala Gln Asn
                20                  25                  30
Cys Pro Lys Met Met Glu Val Gly Ala Lys Pro Ala Pro Arg Ala Leu
            35                  40                  45
Ser Thr Ala Ala Val His Tyr Gln Gln Ile Lys Glu Thr Pro Pro Ala
        50                  55                  60
Ser Glu Lys Asp Lys Thr Ala Lys Ala Lys Val Gln Gln Thr Pro Asp
65                  70                  75                  80
Gly Ser Gln Gln Ser Pro Asp Gly Thr Gln Leu Pro Ser Gly His Pro
                85                  90                  95
Leu Pro Ala Thr Ser Gln Gly Thr Ala Ser Lys Cys Pro Phe Leu Ala
                100                 105                 110
Ala Gln Met Asn Gln Arg Gly Ser Ser Val Phe Cys Lys Ala Ser Leu
            115                 120                 125
Glu Leu Gln Glu Asp Val Gln Glu Met Asn Ala Val Arg Lys Glu Val
        130                 135                 140
Ala Glu Thr Ser Ala Gly Pro Ser Val Val Ser Val Lys Thr Asp Gly
145                 150                 155                 160
Gly Asp Pro Ser Gly Leu Leu Lys Asn Phe Gln Asp Ile Met Gln Lys
                165                 170                 175
Gln Arg Pro Glu Arg Val Ser His Leu Leu Gln Asp Asn Leu Pro Lys
                180                 185                 190
```

```
Ser Val Ser Thr Phe Gln Tyr Asp Arg Phe Glu Lys Lys Ile Asp
    195                 200                 205

Glu Lys Lys Asn Asp His Thr Tyr Arg Val Phe Lys Thr Val Asn Arg
210                 215                 220

Arg Ala His Ile Phe Pro Met Ala Asp Tyr Ser Asp Ser Leu Ile
225                 230                 235                 240

Thr Lys Lys Gln Val Ser Val Trp Cys Ser Asn Asp Tyr Leu Gly Met
                245                 250                 255

Ser Arg His Pro Arg Val Cys Gly Ala Val Met Asp Thr Leu Lys Gln
                260                 265                 270

His Gly Ala Gly Ala Gly Gly Thr Arg Asn Ile Ser Gly Thr Ser Lys
            275                 280                 285

Phe His Val Asp Leu Glu Arg Glu Leu Ala Asp Leu His Gly Lys Asp
            290                 295                 300

Ala Ala Leu Leu Phe Ser Ser Cys Phe Val Ala Asn Asp Ser Thr Leu
305                 310                 315                 320

Phe Thr Leu Ala Lys Met Met Pro Gly Cys Glu Ile Tyr Ser Asp Ser
                325                 330                 335

Gly Asn His Ala Ser Met Ile Gln Gly Ile Arg Asn Ser Arg Val Pro
                340                 345                 350

Lys Tyr Ile Phe Arg His Asn Asp Val Ser His Leu Arg Glu Leu Leu
            355                 360                 365

Gln Arg Ser Asp Pro Ser Val Pro Lys Ile Val Ala Phe Glu Thr Val
            370                 375                 380

His Ser Met Asp Gly Ala Val Cys Pro Leu Glu Leu Cys Asp Val
385                 390                 395                 400

Ala His Glu Phe Gly Ala Ile Thr Phe Val Asp Glu Val His Ala Val
                405                 410                 415

Gly Leu Tyr Gly Ala Arg Gly Gly Ile Gly Asp Arg Asp Gly Val
                420                 425                 430

Met Pro Lys Met Asp Ile Ile Ser Gly Thr Leu Gly Lys Ala Phe Gly
            435                 440                 445

Cys Val Gly Gly Tyr Ile Ala Ser Thr Ser Ser Leu Ile Asp Thr Val
450                 455                 460

Arg Ser Tyr Ala Ala Gly Phe Ile Phe Thr Thr Ser Leu Pro Pro Met
465                 470                 475                 480

Leu Leu Ala Gly Ala Leu Glu Ser Val Arg Ile Leu Lys Ser Ala Glu
                485                 490                 495

Gly Arg Val Leu Arg Arg Gln His Gln Arg Asn Val Lys Leu Met Arg
                500                 505                 510

Gln Met Leu Met Asp Ala Gly Leu Pro Val Val His Cys Pro Ser His
            515                 520                 525

Ile Ile Pro Val Arg Val Ala Asp Ala Ala Lys Asn Thr Glu Val Cys
            530                 535                 540

Asp Glu Leu Met Ser Arg His Asn Ile Tyr Val Gln Ala Ile Asn Tyr
545                 550                 555                 560

Pro Thr Val Pro Arg Gly Glu Glu Leu Leu Arg Ile Ala Pro Thr Pro
                565                 570                 575

His His Thr Pro Gln Met Met Asn Tyr Phe Leu Glu Asn Leu Leu Val
            580                 585                 590

Thr Trp Lys Gln Val Gly Leu Glu Leu Lys Pro His Ser Ser Ala Glu
            595                 600                 605
```

Cys Asn Phe Cys Arg Arg Pro Leu His Phe Glu Val Met Ser Glu Arg
            610                 615                 620

Glu Lys Ser Tyr Phe Ser Gly Leu Ser Lys Leu Val Ser Ala Gln Ala
625                 630                 635                 640

<210> SEQ ID NO 56
<211> LENGTH: 17
<212> TYPE: DNA
<213> ORGANISM: Artificial Sequence
<220> FEATURE:
<223> OTHER INFORMATION: ALAS-1_forward primer

<400> SEQUENCE: 56
agccacatca tccctgt                                                  17

<210> SEQ ID NO 57
<211> LENGTH: 22
<212> TYPE: DNA
<213> ORGANISM: Artificial Sequence
<220> FEATURE:
<223> OTHER INFORMATION: ALAS-1_reverse primer

<400> SEQUENCE: 57
cgtagatgtt atgtctgctc at                                            22

<210> SEQ ID NO 58
<211> LENGTH: 22
<212> TYPE: DNA
<213> ORGANISM: Artificial Sequence
<220> FEATURE:
<223> OTHER INFORMATION: ALAS-1 probe

<400> SEQUENCE: 58
tttagcagca tctgcaaccc gc                                            22

<210> SEQ ID NO 59
<211> LENGTH: 3212
<212> TYPE: DNA
<213> ORGANISM: Homo sapiens

<400> SEQUENCE: 59
gagtaggcgc gagctaagca ggaggcggag gcggaggcgg agggcgaggg gcggggagcg      60
ccgcctggag cgcggcaggt catattgaac attccagata cctatcatta ctcgatgctg     120
ttgataacag caagatggct tgaactcag ggtcaccacc agctattgga ccttactatg      180
aaaaccatgg ataccaaccg gaaaacccct atcccgcaca gcccactgtg gtccccactg     240
tctacgaggt gcatccggct cagtactacc cgtcccccgt gccccagtac gccccgaggg     300
tcctgacgca ggcttccaac cccgtcgtct gcacgcagcc caaatcccca tccgggacag     360
tgtgcacctc aaagactaag aaagcactgt gcatcacctt gaccctgggg accttcctcg     420
tgggagctgc gctggccgct ggcctactct ggaagttcat gggcagcaag tgctccaact     480
ctgggataga gtgcgactcc tcaggtacct gcatcaaccc ctctaactgg tgtgatggcg     540
tgtcacactg ccccggcggg gaggacgaga atcggtgtgt tcgcctctac ggaccaaact     600
tcatccttca ggtgtactca tctcagagga agtcctggca ccctgtgtgc caagacgact     660
ggaacgagaa ctacgggcgg gcggcctgca gggacatggg ctataagaat aattttttact     720 ctagccaagg aatagtggat gacagcggat ccaccagctt tatgaaactg aacacaagtg     780
ccggcaatgt cgatatctat aaaaaactgt accacagtga tgcctgttct tcaaaagcag     840
tggtttcttt acgctgtata gcctgcgggg tcaacttgaa ctcaagccgc cagagcagga     900

```
ttgtgggcgg cgagagcgcg ctcccggggg cctggccctg gcaggtcagc ctgcacgtcc      960
agaacgtcca cgtgtgcgga ggctccatca tcaccccga gtggatcgtg acagccgccc     1020
actgcgtgga aaaacctctt aacaatccat ggcattggac ggcatttgcg gggattttga     1080
gacaatcttt catgttctat ggagccggat accaagtaga aaaagtgatt tctcatccaa     1140
attatgactc caagaccaag aacaatgaca ttgcgctgat gaagctgcag aagcctctga     1200
cttcaacga cctagtgaaa ccagtgtgtc tgcccaaccc aggcatgatg ctgcagccag      1260
aacagctctg ctggattccc gggtgggggg ccaccgagga gaaagggaag acctcagaag     1320
tgctgaacgc tgccaaggtg cttctcattg agacacagat atgcaacagc agatatgtct     1380
atgacaacct gatcacacca gccatgatct gtgccggctt cctgcagggg aacgtcgatt     1440
cttgccaggg tgacagtgga gggctctgg tcacttcgaa gaacaatatc tggtggctga      1500
taggggatac aagctggggt tctggctgtg ccaaagctta cagaccagga gtgtacggga     1560
atgtgatggt attcacggac tggattatc gacaaatgag ggcagacggc taatccacat      1620
ggtcttcgtc cttgacgtcg ttttacaaga aaacaatggg gctggttttg cttccccgtg     1680
catgatttac tcttagagat gattcagagg tcacttcatt tttattaaac agtgaacttg     1740
tctggctttg gcactctctg ccattctgtg caggctgcag tggctcccct gcccagcctg     1800
ctctccctaa ccccttgtcc gcaaggggtg atggccggct ggttgtgggc actgcggtc      1860
aagtgtggag gagaggggtg gaggctgccc cattgagatc ttcctgctga gtcctttcca    1920
ggggccaatt ttggatgagc atggagctgt cacctctcag ctgctggatg acttgagatg    1980
aaaaggaga gacatggaaa gggagacagc caggtggcac ctgcagcggc tgccctctgg     2040
ggccacttgg tagtgtcccc agcctacctc tccacaaggg gattttgctg atgggttctt    2100
agagccttag cagccctgga tggtggccag aaataaaggg accagccctt catgggtggt    2160
gacgtggtag tcacttgtaa ggggaacaga aacattttg ttcttatggg gtgagaatat     2220
agacagtgcc cttggtgcga gggaagcaat tgaaaaggaa cttgccctga gcactcctgg    2280
tgcaggtctc cacctgcaca ttgggtgggg ctcctgggag ggagactcag ccttcctcct    2340
catcctccct gaccctgctc ctagcaccct ggagagtgca catgcccctt ggtcctggca    2400
gggcgccaag tctggcacca tgttggcctc ttcaggcctg ctagtcactg gaaattgagg    2460
tccatggggg aaatcaagga tgctcagttt aaggtacact gtttccatgt tatgtttcta    2520
cacattgcta cctcagtgct cctggaaact tagcttttga tgtctccaag tagtccacct    2580
tcatttaact ctttgaaact gtatcatctt tgccaagtaa gagtggtggc ctatttcagc    2640
tgctttgaca aaatgactgg ctcctgactt aacgttctat aaatgaatgt gctgaagcaa    2700
agtgccatg tgtgcggcga agaagagaaa gatgtgtttt gttttggact ctctgtggtc     2760
ccttccaatg ctgtgggttt ccaaccaggg gaagggtccc ttttgcattg ccaagtgcca    2820
taaccatgag cactactcta ccatggttct gcctcctggc caagcaggct ggtttgcaag    2880
aatgaaatga atgattctac agctaggact taaccttgaa atggaaagtc atgcaatccc    2940
atttgcagga tctgtctgtg cacatgcctc tgtagagagc agcattccca gggaccttgg    3000
aaacagttgg cactgtaagg tgcttgctcc ccaagacaca tcctaaaagg tgttgtaatg    3060
gtgaaaacgt cttccttctt tattgcccct tcttatttat gtgaacaact gtttgtcttt    3120
ttttgtatct ttttaaact gtaaagttca attgtgaaaa tgaatatcat gcaaataaat     3180
tatgcaattt tttttcaaa gtaaaaaaaa aa                                   3212
```

<210> SEQ ID NO 60
<211> LENGTH: 4945
<212> TYPE: DNA
<213> ORGANISM: Homo sapiens

<400> SEQUENCE: 60

| | | | | | |
|---|---|---|---|---|---|
| ttcatttccc | agacttagca | caatctcatc | cgctctaaac | aacctcatca | aaactacttt | 60 |
| ctggtcagag | agaagcaata | attattatta | acatttatta | acgatcaata | aacttgatcg | 120 |
| cattatggcc | agcactatta | aggaagcctt | atcagttgtg | agtgaggacc | agtcgttgtt | 180 |
| tgagtgtgcc | tacggaacgc | cacacctggc | taagacagag | atgaccgcgt | cctcctccag | 240 |
| cgactatgga | cagacttcca | agatgagccc | acgcgtccct | cagcaggatt | ggctgtctca | 300 |
| accccccagcc | agggtcacca | tcaaaatgga | atgtaaccct | agccaggtga | atggctcaag | 360 |
| gaactctcct | gatgaatgca | gtgtggccaa | aggcgggaag | atggtgggca | gcccagacac | 420 |
| cgttgggatg | aactacggca | gctacatgga | ggagaagcac | atgccacccc | caaacatgac | 480 |
| cacgaacgag | cgcagagtta | tcgtgccagc | agatcctacg | ctatggagta | cagaccatgt | 540 |
| gcggcagtgg | ctggagtggg | cggtgaaaga | atatggcctt | ccagacgtca | acatcttgtt | 600 |
| attccagaac | atcgatggga | aggaactgtg | caagatgacc | aaggacgact | tccagaggct | 660 |
| cacccccagc | tacaacgccg | acatccttct | ctcacatctc | cactacctca | gagagactcc | 720 |
| tcttccacat | ttgacttcag | atgatgttga | taaagcctta | caaaactctc | cacggttaat | 780 |
| gcatgctaga | aacacagggg | gtgcagcttt | tattttccca | aatacttcag | tatatcctga | 840 |
| agctacgcaa | agaattacaa | ctaggccaga | tttaccatat | gagcccccca | ggagatcagc | 900 |
| ctggaccggt | cacggccacc | ccacgcccca | gtcgaaagct | gctcaaccat | ctccttccac | 960 |
| agtgcccaaa | actgaagacc | agcgtcctca | gttagatcct | tatcagattc | ttggaccaac | 1020 |
| aagtagccgc | cttgcaaatc | caggcagtgg | ccagatccag | ctttggcagt | cctcctgga | 1080 |
| gctcctgtcg | acagctcca | actccagctg | catcacctgg | gaaggcacca | acggggagtt | 1140 |
| caagatgacg | gatcccgacg | aggtggcccg | gcgctgggga | gagcggaaga | gcaaacccaa | 1200 |
| catgaactac | gataagctca | gccgcgcgcct | ccgttactac | tatgacaaga | acatcatgac | 1260 |
| caaggtccat | gggaagcgct | acgcctacaa | gttcgacttc | cacgggatcg | cccaggccct | 1320 |
| ccagccccac | cccccggagt | catctctgta | caagtacccc | tcagacctcc | cgtacatggg | 1380 |
| ctcctatcac | gcccacccac | agaagatgaa | ctttgtggcg | ccccaccctc | cagccctccc | 1440 |
| cgtgacatct | tccagttttt | ttgctgcccc | aaacccatac | tggaattcac | caactggggg | 1500 |
| tatataccccc | aacactaggc | tccccaccag | ccatatgcct | tctcatctgg | gcacttacta | 1560 |
| ctaaagacct | ggcggaggct | tttcccatca | gcgtgcattc | accagcccat | cgccacaaac | 1620 |
| tctatcggag | aacatgaatc | aaaagtgcct | caagaggaat | gaaaaaagct | ttactggggc | 1680 |
| tggggaagga | agccggggaa | gagatccaaa | gactcttggg | agggagttac | tgaagtctta | 1740 |
| ctacagaaat | gaggaggatg | ctaaaaatgt | cacgaatatg | gacatatcat | ctgtggactg | 1800 |
| accttgtaaa | agacagtgta | tgtagaagca | tgaagtctta | aggacaaagt | gccaaagaaa | 1860 |
| gtggtcttaa | gaaatgtata | aactttagag | tagagtttgg | aatcccacta | atgcaaactg | 1920 |
| ggatgaaact | aaagcaatag | aaacaacaca | gttttgacct | aacataccgt | ttataatgcc | 1980 |
| attttaagga | aaactacctg | tatttaaaaa | tagaaacata | tcaaaaacaa | gagaaaagac | 2040 |
| acgagagaga | ctgtggccca | tcaacagacg | ttgatatgca | actgcatggc | atgtgctgtt | 2100 |
| ttggttgaaa | tcaaatacat | tccgtttgat | ggacagctgt | cagctttctc | aaactgtgaa | 2160 |

```
gatgacccaa agtttccaac tcctttacag tattaccggg actatgaact aaaaggtggg    2220
actgaggatg tgtatagagt gagcgtgtga ttgtagacag aggggtgaag aaggaggag     2280 aagaggcaga gaaggaggag accagggctg ggaaagaaac ttctcaagca atgaagactg    2340
gactcaggac atttggggac tgtgtacaat gagttatgga gactcgaggg ttcatgcagt    2400
cagtgttata ccaaacccag tgttaggaga aaggacacag cgtaatggag aaaggggaag    2460
tagtagaatt cagaaacaaa aatgcgcatc tctttctttg tttgtcaaat gaaaattta    2520 actggaattg tctgatattt aagagaaaca ttcaggacct catcattatg tggggcttt    2580 gttctccaca gggtcaggta agagatggcc ttcttggctg ccacaatcag aaatcacgca    2640
ggcattttgg gtaggcggcc tccagttttc ctttgagtcg cgaacgctgt gcgtttgtca    2700
gaatgaagta tacaagtcaa tgttttttccc cctttttata taataattat ataacttatg   2760
catttataca ctacgagttg atctcggcca gccaaagaca cacgacaaaa gagacaatcg    2820
atataatgtg gccttgaatt ttaactctgt atgcttaatg tttacaatat gaagttatta    2880
gttcttagaa tgcagaatgt atgtaataaa ataagcttgg cctagcatgg caaatcagat    2940
ttatacagga gtctgcattt gcactttttt tagtgactaa agttgcttaa tgaaaacatg    3000
tgctgaatgt tgtggatttt gtgttataat ttactttgtc caggaacttg tgcaagggag    3060
agccaaggaa ataggatgtt tggcacccaa atggcgtcag cctctccagg tccttcttgc    3120
ctcccctcct gtctttttat tctagccct tttggaacag aaggaccccg ggtttcacat     3180
tggagcctcc atatttatgc ctggaatgga aagaggccta tgaagctggg gttgtcattg    3240
agaaattcta gttcagcacc tggtcacaaa tcaccttaa ttcctgctat gattaaaata    3300
catttgttga acagtgaaca agctaccact cgtaaggcaa actgtattat tactggcaaa    3360
taaagcgtca tggatagctg caatttctca ctttacagaa acaagggata acgtctagat    3420
ttgctgcggg gtttctcttt caggagctct cactaggtag acagctttag tcctgctaca    3480
tcagagttac ctgggcactg tggcttggga ttcactagcc ctgagcctga tgttgctggc    3540
tatcccttga agacaatgtt tatttccata atctagagtc agtttccctg ggcatctttt    3600 cttttgaatca caaatgctgc caaccttggt ccaggtgaag gcaactcaaa aggtgaaaat    3660
acaaggtgac cgtgcgaagg cgctagccga aacatcttag ctgaataggt ttctgaactg    3720 gccctttca tagctgtttc agggcctgtt tttttcacgt tgcagtcctt ttgctatgat    3780
tatgtgaagt tgccaaacct ctgtgctgtg gatgttttgg cagtgggctt gaagtcggc    3840 aggacacgat taccaatgct cctgacaccc cgtgtcattt ggattagacg gagcccaacc    3900
atccatcatt ttgcagcagc ctgggaaggc ccacaaagtg cccgtatctc cttagggaaa    3960
ataaataaat acaatcatga aagctggcag ttaggctgac ccaaactgtg ctaatggaaa    4020
agatcagtca ttttttatttt ggaatgcaaa gtcaagacac acctacattc ttcatagaaa    4080
tacacattta cttggataat cactcagttc tctcttcaag actgtctcat gagcaagatc    4140
ataaaaacaa gacatgatta tcatattcaa ttttaacaga tgttttccat tagatccctc    4200
aaccctccac ccccagtcca ggttattagc aagtcttatg agcaactggg ataattttgg    4260
ataacatgat aatactgagt tccttcaaat acataattct taaattgttt caaaatggca    4320
ttaactctct gttactgttg taatctaatt ccaaagcccc ctccaggtca tattcataat    4380
tgcatgaacc ttttctctct gtttgtccct gtctcttggc ttgccctgat gtatactcag    4440
actcctgtac aatcttactc ctgctggcaa gagatttgtc ttcttttctt gtcttcaatt   4500
```

-continued

```
ggctttcggg ccttgtatgt ggtaaaatca ccaaatcaca gtcaagactg tgttttgtt    4560 cctagtttga tgcccttatg tcccggaggg gttcacaaag tgctttgtca ggactgctgc    4620
agttagaagg ctcactgctt ctcctaagcc ttctgcacag atgtggcacc tgcaacccag    4680
gagcaggagc cggaggagct gccctctgac agcaggtgca gcagagatgg ctacagctca    4740
ggagctggga aggtgatggg gcacagggaa agcacagatg ttctgcagcg ccccaaagtg    4800
acccattgcc tggagaaaga gaagaaaata tttttttaaaa agctagttta tttagcttct    4860
cattaattca ttcaaataaa gtcgtgaggt gactaattag agaataaaaa ttactttgga    4920
ctactcaaaa atacaccaaa aaaaa    4945
```

```
<210> SEQ ID NO 61
<211> LENGTH: 492
<212> TYPE: PRT
<213> ORGANISM: Homo sapiens

<400> SEQUENCE: 61
```

```
Met Ala Leu Asn Ser Gly Ser Pro Pro Ala Ile Gly Pro Tyr Tyr Glu
1               5                   10                  15

Asn His Gly Tyr Gln Pro Glu Asn Pro Tyr Pro Ala Gln Pro Thr Val
            20                  25                  30

Val Pro Thr Val Tyr Glu Val His Pro Ala Gln Tyr Tyr Pro Ser Pro
        35                  40                  45

Val Pro Gln Tyr Ala Pro Arg Val Leu Thr Gln Ala Ser Asn Pro Val
    50                  55                  60

Val Cys Thr Gln Pro Lys Ser Pro Ser Gly Thr Val Cys Thr Ser Lys
65                  70                  75                  80

Thr Lys Lys Ala Leu Cys Ile Thr Leu Thr Leu Gly Thr Phe Leu Val
                85                  90                  95

Gly Ala Ala Leu Ala Ala Gly Leu Leu Trp Lys Phe Met Gly Ser Lys
            100                 105                 110

Cys Ser Asn Ser Gly Ile Glu Cys Asp Ser Ser Gly Thr Cys Ile Asn
        115                 120                 125

Pro Ser Asn Trp Cys Asp Gly Val Ser His Cys Pro Gly Gly Glu Asp
    130                 135                 140

Glu Asn Arg Cys Val Arg Leu Tyr Gly Pro Asn Phe Ile Leu Gln Val
145                 150                 155                 160

Tyr Ser Ser Gln Arg Lys Ser Trp His Pro Val Cys Gln Asp Asp Trp
                165                 170                 175

Asn Glu Asn Tyr Gly Arg Ala Ala Cys Arg Asp Met Gly Tyr Lys Asn
            180                 185                 190

Asn Phe Tyr Ser Ser Gln Gly Ile Val Asp Asp Ser Gly Ser Thr Ser
        195                 200                 205

Phe Met Lys Leu Asn Thr Ser Ala Gly Asn Val Asp Ile Tyr Lys Lys
    210                 215                 220

Leu Tyr His Ser Asp Ala Cys Ser Ser Lys Ala Val Val Ser Leu Arg
225                 230                 235                 240

Cys Ile Ala Cys Gly Val Asn Leu Asn Ser Ser Arg Gln Ser Arg Ile
                245                 250                 255

Val Gly Gly Glu Ser Ala Leu Pro Gly Ala Trp Pro Trp Gln Val Ser
            260                 265                 270

Leu His Val Gln Asn Val His Val Cys Gly Gly Ser Ile Ile Thr Pro
        275                 280                 285

Glu Trp Ile Val Thr Ala Ala His Cys Val Glu Lys Pro Leu Asn Asn
```

```
            290                 295                 300
Pro Trp His Trp Thr Ala Phe Ala Gly Ile Leu Arg Gln Ser Phe Met
305                 310                 315                 320

Phe Tyr Gly Ala Gly Tyr Gln Val Glu Lys Val Ile Ser His Pro Asn
                325                 330                 335

Tyr Asp Ser Lys Thr Lys Asn Asn Asp Ile Ala Leu Met Lys Leu Gln
                340                 345                 350

Lys Pro Leu Thr Phe Asn Asp Leu Val Lys Pro Val Cys Leu Pro Asn
            355                 360                 365

Pro Gly Met Met Leu Gln Pro Glu Gln Leu Cys Trp Ile Ser Gly Trp
        370                 375                 380

Gly Ala Thr Glu Glu Lys Gly Lys Thr Ser Glu Val Leu Asn Ala Ala
385                 390                 395                 400

Lys Val Leu Leu Ile Glu Thr Gln Arg Cys Asn Ser Arg Tyr Val Tyr
                405                 410                 415

Asp Asn Leu Ile Thr Pro Ala Met Ile Cys Ala Gly Phe Leu Gln Gly
                420                 425                 430

Asn Val Asp Ser Cys Gln Gly Asp Ser Gly Gly Pro Leu Val Thr Ser
            435                 440                 445

Lys Asn Asn Ile Trp Trp Leu Ile Gly Asp Thr Ser Trp Gly Ser Gly
        450                 455                 460

Cys Ala Lys Ala Tyr Arg Pro Gly Val Tyr Gly Asn Val Met Val Phe
465                 470                 475                 480

Thr Asp Trp Ile Tyr Arg Gln Met Arg Ala Asp Gly
                485                 490

<210> SEQ ID NO 62
<211> LENGTH: 479
<212> TYPE: PRT
<213> ORGANISM: Homo sapiens

<400> SEQUENCE: 62

Met Ala Ser Thr Ile Lys Glu Ala Leu Ser Val Val Ser Glu Asp Gln
1               5                   10                  15

Ser Leu Phe Glu Cys Ala Tyr Gly Thr Pro His Leu Ala Lys Thr Glu
                20                  25                  30

Met Thr Ala Ser Ser Ser Ser Asp Tyr Gly Gln Thr Ser Lys Met Ser
            35                  40                  45

Pro Arg Val Pro Gln Gln Asp Trp Leu Ser Gln Pro Pro Ala Arg Val
        50                  55                  60

Thr Ile Lys Met Glu Cys Asn Pro Ser Gln Val Asn Gly Ser Arg Asn
65                  70                  75                  80

Ser Pro Asp Glu Cys Ser Val Ala Lys Gly Gly Lys Met Val Gly Ser
                85                  90                  95

Pro Asp Thr Val Gly Met Asn Tyr Gly Ser Tyr Met Glu Glu Lys His
            100                 105                 110

Met Pro Pro Pro Asn Met Thr Thr Asn Glu Arg Arg Val Ile Val Pro
        115                 120                 125

Ala Asp Pro Thr Leu Trp Ser Thr Asp His Val Arg Gln Trp Leu Glu
    130                 135                 140

Trp Ala Val Lys Glu Tyr Gly Leu Pro Asp Val Asn Ile Leu Leu Phe
145                 150                 155                 160

Gln Asn Ile Asp Gly Lys Glu Leu Cys Lys Met Thr Lys Asp Asp Phe
                165                 170                 175
```

-continued

Gln Arg Leu Thr Pro Ser Tyr Asn Ala Asp Ile Leu Leu Ser His Leu
            180                 185                 190

His Tyr Leu Arg Glu Thr Pro Leu Pro His Leu Thr Ser Asp Asp Val
        195                 200                 205

Asp Lys Ala Leu Gln Asn Ser Pro Arg Leu Met His Ala Arg Asn Thr
    210                 215                 220

Gly Gly Ala Ala Phe Ile Phe Pro Asn Thr Ser Val Tyr Pro Glu Ala
225                 230                 235                 240

Thr Gln Arg Ile Thr Thr Arg Pro Asp Leu Pro Tyr Glu Pro Pro Arg
                245                 250                 255

Arg Ser Ala Trp Thr Gly His Gly His Pro Thr Pro Gln Ser Lys Ala
            260                 265                 270

Ala Gln Pro Ser Pro Ser Thr Val Pro Lys Thr Glu Asp Gln Arg Pro
        275                 280                 285

Gln Leu Asp Pro Tyr Gln Ile Leu Gly Pro Thr Ser Ser Arg Leu Ala
    290                 295                 300

Asn Pro Gly Ser Gly Gln Ile Gln Leu Trp Gln Phe Leu Leu Glu Leu
305                 310                 315                 320

Leu Ser Asp Ser Ser Asn Ser Ser Cys Ile Thr Trp Glu Gly Thr Asn
                325                 330                 335

Gly Glu Phe Lys Met Thr Asp Pro Asp Glu Val Ala Arg Arg Trp Gly
            340                 345                 350

Glu Arg Lys Ser Lys Pro Asn Met Asn Tyr Asp Lys Leu Ser Arg Ala
        355                 360                 365

Leu Arg Tyr Tyr Tyr Asp Lys Asn Ile Met Thr Lys Val His Gly Lys
    370                 375                 380

Arg Tyr Ala Tyr Lys Phe Asp Phe His Gly Ile Ala Gln Ala Leu Gln
385                 390                 395                 400

Pro His Pro Pro Glu Ser Ser Leu Tyr Lys Tyr Pro Ser Asp Leu Pro
                405                 410                 415

Tyr Met Gly Ser Tyr His Ala His Pro Gln Lys Met Asn Phe Val Ala
            420                 425                 430

Pro His Pro Pro Ala Leu Pro Val Thr Ser Ser Ser Phe Phe Ala Ala
        435                 440                 445

Pro Asn Pro Tyr Trp Asn Ser Pro Thr Gly Gly Ile Tyr Pro Asn Thr
450                 455                 460

Arg Leu Pro Thr Ser His Met Pro Ser His Leu Gly Thr Tyr Tyr
465                 470                 475

<210> SEQ ID NO 63
<211> LENGTH: 17
<212> TYPE: DNA
<213> ORGANISM: Artificial Sequence
<220> FEATURE:
<223> OTHER INFORMATION: TMPRSS2-ERG_forward primer

<400> SEQUENCE: 63
ctggagcgcg gcaggaa                                                  17

<210> SEQ ID NO 64
<211> LENGTH: 23
<212> TYPE: DNA
<213> ORGANISM: Artificial Sequence
<220> FEATURE:
<223> OTHER INFORMATION: TMPRSS2-ERG_reverse primer

<400> SEQUENCE: 64

```
ccgtaggcac actcaaacaa cga                                    23

<210> SEQ ID NO 65
<211> LENGTH: 21
<212> TYPE: DNA
<213> ORGANISM: Artificial Sequence
<220> FEATURE:
<223> OTHER INFORMATION: TMPRSS2-ERG probe

<400> SEQUENCE: 65
ttatcagttg tgagtgagga c                                      21
```

POST-SURGICAL RISK STRATIFICATION BASED ON PDE4D VARIANT EXPRESSION, SELECTED ACCORDING TO TMPRSS2-ERG FUSION STATUS, AND POST-SURGICAL CLINICAL VARIABLES

FIELD OF THE INVENTION

The invention relates to a method of post-surgical risk stratification of a prostate cancer subject. Moreover, the invention relates to a diagnostic kit, to a use of the kit in a method of post-surgical risk stratification of a prostate cancer subject, to a use of a gene expression profile for a phosphodiesterase 4D variant in post-surgical risk stratification of a prostate cancer subject, and to a corresponding computer program product.

BACKGROUND OF THE INVENTION

Cancer is a class of diseases in which a group of cells displays uncontrolled growth, invasion and sometimes metastasis. These three malignant properties of cancers differentiate them from benign tumors, which are self-limited and do not invade or metastasize. Prostate Cancer (PCa) is the most commonly-occurring non-skin malignancy in men. It displays as a heterogeneous disease with varying potential to develop progressively to deadly forms of the disease. Of the estimated 417,000 annual new cases in Europe, around 92,000 will die from their disease (see Ferlay J. et al., GLOBOCAN 2012 v1.0, Cancer Incidence and Mortality Worldwide: IARC CancerBase No. 11 [Internet], Lyon, France, International Agency for Research on Cancer, 2013).

Secondary treatment decisions after primary intervention are subject to post-surgical risk classification. Multiple algorithms for post-treatment risk assessment have been developed in the past (see Lughezani G. et al., "Predictive and prognostic models in radical prostatectomy candidates: A critical analysis of the literature", European Urology, Vol. 58, No. 5, pages 687-700, 2010). These risk stratification models are based on post-treatment clinical variables like the pathological Gleason score or the TNM Classification of Malignant Tumors. Based on the predicted risk of disease recurrence and progression towards more extensive forms of the disease (i.e., metastatic disease), the clinician may decide to perform a number of adjuvant secondary treatments, such as radiation therapy (e.g., external beam radiation therapy (EBRT)), hormonal therapy (e.g., anti-androgen treatment), chemotherapy (e.g., docetaxel or cabazitaxel), immunotherapy or any combination thereof. However, as such treatments come with substantial side effects, they should only be given to patients who really need such aggressive therapy to prevent disease progression and ultimately prostate cancer related death.

WO 2016/193110 A1 discloses methods for diagnosing, monitoring or prognosticating prostate cancer or the progression state of prostate cancer, wherein the state of the prostate cancer is determined based on the expression level of phosphodiesterase 4D (PDE4D) variants.

SUMMARY OF THE INVENTION

It is an objective of the invention to provide a method of post-surgical risk stratification of a prostate cancer subject, which may allow making better post-surgical, secondary treatment decisions. It is a further objective of the invention to provide a diagnostic kit, a use of the kit in a method of post-surgical risk stratification of a prostate cancer subject, a use of a gene expression profile for a phosphodiesterase 4D variant in post-surgical risk stratification of a prostate cancer subject, and a corresponding computer program product.

In a first aspect of the present invention, a method of post-surgical risk stratification of a prostate cancer subject is presented, comprising:
  determining a transmembrane protease, serine 2-ETS-related gene (TMPRSS2-ERG) fusion status in a biological sample obtained from the subject,
  determining a gene expression profile for each of one or more phosphodiesterase 4D variants in a biological sample obtained from the subject,
  determining an expression based risk score for the subject based on the gene expression profile for a selected phosphodiesterase 4D variant, and
  determining a post-surgical prognostic risk score for the subject based on the expression based risk score and post-surgical clinical variables of the subject,
  wherein the selected phosphodiesterase 4D variant is selected depending on the TMPRSS2-ERG fusion status,
  wherein, if the TMPRSS2-ERG fusion status is positive, the selected phosphodiesterase 4D variant is selected to be a first phosphodiesterase 4D variant, and, if the TMPRSS2-ERG fusion status is negative, the selected phosphodiesterase 4D variant is selected to be a second phosphodiesterase 4D variant.

The cAMP signaling pathway is known to play an important role in both the development and progression of prostate cancer (see Merkle D. and Hoffmann R., "Roles of cAMP and cAMP-dependent protein kinase in the progression of prostate cancer: Cross-talk with the androgen receptor", Cellular Signalling, Vol. 23, No. 3, pages 507-515, 2011). While a family of adenylate cyclases is responsible for the synthesis of cAMP, cyclic nucleotide phosphodiesterases (PDEs) appear to represent the only cellular mechanism for its destruction. PDEs provide both signal termination and, importantly, the compartmentalization of cAMP signaling within the 3D matrix of cells. This is achieved through the spatially discrete destruction of cAMP via sub-populations of distinct PDE isoforms sequestered by localized anchor proteins/signalosomes (see, for example, Conti M. and Beavo J., "Biochemistry and physiology of cyclic nucleotide phosphodiesterases: essential components in cyclic nucleotide signaling", Annual Review of Biochemistry, Vol. 76, pages 481-511, 2007). Thus changes in the expression and/or activity of distinct PDE isoforms can alter downstream signaling pathways during disease development and progression, providing potential targets for novel biomarkers and for targeted therapeutic intervention. Indeed, alterations in the expression of members of the cAMP-degrading PDE4 family appear to be associated with a number of different diseases, including stroke, acrodysostosis, schizophrenia, and COPD. Recently, it was shown that downregulation of a particular PDE4 isoform (PDE4D7) may have an impact on prostate cancer (see, for example, Böttcher R. et al., "Human phosphodiesterase 4D7 (PDE4D7) expression is increased in TMPRSS2-ERG positive primary prostate cancer and independently adds to a reduced risk of post-surgical disease progression", Britisch Journal of Cancer, Vol. 113, No. 10, pages 1502-1511, 2015). PDE4D7 isoform is a so-called long isoform as it contains both the UCR1 and UCR2 regulatory domains. UCR1 is found in long, but not short, PDE4 isoforms and allows for regulation by various protein kinases, including PKA and MK2 and also determines the functional outcome of catalytic unit phosphorylation by ERK. Functionally, it provides part of the cellular desensitization system to cAMP and enables cross-talk between signaling pathways that lead to the activation of ERK and AMPK, for example.

By determining an expression based risk score for a prostate cancer subject based on the gene expression profile of a phosphodiesterase 4D variant, additional molecular information representing the biology of the disease is obtained. The prognostic power of the phosphodiesterase 4D variant is utilized in post-surgical patient risk assessment by determining a post-surgical prognostic risk score that is not only based on post-surgical clinical variables of the subject but that is further based on the expression based risk score. This may allow for an improved stratification of the subject in a post-surgical setting that may result in better secondary treatment decisions. For instance, the post-surgical prognostic risk score may allow to make better recommendations on whether to select a specific post-surgical, secondary treatment for certain sub-populations of prostate cancer patients.

Moreover, the inventor has found that the prognostic power of different phosphodiesterase 4D variants depends on the molecular subtype of the prostate cancer, in particular, on whether the TMPRSS2-ERG fusion status of the prostate cancer is positive or negative. Thus, by selecting the phosphodiesterase 4D variant that is utilized in the post-surgical prognostic risk score depending on the TMPRSS2-ERG fusion status, the reliability and the expressiveness of the post-surgical prognostic risk score can be improved. In this respect, we note that the "selection" of the phosphodiesterase 4D variant relates to the utilization of the phosphodiesterase 4D variant in the post-surgical prognostic risk score depending on the TMPRSS2-ERG fusion status, wherein, if the TMPRSS2-ERG fusion status is positive, the selected phosphodiesterase 4D variant is selected to be a first phosphodiesterase 4D variant, and, if the TMPRSS2-ERG fusion status is negative, the selected phosphodiesterase 4D variant is selected to be a second phosphodiesterase 4D variant. The gene expression profile for the utilized phosphodiesterase 4D variant may be determined in the biological sample obtained from the subject as one of a number of gene expression profiles for different phosphodiesterase 4D variants without already knowing the TMPRSS2-ERG fusion status in the biological sample.

The term "biological sample" or "sample obtained from a subject" refers to any biological material obtained via suitable methods known to the person skilled in the art from a subject, e.g., a prostate cancer patient. The biological sample used may be collected in a clinically acceptable manner, e.g., in a way that nucleic acids (in particular RNA) or proteins are preserved.

The biological sample(s) may include body tissue and/or a fluid, such as, but not limited to, blood, sweat, and urine. Furthermore, the biological sample may contain a cell extract derived from or a cell population including an epithelial cell, such as a cancerous epithelial cell or an epithelial cell derived from tissue suspected to be cancerous. The biological sample may contain a cell population derived from a glandular tissue, e.g., the sample may be derived from the prostate of a male subject. Additionally, cells may be purified from obtained body tissues and fluids if necessary, and then used as the biological sample. In some realizations, the sample may be a tissue sample, a urine sample, a urine sediment sample, a blood sample, a saliva sample, a semen sample, a sample including circulating tumor cells, extracellular vesicles, a sample containing prostate secreted exosomes, or cell lines or cancer cell line.

In one particular realization, biopsy or resections samples may be obtained and/or used. Such samples may include cells or cell lysates.

It is also conceivable that the content of a biological sample is submitted to an enrichment step. For instance, a sample may be contacted with ligands specific for the cell membrane or organelles of certain cell types, e.g., prostate cells, functionalized for example with magnetic particles. The material concentrated by the magnetic particles may subsequently be used for detection and analysis steps as described herein above or below.

Furthermore, cells, e.g., tumor cells, may be enriched via filtration processes of fluid or liquid samples, e.g., blood, urine, etc. Such filtration processes may also be combined with enrichment steps based on ligand specific interactions as described herein above.

The term "prostate cancer" refers to a cancer of the prostate gland in the male reproductive system, which occurs when cells of the prostate mutate and begin to multiply out of control. Typically, prostate cancer is linked to an elevated level of prostate-specific antigen (PSA). In one embodiment of the present invention the term "prostate cancer" relates to a cancer showing PSA levels above 4.0. In another embodiment the term relates to cancer showing PSA levels above 2.0. The term "PSA level" refers to the concentration of PSA in the blood in ng/ml.

The term "non-progressive prostate cancer state" means that a sample of an individual does not show parameter values indicating "biochemical recurrence" and/or "clinical recurrence".

The term "progressive prostate cancer state" means that a sample of an individual shows parameter values indicating "biochemical recurrence" and/or "clinical recurrence".

The term "biochemical recurrence" generally refers to recurrent biological values of increased PSA indicating the presence of prostate cancer cells in a sample. However, it is also possible to use other markers that can be used in the detection of the presence or that rise suspicion of such presence.

The term "clinical recurrence" refers to the presence of clinical signs indicating the presence of tumor cells as measured, for example using in vivo imaging.

The term "prognosticating prostate cancer" as used herein refers to the prediction of the course or outcome of a diagnosed or detected prostate cancer, e.g., during a certain period of time, during a treatment or after a treatment. The term also refers to a determination of chance of survival or recovery from the disease, as well as to a prediction of the expected survival time of a subject. A prognosis may, specifically, involve establishing the likelihood for survival of a subject during a period of time into the future, such as 6 months, 1 year, 2 years, 3 years, 5 years, 10 years or any other period of time.

It is preferred that, if the TMPRSS2-ERG fusion status is positive, the selected phosphodiesterase 4D variant is selected to be phosphodiesterase 4D variant 7 (PDE4D7), and, if the TMPRSS2-ERG fusion status is negative, the selected phosphodiesterase 4D variant is selected to be phosphodiesterase 4D variant 5 (PDE4D5) or phosphodiesterase 4D variant 9 (PDE4D9).

As mentioned above, the inventor has found that the prognostic power of different phosphodiesterase 4D variants depends on the molecular subtype of the prostate cancer, in particular, on whether the TMPRSS2-ERG fusion status of the prostate cancer is positive or negative. In TMPRSS2-ERG fusion status positive prostate cancer, PDE4D7 was found to provide a good prognostic power, which was not found to be the case in prostate cancer with negative TMPRSS2-ERG fusion status. In contrast, in TMPRSS2-ERG fusion status negative prostate cancer, both PDE4D5 and PDE4D9 were found to have a suitable prognostic power, whereas this was not found to the same extend in prostate cancer with negative TMPRSS2-ERG fusion status.

The term "phosphodiesterase 4D7" or "PDE4D7" refers to the splice variant 7 of the human phosphodiesterase PDE4D, i.e., the human phosphodiesterase PDE4D7 gene, for example, to the sequence as defined in NCBI Reference Sequence: NM_001165899.1, specifically, to the nucleotide sequence as set forth in SEQ ID NO:6, which corresponds to the sequence of the above indicated NCBI Reference Sequence of the PDE4D7 transcript, and also relates to the corresponding amino acid sequence for example as set forth in SEQ ID NO:7, which corresponds to the protein sequence defined in NCBI Protein Accession Reference Sequence NP_001159371.1 encoding the PDE4D7 polypeptide. The term "phosphodiesterase 4D7" or "PDE4D7" also relates to the amplicon that can be generated by the primer pair PDE4D7_forward (SEQ ID NO:8) and the PDE4D7_reverse (SEQ ID NO:9) and can be detected by probe SEQ ID NO:10.

The PDE4D7 polypeptide can also be detected with primer pair PDE4D7-2_forward (SEQ ID NO:11) and the PDE4D7_reverse (SEQ ID NO:12) and can be detected by probe SEQ ID NO:13.

The term "phosphodiesterase 4D5" or "PDE4D5" refers to the splice variant 5 of the human phosphodiesterase PDE4D, i.e., the human phosphodiesterase PDE4D5 gene, for example, to the sequence as defined in NCBI Reference Sequence: NM_001197218.1, specifically, to the nucleotide sequence as set forth in SEQ ID NO:1, which corresponds to the sequence of the above indicated NCBI Reference Sequence of the PDE4D5 transcript, and also relates to the corresponding amino acid sequence for example as set forth in SEQ ID NO:2, which corresponds to the protein sequence defined in NCBI Protein Accession Reference Sequence NP_001184147.1 encoding the PDE4D5 polypeptide. The term "phosphodiesterase 4D5" or "PDE4D5" also relates to the amplicon that can be generated by the primer pair PDE4D5_forward (SEQ ID NO:3) and the PDE4D5_reverse (SEQ ID NO:4) and can be detected by probe SEQ ID NO:5.

The term "phosphodiesterase 4D9" or "PDE4D9" relates to the splice variant 9 of the human phosphodiesterase PDE4D, i.e., the human phosphodiesterase PDE4D9 gene, for example, to the sequence as defined in NCBI Reference Sequence: NM_001197220.1, specifically, to the nucleotide sequence as set forth in SEQ ID NO:14, which corresponds to the sequence of the above indicated NCBI Reference Sequence of the PDE4D9 transcript, and also relates to the corresponding amino acid sequence for example as set forth in SEQ ID NO:15 which corresponds to the protein sequence defined in NCBI Protein Accession Reference Sequence NP_001184149.1 encoding the PDE4D9 polypeptide. The term "phosphodiesterase 4D9" or "PDE4D9" also relates to the amplicon that can be generated by the primer pair PDE4D9_forward (SEQ ID NO:16) and the PDE4D9_reverse (SEQ ID NO:17) and can be detected by probe SEQ ID NO:18.

The terms "PDE4D5," "PDE4D7" and "PDE4D9" also comprise nucleotide sequences showing a high degree of homology to PDE4D5, PDE4D7 and PDE4D9 respectively, e.g., nucleic acid sequences being at least 75%, 80%, 85%, 90%, 91%, 92%, 93%, 94%, 95%, 96%, 97%, 98% or 99% identical to the sequence as set forth in SEQ ID NO:1, 6 or 14, respectively, or amino acid sequences being at least 75%, 80%, 85%, 90%, 91%, 92%, 93%, 94%, 95%, 96%, 97%, 98% or 99% identical to the sequence as set forth in SEQ ID NO:2, 7 or 15, respectively, or nucleic acid sequences encoding amino acid sequences being at least 75%, 80%, 85%, 90%, 91%, 92%, 93%, 94%, 95%, 96%, 97%, 98% or 99% identical to the sequence as set forth in SEQ ID NO:2, 7 or 15, respectively, or amino acid sequences being encoded by nucleic acid sequences being at least 75%, 80%, 85%, 90%, 91%, 92%, 93%, 94%, 95%, 96%, 97%, 98% or 99% identical to the sequence as set forth in SEQ ID NO:1, 6 or 14, respectively.

It is preferred that the post-surgical clinical variables comprise one or more of: (i) a prostate-specific antigen (PSA) level; (ii) a pathologic Gleason score (pGS); (iii) surgical margins (SM); (iv) an extracapsular extension (ECE); (v) a seminal vesicle invasion (SVI); and (vi) a lymph node invasion (LNI).

As mentioned above, multiple algorithms for post-treatment risk assessment have been developed in the past (see Lughezani G. et al., "Predictive and prognostic models in radical prostatectomy candidates: A critical analysis of the literature", European Urology, Vol. 58, No. 5, pages 687-700, 2010). One of the most extensively validated clinical risk algorithms for post-surgical decision support is the post-surgical CAPRA-S score (see Cooperberg M. R. et al., "The CAPRA-S score: A straightforward tool for improved prediction of outcomes after radical prostatectomy", Cancer, Vol. 117, No. 22, pages 5039-5046, 2011). The score is a combination of clinically available information, i.e., pre-operative PSA, pathologic Gleason score (pGS), surgical margins (SM), extracapsular extension (ECE), seminal vesicle invasion (SVI), and lymph node invasion (LNI). Initially published in 2011, this score has been validated in several studies since then (see, for example, Punnen S. et al., "Multi-institutional validation of the CAPRA-S score to predict disease recurrence and mortality after radical prostatectomy", European Urology, Vol. 65, No. 6, pages 1171-1177, 2014). By combining the molecular information provided by the expression based risk score with the information from such extensively validated post-surgical clinical variables, a post-surgical prognostic risk score with an improved prognostic power may be obtained.

It is also preferred that the method further comprises:
determining a post-surgical Cancer of the Prostate Risk Assessment (CAPRA-S) score for the subject,
wherein the post-surgical prognostic risk score is determined by combining the expression based risk score and the CAPRA-S score.

As mentioned above, the CAPRA-S score is one of the most extensively validated clinical risk algorithm for post-surgical decision support in prostate cancer. It provides a categorical score between 1 and 12 with three categories of low risk (CAPRA-S scores 0 to 2), intermediate risk (CAPRA-S scores 3 to 5), and high risk (CAPRA-S scores 6 to 12). In view of its current level of validation as a prognostic algorithm in prostate cancer as well as its easy-to-interpret single score output, the CAPRA-S score can advantageously be combined with the expression based risk score into a post-surgical prognostic risk score that may easily be determined in clinical practice and that may allow for a further improvement in post-surgical prognosis compared to the use of the post-surgical CAPRA-S algorithm alone.

It is further preferred that the CAPRA-S score is categorized, wherein depending on the category a number of points, preferably in the range from 1 to 3, are added in the post-surgical prognostic risk score.

By adding, depending on the category of the CAPRA-S score, a number of points in the post-surgical prognostic risk score, the respective category, for instance, high risk, contributes to the post-surgical prognostic risk score in a manner that is easy to understand and that intuitively reflects the category. In particular, if the number of points are in the range from 1 to 3, higher values correspond to a higher risk whereas lower values correspond to a lower risk (as indicated by the CAPRA-S score).

It is further preferred that the expression based risk score is a value in a predefined range, wherein depending on the value a number of points, preferably in the range from 0 to 3, are added in the post-surgical prognostic risk score.

This has the advantage that the expression based risk score is treated in the determination of the post-surgical prognostic risk score in substantially the same manner as the CAPRA-S score. In particular, if the number of points are in the range from 0 to 3, the expression based risk score and the CAPRA-S score have substantially the same impact on the expression based risk score, resulting in a good balance of the prognostic information provided by the two scores.

In one preferred example, the expression based risk score is a value in the range of 1 to 5 and three points are added in the post-surgical prognostic risk score if the value is in the range of 1 to <2, whereas two points are added if the value is in the range of 2 to <3, one point is added if the value is in the range of 3 to <4, and no point is added if the value is in the range of 4 to <5.

It is preferred that the method further comprises:
proposing a post-surgical, secondary treatment for the subject based on the post-surgical prognostic risk score, wherein the post-surgical, secondary treatment is selected from the group consisting of: radiation therapy, hormonal therapy, chemotherapy, immunotherapy or any combination thereof.

The radiation therapy may be, e.g., external beam radiation therapy (EBRT), the hormonal therapy may be, e.g., an anti-androgen treatment, and the chemotherapy may be based on, e.g., docetaxel or cabazitaxel).

It is further preferred that the method comprises:
normalizing the gene expression profile for the selected phosphodiesterase 4D variant with respect to one or more reference genes selected from the group consisting of: *Homo sapiens* hypoxanthine phosphoribosyltransferase 1 (HPRT1), Tubulin-Alpha-1b (TUBA1B), *Homo sapiens* pumilio RNA-Binding Family Member (PUM1), and *Homo sapiens* TATA box binding protein (TBP), wherein the expression based risk score is determined based on the normalized gene expression profile.

By normalizing the gene expression profile with respect to one or more reference genes and by determining the expression based risk score is determined based on the normalized gene expression profile, variability in the determination of the expression based risk score can be reduced. This enables differentiation between real variations in gene expression profiles and variations due to the measurement processes. In this respect, it has been found that HPRT1, TUBA1B, PUM1, and TBP are particularly well suited as reference genes for normalizing the phosphodiesterase 4D variant gene expression profile.

The gene expression profile may be determined by detecting mRNA expression using one or more primers and/or probes and/or one or more sets thereof. Moreover, the gene expression profile may be determined by an amplification based method and/or microarray analysis and/or RNA sequencing. The determining of the gene expression profile may include performing Real-Time Quantitative Polymerase Chain Reaction (RT-qPCR) on RNA extracted from the biological sample. In other embodiments, the gene expression profile is determined by RNA sequencing, conventional PCR (using, e.g., end point analysis by gel electrophoresis), or multiplex-PCR. In the case of RT-qPCR, the determining of the gene expression profile may include determining a threshold cycle (Ct) value for the phosphodiesterase 4D variant and each of the one or more reference genes. The PCR may be performed with at least one primer and/or probe for measuring a reference gene selected from HPRT1, TUBA1B, PUM1, and TBP.

It is preferred that the one or more reference genes comprise at least two, or at least three of HPRT1, TUBA1B, PUM1, and TBP. In a particularly preferred realization, the one or more reference genes comprise all of HPRT1, TUBA1B, PUM1, and TBP.

Other reference genes which may be additionally or alternatively used for normalizing the phosphodiesterase 4D variant gene expression profile include: *Homo sapiens* actin, beta, mRNA (ACTB); *Homo sapiens* 60S acidic ribosomal phosphoprotein P0 mRNA (RPLP0); Polymerase (RNA) II (DNA Directed) Polypeptide A, 220 kDa (POLR2A); Beta-2-Microglobulin (B2M); and Aminolevulinate-Delta-Synthase (ALAS-1).

It is further preferred that the expression based risk score is determined with a scoring function, based on the gene expression profile for the selected phosphodiesterase 4D variant, the scoring function having been derived from gene expression profiles for biological samples of prostate cancer subjects.

Herein, it is particularly preferred that the scoring function is based on the normalized gene expression profile, e.g., the gene expression profile normalized with respect to all of HPRT1, TUBA1B, PUM1, and TBP, and that the scoring function is derived from correspondingly normalized gene expression profiles for biological samples of prostate cancer subjects. In one preferred realization, the scoring function is a linear transformation that transforms the normalized gene expression profile into a predefined range of values, such as the above-mentioned range of 1 to 5. Such a transformation can be determined by considering the frequency distribution of the normalized gene expression profile values for the phosphodiesterase 4D variant for biological samples of a population of prostate cancer subjects and by determining the transformation that transforms the frequency distribution into the desired range. By making use of such a scoring function, the expression based risk score can be expressed in a way that is intuitive to a user, such as in a small positive value range. This is similar to other categories used in the clinical routine, e.g., in histo-pathology grading (Gleason) or multi-parametric MRI radiology scoring (PIRADS).

In one particular realization, the expression based risk score is determined as follows:

$$EBRS=(((PDE4D\_\text{norm}+A)*B)+1), \tag{1}$$

where "EBRS" is the expression based risk score, "PDE4D_norm" is the normalized phosphodiesterase 4D variant gene expression profile value, and A and B are variables.

In one example, where the phosphodiesterase 4D variant is selected to be PDE4D7, A may be about 6-8, such as 6.7167499999999, B may be 0.4-0.45, such as 0.420780231744713, and the expression based risk score may be a value in the range of 1 to 5 (as mentioned above). In another example, where the phosphodiesterase 4D variant is selected to be PDE4D5, A may be about 4-6, such as 4.59820000000001, and B may be 0.5-0.6, such as 0.556517867701789. In yet another example, where the phosphodiesterase 4D variant is selected to be PDE4D9, A may be about 3-5, such as 3.90929999999999, and B may be 0.5-0.6, such as 0.548770240189875.

The expression based risk score can may also be classified or categorized into one of at least two risk groups, based on the value of the expression based risk score. For example, there may be two risk groups, or three risk groups, or four risk groups, or more than four predefined risk groups. Each risk group covers a respective range of (non-overlapping) expression based risk scores. For example, a risk group may include all expression based risk scores from 1 to <2, another risk group from 2 to <3, another risk group from 3 to <4, and another risk group from 4 to <5.

It is particularly preferred that the determining of the gene expression profile for the selected phosphodiesterase 4D variant comprises performing RT-qPCR on RNA extracted from the biological sample, wherein a Cq value is determined for the selected phosphodiesterase 4D variant and for each of the one or more reference genes, and wherein the determining of the expression based risk score includes normalizing the Cq value for the selected phosphodiesterase 4D variant using the Cq value for each of the one or more reference genes and computing the expression based risk score as a linear function of the normalized Cq value. For example, the normalized Cq value for the selected phosphodiesterase 4D variant may be generated by applying the following:

$$N(Cq_{PDE4D}) = \text{Mean}(Cq_{ref\_genes}) - (Cq_{PDE4D}), \quad (2)$$

where $N(Cq_{PDE4D})$ is the normalized genes expression profile value (quantification cycle, Cq) of the selected phosphodiesterase 4D variant, $\text{Mean}(Cq_{ref\_genes})$ is the arithmetic mean of the PCR Cq values of the one or more reference gene, and $Cq_{PDE4D}$ is the PCR Cq value of the selected phosphodiesterase 4D variant.

In a further aspect of the present invention, a diagnostic kit is presented, comprising:
at least one primer and/or probe for determining a transmembrane protease, serine 2-ETS-related gene (TMPRSS2-ERG) fusion status in a biological sample obtained from a prostate cancer subject,
at least one primer and/or probe for determining the gene expression profile for each of one or more phosphodiesterase 4D variants in a biological sample obtained from the subject; and
optionally, at least one primer and/or probe for determining the gene expression profile for one or more reference genes selected from the group consisting of: *Homo sapiens* hypoxanthine phosphoribosyltransferase 1 (HPRT1), Tubulin-Alpha-1b (TUBA1B) *Homo sapiens pumilio* RNA-Binding Family Member (PUM1), and *Homo sapiens* TATA box binding protein (TBP); and
optionally, at least one agent for determining a prostate-specific antigen (PSA) level in a biological sample obtained from the subject; and
optionally, instructions for computing a post-surgical prognostic risk score based on the gene expression profile for a selected phosphodiesterase 4D variant and post-surgical clinical variables of the subject, the instructions optionally being stored on a computer program product which, when executed by a computer, perform a method comprising:
determining the TMPRSS2-ERG fusion status,
determining an expression based risk score for the subject based on the gene expression profile for the selected phosphodiesterase 4D variant, and
determining the post-surgical prognostic risk score for the subject based on the expression based risk score and the post-surgical clinical variables of the subject,
wherein the selected phosphodiesterase 4D variant is selected depending on the TMPRSS2-ERG fusion status,
wherein, if the TMPRSS2-ERG fusion status is positive, the selected phosphodiesterase 4D variant is selected to be a first phosphodiesterase 4D variant, and, if the TMPRSS2-ERG fusion status is negative, the selected phosphodiesterase 4D variant is selected to be a second phosphodiesterase 4D variant, optionally, wherein the method comprises:
normalizing the gene expression profile for the selected phosphodiesterase 4D variant with respect to the one or more reference genes, wherein the expression based risk score is determined based on the normalized gene expression profile for the selected phosphodiesterase 4D variant, optionally, wherein the at least one agent for determining the prostate-specific antigen (PSA) level can be, e.g., a PSA specific antibody or the like.

In a further aspect of the present invention, a use of the kit as defined in claim 13 in a method of post-surgical risk stratification of a prostate cancer subject is presented.

In a further aspect of the present invention, a use of a gene expression profile for a selected phosphodiesterase 4D variant in post-surgical risk stratification of a prostate cancer subject is presented, comprising:
determining a transmembrane protease, serine 2-ETS-related gene (TMPRSS2-ERG) fusion status in a biological sample obtained from the subject,
determining a gene expression profile for each of one or more phosphodiesterase 4D variants in a biological sample obtained from the subject,
determining an expression based risk score for the subject based on the gene expression profile for a selected phosphodiesterase 4D variant, and
determining a post-surgical prognostic risk score for the subject based on the expression based risk score and post-surgical clinical variables of the subject,
wherein the selected phosphodiesterase 4D variant is selected depending on the TMPRSS2-ERG fusion status,
wherein, if the TMPRSS2-ERG fusion status is positive, the selected phosphodiesterase 4D variant is selected to be a first phosphodiesterase 4D variant, and, if the TMPRSS2-ERG fusion status is negative, the selected phosphodiesterase 4D variant is selected to be a second phosphodiesterase 4D variant.

In a further aspect of the present invention, a computer program product is presented comprising instructions which, when the program is executed by a computer, cause the computer to carry out a method comprising:
determining a transmembrane protease, serine 2-ETS-related gene (TMPRSS2-ERG) fusion status in a biological sample obtained from a prostate cancer subject,
determining a gene expression profile for each of one or more phosphodiesterase 4D variants in a biological sample obtained from the subject,
determining an expression based risk score for the subject based on the gene expression profile for a selected phosphodiesterase 4D variant, and determining a post-surgical prognostic risk score for the subject based on the expression based risk score and post-surgical clinical variables of the subject, wherein the selected phosphodiesterase 4D variant is selected depending on the TMPRSS2-ERG fusion status, wherein, if the TMPRSS2-ERG fusion status is positive, the selected phosphodiesterase 4D variant is selected to be a first phosphodiesterase 4D variant, and, if the TMPRSS2-ERG fusion status is negative, the selected phosphodiesterase 4D variant is selected to be a second phosphodiesterase 4D variant.

It shall be understood that the method as described herein, the diagnostic kit as described herein, the use of the diagnostic kit as described herein, the use of a gene expression profile described herein, and the computer program as described herein have similar and/or identical preferred embodiments.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Overview of Post-Surgical Risk Stratification

Figure 1:
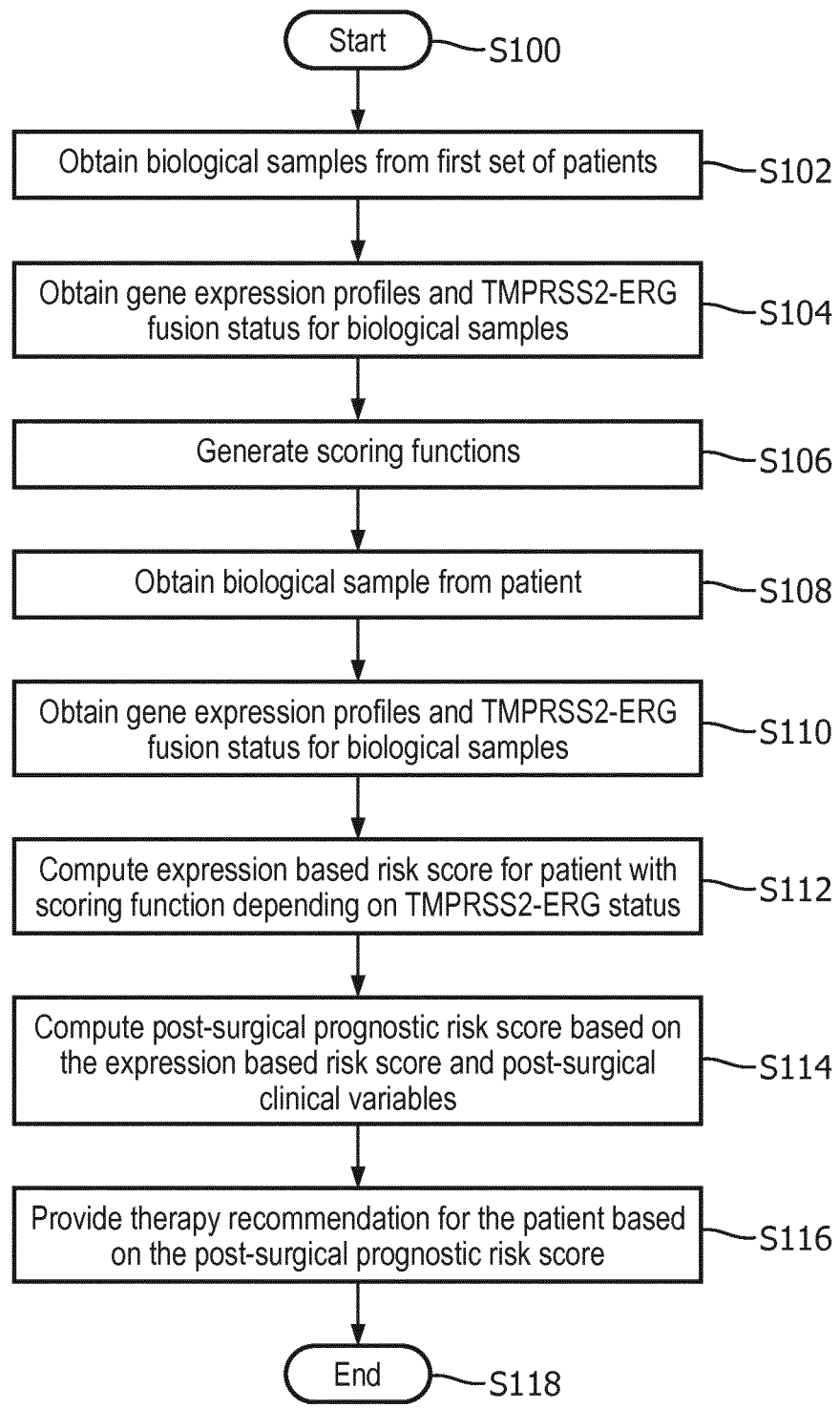
FIG. 1 shows schematically and exemplarily a flowchart of an embodiment of a method of post-surgical risk stratification of a prostate cancer subject.

FIG. 1 shows schematically and exemplarily a flowchart of an embodiment of a method of post-surgical risk stratification of a prostate cancer subject.

The method begins at step S100.

At step S102, a biological sample is obtained from each of a first set of patients (subjects) diagnosed with prostate cancer. Preferably, monitoring prostate cancer has been performed for these prostate cancer patients over a period of time, such as at least one year, or at least two years, or about five years, after obtaining the biological sample.

At step S104, gene expression profiles for PDE4D5, PDE4D7 and PDE4D9, respectively, are obtained for each of the biological samples obtained from the first set of patients, e.g., by performing RT-qPCR (real-time quantitative PCR) on RNA extracted from each biological sample. The exemplary gene expression profiles include an expression level (e.g., value) for PDE4D5, PDE4D7 and PDE4D9, respectively, which can be normalized using value(s) for each of a set of reference genes, such as HPRT1, TUBA B, PUM1, and/or TBP. In one realization, the gene expression profile value of PDE4D5, PDE4D7 and PDE4D9, respectively, is normalized to with respect to one or more reference genes selected from the group consisting of HPRT1, TUBA B, PUM1, and TBP, e.g., at least one, or at least two, or at least three, or, preferably, all of these reference genes. Further in step 104, the TMPRSS2-ERG fusion status is obtained for each of the biological samples obtained from the first set of patients, e.g., by performing RT-qPCR.

At step S106, scoring functions for assigning an expression based risk score are determined, based on the gene expression profiles for PDE4D5, PDE4D7 and PDE4D9, respectively, obtained for at least some of the biological samples obtained for the first set of patients and respective results obtained from the monitoring. In particular, for determining the scoring function based on the gene expression profiles for PDE4D7 only the gene expression profiles obtained from the biological samples in which the TMPRSS2-ERG fusion status is positive are used. In contrast, for determining the scoring function based on the gene expression profiles for PDE4D5 and PDE4D9, respectively, only the gene expression profiles obtained from the biological samples in which the TMPRSS2-ERG fusion status is negative are used. In one preferred realization, the scoring functions are linear transformations that transform the normalized gene expression profiles into a predefined range of values, such as the above-mentioned range of 1 to 5. As mentioned above, such a transformation can be determined by considering the frequency distribution of the normalized gene expression profile values for PDE4D5, PDE4D7 and PDE4D9, respectively, for biological samples of a population of prostate cancer subjects (here, the TMPRSS2-ERG fusion status positive subset and the TMPRSS2-ERG fusion status is negative subset of the first set of patients) and by determining the transformation that transforms the frequency distribution into the desired range. In one particular realization, the expression based risk score is determined as specified in Eq. (1) above.

At step S108, a biological sample is obtained from a patient (subject or individual). The patient can be a new patient or one of the first set.

At step S110, a gene expression profile is obtained for PDE4D5, PDE4D7 and PDE4D9, respectively, e.g., by performing PCR on the biological sample. In one realization, the gene expression profile value of PDE4D5, PDE4D7 and PDE4D9, respectively, is normalized to with respect to one or more reference genes selected from the group consisting of HPRT1, TUBA1B, PUM1, and TBP, e.g., at least one, or at least two, or at least three, or, preferably, all of these reference genes. This is substantially the same as in step S104. Moreover, like in step S104, the TMPRSS2-ERG fusion status is obtained for the biological sample obtained from the patient, e.g., by performing RT-qPCR.

Other reference genes which may be additionally or alternatively used in steps S104 and S110 include: *Homo sapiens* actin, beta, mRNA (ACTB); *Homo sapiens* 60S acidic ribosomal phosphoprotein P0 mRNA (RPLP0); Polymerase (RNA) II (DNA Directed) Polypeptide A, 220 kDa (POLR2A); Beta-2-Microglobulin (B2M); and Aminolevulinate-Delta-Synthase (ALAS-1).

At step S112, an expression based risk score is determined for the patient. If the TMPRSS2-ERG fusion status for the biological sample obtained from the patient is positive, the expression based risk score is determined based on the gene expression profile for PDE4D7, using the derived scoring function for PDE4D7. In contrast, if the TMPRSS2-ERG fusion status for the biological sample obtained from the patient is negative, the expression based risk score is determined based on the gene expression profile for PDE4D5 or PDE4D9, using the derived scoring function for PDE4D5 or PDE4D9.

At step S114, a post-surgical prognostic risk score is determined for the patient based on the expression based risk score and post-surgical clinical variables of the patient.

This will be described in more detail later in the description.

At S116, a therapy recommendation may be provided, e.g., to the patient or his or her guardian, to a doctor, or to another healthcare worker, based on the post-surgical prognostic risk score. To this end, the post-surgical prognostic risk score may be categorized into one of a predefined set of risk groups, based on the value of the post-surgical prognostic risk score. Providing a therapy recommendation may include one or more of: a) proposing a therapy for the patient based on the assigned risk group, with at least two of the risk groups being associated with different therapies, b) computing a post-surgical disease recurrence or progression risk prediction of the patient after prostate surgery; and c) computing a therapy response prediction for the patient after prostate surgery. Example therapies include at least a radiation therapy, a hormonal therapy, a chemotherapy, an immunotherapy or any combination thereof.

The method ends at S118.

Each of the risk groups may be associated with a respective proposed therapy, which differs in its aggressiveness. Each proposed therapy may be based on the results of the patients from the first set that were assigned to that risk group and is one which is predicted to provide the least aggressive therapy which does not exceed a threshold clinical risk for development of prostate cancer. In some cases, this enables a new patient to be assigned to a risk group associated with a less aggressive proposed therapy than would be the case for other risk profiling methods, such as the post-surgical CAPRA-S score.

In one embodiment, the gene expression profiles at steps S104 and S110 are determined by detecting mRNA expression using one or more primers and/or probes and/or one or more sets thereof.

A detailed description of PDE4D5, PDE4D7, PDE4D9 and the one or more reference genes including their Transcript ID (NCBI RefSeq) and the corresponding amino acid sequences for the primer pair and probe are shown in TABLE 1. This table also shows, for each gene, a sense primer, and antisense primer, and a probe sequence that specifically binds to the amplicon. TABLE 1 also comprises corresponding information for TMPRSS2-ERG.

TABLE 1

Exemplary primer and probe nucleic acid sequences

| Gene Name | Exemplary NCBI RefSeq | Exemplary Protein Accession | Sense Primer | Antisense printer | Probe Sequence |
| --- | --- | --- | --- | --- | --- |
| PDF4D5 | NM_001197218.1 (SEQ ID NO: 1) | NP_001184147.1 (SEQ ID NO: 2) | GCTTCTCAGCAG CAACATC(SEQ ID NO: 3) | TGCCATTGTCCA CATCAAAA(SEQ ID NO: 4) | ACAGCGGCGTTT CACGGTGGCACA (SEQ ID NO: 5) |
| PDE4D7 | NM_001165899.1 (SEQ ID NO: 6) | NP_001159371.1 (SEQ ID NO: 7) | GAACATTCAACG ACCAACCA(SEQ ID NO: 8) | TGCCATTGTCCA CATCAAAA(SEQ ID NO: 9) | CTGCCGCTGATT GCTATCACTTCT GCA(SEQ ID NO: 10) |
|  |  |  | CGCTGATTGCTA TCACTTCTGC (SEQ ID NO: 11) | GTCGTTGACTGT GGACAAAATTTG (SEQ ID NO: 12) | TTCCCTTGGATC CCATGACCAGCC CATAAGGGAA (SEQ ID NO: 13) |
| PDE4D9 | NM_001197220.1 (SEQ ID NO: 14) | NP_001184149.1 (SEQ ID NO: 15) | ATGAGCATTATT ATGAAGCCAAGA TC(SEQ ID NO: 16) | GTGCCATTGTCC ACATCAAAAC (SEQ ID NO: 17) | CTACAAGTTCCC TAAGGACTGCAG AGG (SEQ ID NO: 18) |
| HPRT1 | NM_000194.2 (SEQ ID NO: 19) | NP_000185.1 (SEQ ID NO: 20) | GAGGATTTGGAA AGGGTGTTTATT (SEQ ID NO: 21) | ACAGAGGGCTAC AATGTGATG (SEQ ID NO: 22) | ACGTCTTGCTCG AGATGTGATGAA GG(SEQ ID NO: 23) |
| TUBAIB | NM_006082.2 (SEQ ID NO: 24) | NP_006073.2 (SEQ ID NO: 25) | TGACTCCTTCAA CACCTTCTTC (SEQ ID NO: 26) | TGCCAGTGCGAA CTTCAT(SEQ ID NO: 27) | CCGGGCTGTGTT TGTAGACTTGGA (SEQ ID NO: 28) |

TABLE 1-continued

Exemplary primer and probe nucleic acid sequences

| Gene Name | Exemplary NCBI RefSeq | Exemplary Protein Accession | Sense Primer | Antisense printer | Probe Sequence |
|---|---|---|---|---|---|
| PUM1 | NM_001020658.1 (SEQ ID NO: 29); NM_014676.2 (SEQ ID NO: 30) | NP_001018494.1 (SEQ ID NO: 31); NP_055491.1 (SEQ ID NO: 32) | GCCAGCTTGTCT TCAATGAAAT (SEQ ID NO: 33) | CAAAGCCAGCTT CTGTTCAAG (SEQ ID NO: 34) | ATCCACCATGAG TTGGTAGGCAGC (SEQ ID NO: 35) |
| TBP | NM_003194.4 (SEQ ID NO: 36) | NP_003185.1 (SEQ ID NO: 37) | GCCAAGAAGAAA GTGAACATCAT (SEQ ID NO: 38) | ATAGGGATTCCG GGAGTCAT (SEQ ID NO: 39) | TCAGAACAACAG CCTGCCACCTTA (SEQ ID NO: 40) |
| ACTB | NM_001101.3 (SEQ ID NO: 41) | NP_001092.1 (SEQ ID NO: 42) | CCAACCGCGAGA AGATGA (SEQ ID NO: 43) | CCAGAGGCGTAC AGGGATAG (SEQ ID NO: 44) | CCATGTACGTTG CTATCCAGGCT (SEQ ID NO: 45) |
| RPLP0 | NM_001002.3 (SEQ ID NO: 46) | NP_444505.11 (SEQ ID NO: 47); NP_000993.1 (SEQ ID NO: 48) | TAAACCCTGCGT GGCAAT (SEQ ID NO: 49) | ACATTTCGGATA ATCATCCAATAG TTG (SEQ ID NO: 50) | AAGTAGTTGGAC TTCCAGGTCGCC (SEQ ID NO: 51) |
| ALAS-1 | NM_000688.5 (SEQ ID NO: 52); NM_199166.2 (SEQ ID NO: 53) | NP_000679.1 (SEQ ID NO: 54); NP_954635.1 (SEQ ID NO: 55) | AGCCACATCATC CCTGT (SEQ ID NO: 56) | CGTAGATGTTAT GTCTGCTCAT (SEQ ID NO: 57) | TTTAGCAGCATC TGCAACCCGC (SEQ ID NO: 58) |
| TMPRSS2-ERG | TMPRSS2: NM_005656.3 (SEQ ID NO: 59) ERG: NM_182918.3 (SEQ ID NO: 60) | TMPRSS2: NP005647.3 (SEQ ID NO: 61) ERG: NP891548.1 (SEQ ID NO: 62) | CTGGAGCGCGGC AGGAA (SEQ ID NO: 63) | CCGTAGGCACAC TCAAACAACGA (SEQ ID NO: 64) | TTATCAGTTGTG AGTGAGGAC (SEQ ID NO: 65) |

To explore the dependency of the prognostic power of PDE4D5, PDE4D7 and PDE4D9, respectively, on the molecular subtype of the prostate cancer in post-surgical patient risk assessment, the correlation to disease recurrence and progression in the context of post-surgical risk variables and algorithms like the post-surgical CAPRA-S score were investigated. Combination models of the expression based risk score together with post-surgical variables were developed in a surgery cohort. The results show that by selecting the phosphodiesterase 4D variant that is utilized in the post-surgical prognostic risk score depending on the TMPRSS2-ERG fusion status, there liability and the expressiveness of the post-surgical prognostic risk score can be improved.

EXAMPLES

Patient Cohort and Samples

A radical prostatectomy (RP) patient cohort, with the demographics shown in TABLE 2, was employed. A small biopsy punch (approximately 1 millimeter by 2 millimeters) of tissue was collected of a representative tumor area from the resected prostate from 656 patients who had been consecutively operated on between 2000 and 2004 at a single high-volume clinical center in Germany. Of the 656 patients 600 were selected for RNA Next-Generation Sequencing based on RNA quality and concentration in the sample after nucleic acid extraction. After quality control of the RNAseq data 575 patient samples were found eligible for statistical analysis.

TABLE 2

Demographics of the radical prostatectomy (RP) patient cohort

| Surgery: 2000-2004 | Parameter | RP cohort (#575) |
|---|---|---|
| Demographics & Clinical Range (median) | Age (at RP) | 41.3-79.2 (62.7) |
| | Preoperative PSA | 0.18-120 (7.1) |
| | Percent tumor in biopsy | 0.2-80 (10.3) |
| | Prostate Volume | 9-244 (42) |
| | PSA density | 0.1-24 (0.18) |
| CAPRA-S Risk Category No. of patients (percentage) | Low Risk (CAPRA-S 0-2) | 275 (47.8%) |
| | Intermediate Risk (CAPRA-S 3-5) | 220 (38.3%) |
| | High Risk (CAPRA-S > 5) | 80 (13.9%) |
| Post-Surgery Pathology No. of patients (percentage) | Pathologic Gleason 3 + 3 (GG1) | 190 (33%) |
| | Pathologic Gleason 3 + 4 (GG2) | 288 (50.1%) |
| | Pathologic Gleason 4 + 3 (GG3) | 73 (12.7%) |
| | Pathologic Gleason >= 4 + 4 (≥GG4) | 24 (4.2%) |
| | pT2 | 331 (57.6%) |
| | pT3 | 244 (42.4%) |

TABLE 2-continued

Demographics of the radical prostatectomy (RP) patient cohort

| Surgery: 2000-2004 | Parameter | RP cohort (#575) |
|---|---|---|
| | pT4 | 0 (0%) |
| | Positive Surgical Margins | 211 (36.7%) |
| | Capsular Status (=T3a) | 151 (26.3%) |
| | Positive Seminal Vesicle Invasion | 95 (16.5%) |
| | Positive Lymph Node Invasion | 20 (3.5%) |
| Follow-up | Mean | 104.3 |
| Months | IQR median | 120 |
| Outcome | <5 y BCR | 184/512 (35.9%) |
| No. of events/ | <10 y BCR | 228/428 (53.3%) |
| total no. of patients | <5 y CR | 49/503 (9.7%) |
| (percentage) | <10 y CR | 64/356 (18.0%) |
| Salvage Treatment | <5 y SRT | 141/506 (27.9%) |
| No. of events/ | <10 y SRT | 178/405 (44.0%) |
| total no. of patients | <5 y SADT | 79/498 (15.9%) |
| (percentage) | <10 y SADT | 118/370 (31.9%) |
| Mortality | <5 y PCSS | 14/483 (2.9%) |
| No. of events/ | <10 y PCSS | 26/321 (8.1%) |
| total no. of patients | <5 y OS | 27/496 (5.4%) |
| (percentage) | <10 y OS | 54/349 (15.5%) |

For patient age, preoperative PSA, percentage of tumor in biopsy, prostate volume, and PSA density, the minimum and maximum values in the cohort are shown, while the median values are depicted in parentheses. For the CAPRA-S risk categories, the number of patients and percentage per risk group are shown. In case of post-surgical pathology, the pathologic Gleason score (pGS) and Gleason grade groups, the pathology stages, the surgical margin status after prostatectomy and the tumor invasion status of the seminal vesicles and pelvic lymph nodes are indicated (by number and percentage of patients). In this respect, it is noted that the extracapsular extension was not provided as a primary parameter but was derived from pathology stage pT3a. The follow-up demonstrates the mean and median follow-up periods in months after surgery for all patients. The outcome category illustrates the cumulative 5- and 10-year biochemical recurrence (BCR) and clinical recurrence to metastases (CR) post-surgical primary treatment. The treatment category lists the cumulative 5- and 10-year start to salvage radiation therapy (SRT) or salvage androgen deprivation therapy (SADT) after surgery. Mortality is shown as prostate cancer specific survival (PCSS) as well as overall survival (OS). For all outcomes, the number of men experiencing the outcome per total number of men with the respective 5- or 10-year follow are shown, wherein the percentage of events is given in parentheses.

Laboratory Methods

All used laboratory methods including oligonucleotide primers and probes for RT-qPCR (quantitative real-time PCR), RNA extraction, and quality control and procedures to include/discard samples from the statistical analysis were as described previously in Böttcher R. et al. The primers and probes used for the RT-qPCR to measure the genes of interest as well as the reference genes are also given in TABLE 1.

Results

Figure 2:
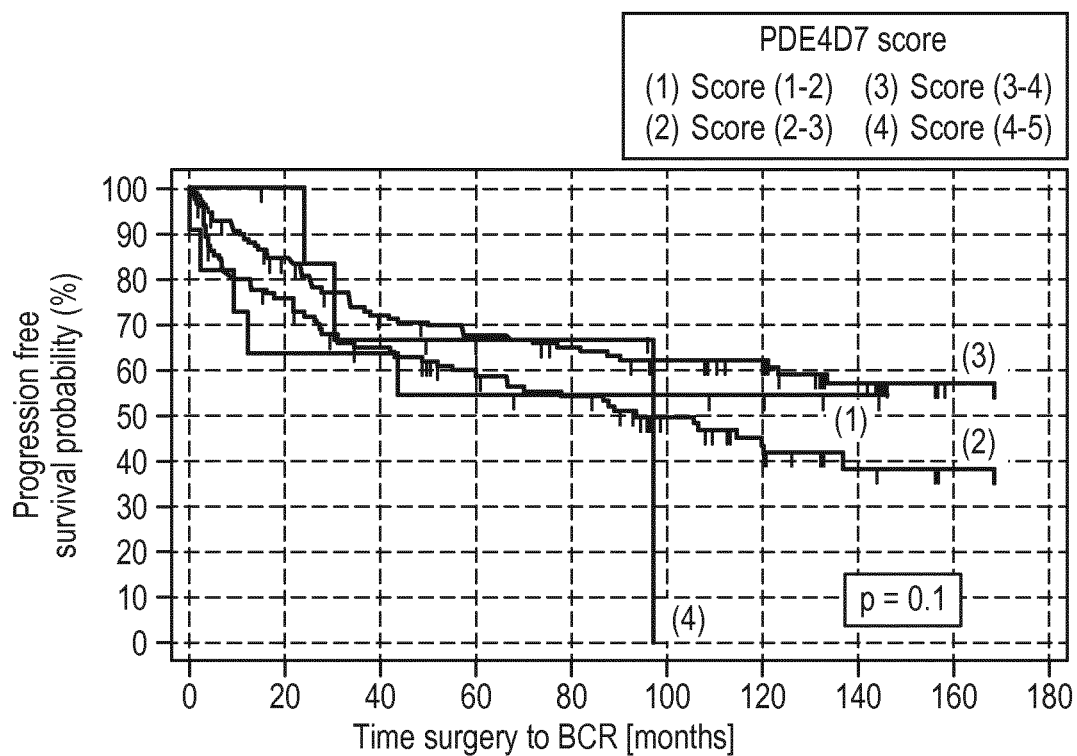
FIG. 2 shows a Kaplan Meier curve analysis of the expression based risk score based on PDE4D7 as measured on the TMPRRS2-ERG fusion negative ("TMRPRSS2-ER-") prostate cancer patient cohort (n=258 patients; 43.8% events).

Post-Surgical Prognostic Risk Score Based on the Expression Based Risk Score and Post-Surgical Clinical Variables FIG. 2 shows a Kaplan Meier curve analysis of the expression based risk score based on PDE4D7 as measured on the TMPRRS2-ERG fusion negative ("TMRPRSS2-ER-") prostate cancer patient cohort (n=258 patients; 43.8% events). The PDE4D7 score was categorized into four groups: Score (1-2): all PDE4D7 scores with values between 1 and <2; Score (2-3): all PDE4D7 scores with values between 2 and <3; Score (3-4): all PDE4D7 scores with values between 3 and <4; Score (4-5): all PDE4D7 scores with values between 4 and 5. The score categories were correlated in Kaplan Meier to the BCR (biochemical recurrence) progression free survival time after surgery of the patients, which is indicated in months. The log rank p-value was determined as p=0.1. This demonstrates that there is no significant difference in terms of BCR progression free survival for the four PDE4D7 score classes. The following supplementary lists indicate the number of patients at risk for each individual PDE4D7 score category class, i.e., the patients at risk at any time interval +20 months after surgery are shown per PDE4D7 class category: Score (1-2): 11, 7, 7, 6, 5, 5, 4, 1, 0, 0; Score (2-3): 110, 78, 64, 54, 49, 35, 25, 11, 3, 0; Score (3-4): 130, 101, 83, 76, 71, 62, 53, 25, 4, 0; Score (4-5): 7, 6, 4, 2, 2, 0, 0, 0, 0, 0.

Figure 3:
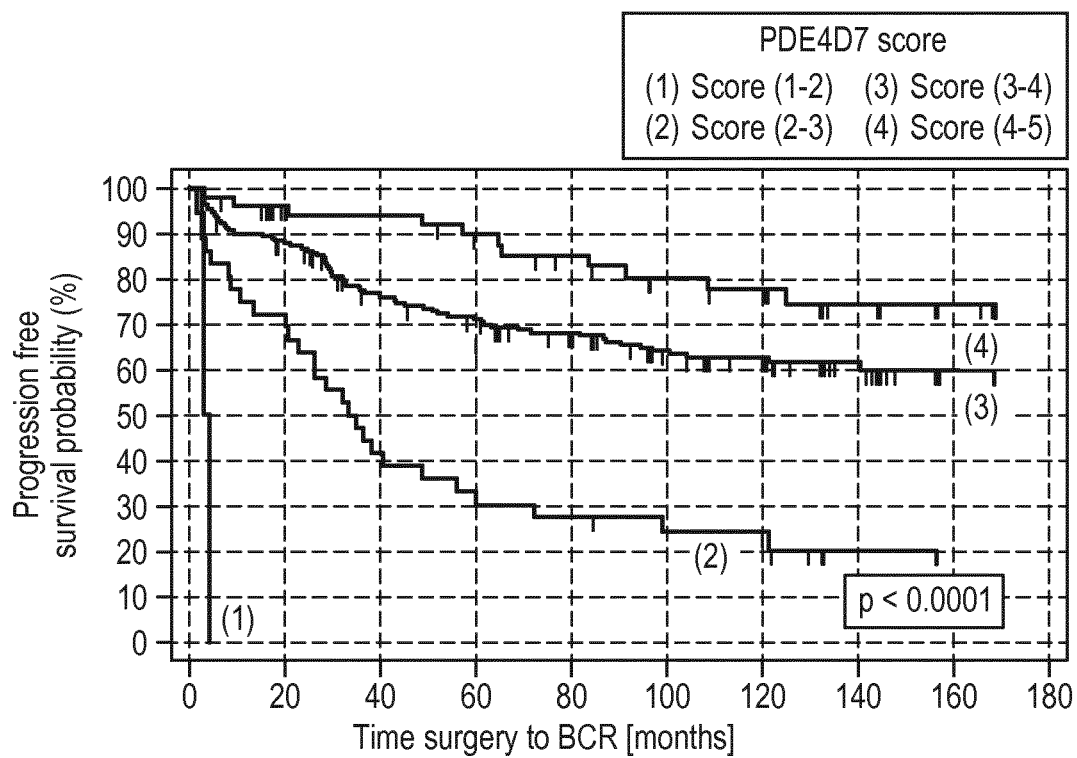
FIG. 3 shows a Kaplan Meier curve analysis of the expression based risk score based on PDE4D7 as measured on the TMPRRS2-ERG fusion positive ("TMRPRSS2-ERG+") prostate cancer patient cohort (n=281 patients; 38.1% events).

FIG. 3 shows a Kaplan Meier curve analysis of the expression based risk score based on PDE4D7 as measured on the TMPRRS2-ERG fusion positive ("TMRPRSS2-ERG+") prostate cancer patient cohort (n=281 patients; 38.1% events). The PDE4D7 score was categorized into four groups: Score (1-2): all PDE4D7 scores with values between 1 and <2; Score (2-3): all PDE4D7 scores with values between 2 and <3; Score (3-4): all PDE4D7 scores with values between 3 and <4; Score (4-5): all PDE4D7 scores with values between 4 and 5. The score categories were correlated in Kaplan Meier to the BCR (biochemical recurrence) progression free survival time after surgery of the patients, which is indicated in months. The log rank p-value was determined as p<0.0001. This demonstrates that there is a significant difference in terms of BCR progression free survival for the four PDE4D7 score classes. The lower the PDE4D7 risk score the higher the associated risk to experience disease recurrence after primary treatment. The following supplementary lists indicate the number of patients at risk for each individual PDE4D7 score category class, i.e., the patients at risk at any time interval +20 months after surgery are shown per PDE4D7 class category: Score (1-2): 2, 0, 0, 0, 0, 0, 0, 0, 0, 0, 0; Score (2-3): 37, 25, 15, 12, 10, 7, 7, 1, 0, 0; Score (3-4): 187, 158, 130, 120, 108, 92, 73, 36, 6, 0; Score (4-5): 55, 46, 44, 40, 36, 31, 28, 17, 4, 0.

Figure 4:
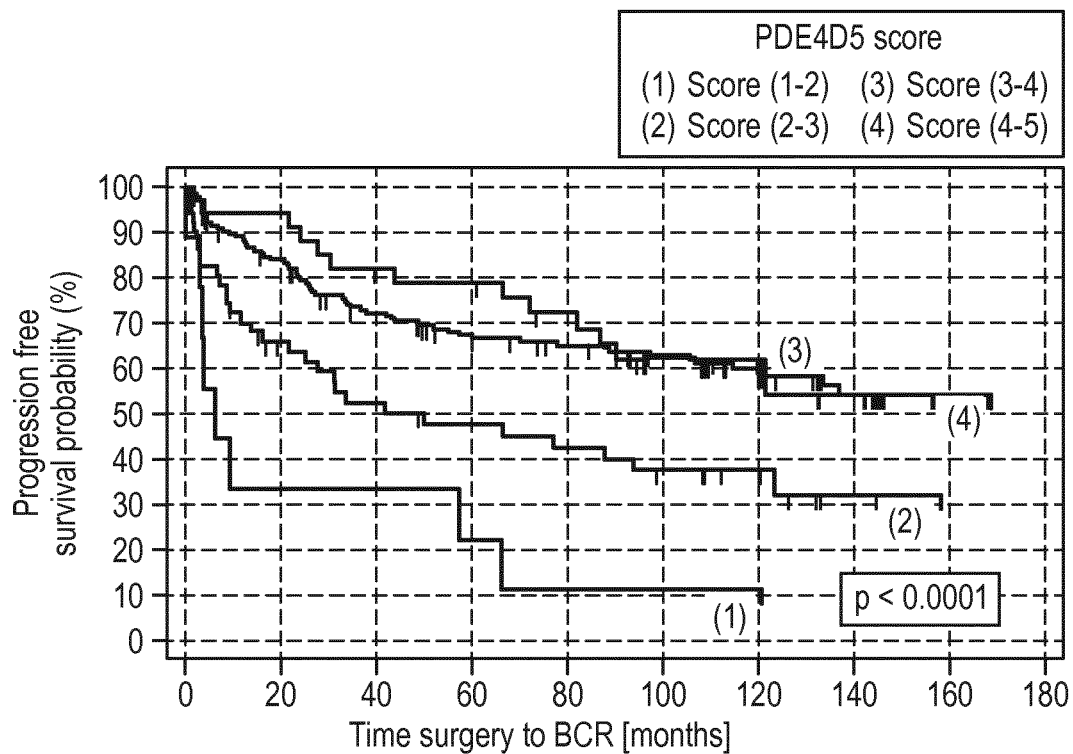
FIG. 4 shows a Kaplan Meier curve analysis of the expression based risk score based on PDE4D5 as measured on the TMPRRS2-ERG fusion negative ("TMRPRSS2-ER-") prostate cancer patient cohort (n=261 patients; 44.1% events).

FIG. 4 shows a Kaplan Meier curve analysis of the expression based risk score based on PDE4D5 as measured on the TMPRRS2-ERG fusion negative ("TMPRPRSS2-ER-") prostate cancer patient cohort (n=261 patients; 44.1% events). The PDE4D5 score was categorized into four groups: Score (1-2): all PDE4D5 scores with values between 1 and <2; Score (2-3): all PDE4D5 scores with values between 2 and <3; Score (3-4): all PDE4D5 scores with values between 3 and <4; Score (4-5): all PDE4D5 scores with values between 4 and 5. The score categories were correlated in Kaplan Meier to the BCR (biochemical recurrence) progression free survival time after surgery of the patients, which is indicated in months. The log rank p-value was determined as p<0.0001. This demonstrates that there is a significant difference in terms of BCR progression free survival for the four PDE4D5 score classes. The lower the PDE4D5 risk score the higher the associated risk to experience disease recurrence after primary treatment. The following supplementary lists indicate the number of patients at risk for each individual PDE4D5 score category class, i.e., the patients at risk at any time interval +20 months after surgery are shown per PDE4D5 class category: Score (1-2): 9, 3, 3, 2, 1, 1, 1, 0, 0, 0; Score (2-3): 51, 29, 23, 19, 17, 14, 11, 3, 0, 0; Score (3-4): 167, 131, 108, 94, 89, 73, 61, 29, 6, 0; Score (4-5): 34, 31, 26, 25, 21, 15, 10, 5, 1, 0.

Figure 5:
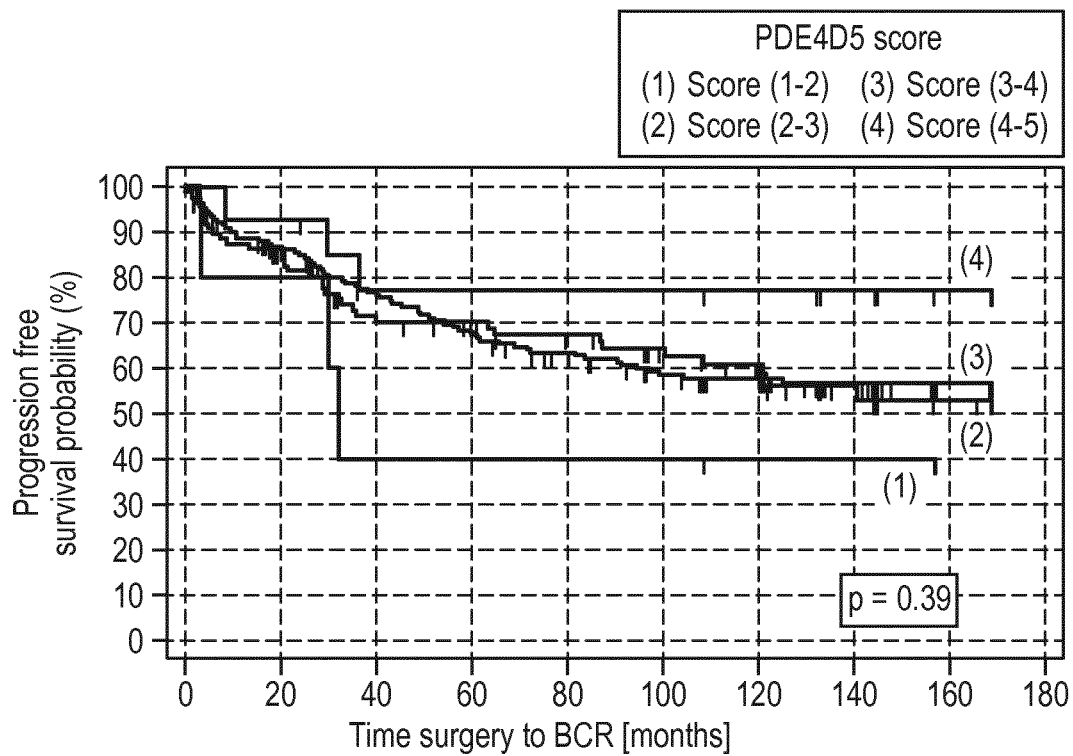
FIG. 5 shows a Kaplan Meier curve analysis of the expression based risk score based on PDE4D5 as measured on the TMPRRS-ERG fusion positive ("TMRPRSS2-ERG+") prostate cancer patient cohort (n=282 patients; 38.3% events).

FIG. 5 shows a Kaplan Meier curve analysis of the expression based risk score based on PDE4D5 as measured on the TMPRRS2-ERG fusion positive ("TMPRPRSS2-ERG+") prostate cancer patient cohort (n=282 patients; 38.3% events). The PDE4D5 score was categorized into four groups: Score (1-2): all PDE4D5 scores with values between 1 and <2; Score (2-3): all PDE4D5 scores with values between 2 and <3; Score (3-4): all PDE4D5 scores with values between 3 and <4; Score (4-5): all PDE4D5 scores with values between 4 and 5. The score categories were correlated in Kaplan Meier to the BCR (biochemical recurrence) progression free survival time after surgery of the patients, which is indicated in months. The log rank p-value was determined as p<0.39. This demonstrates that there is no significant difference in terms of BCR progression free survival for the four PDE4D5 score classes. The following supplementary lists indicate the number of patients at risk for each individual PDE4D5 score category class, i.e., the patients at risk at any time interval +20 months after surgery are shown per PDE4D5 class category: Score (1-2): 5, 4, 2, 2, 2, 2, 1, 1, 0, 0; Score (2-3): 92, 71, 56, 52, 46, 38, 33, 17, 3, 0; Score (3-4): 171, 141, 121, 108, 96, 80, 66, 31, 6, 0; Score (4-5): 14, 13, 10, 10, 10, 10, 8, 5, 1, 0.

Figure 6:
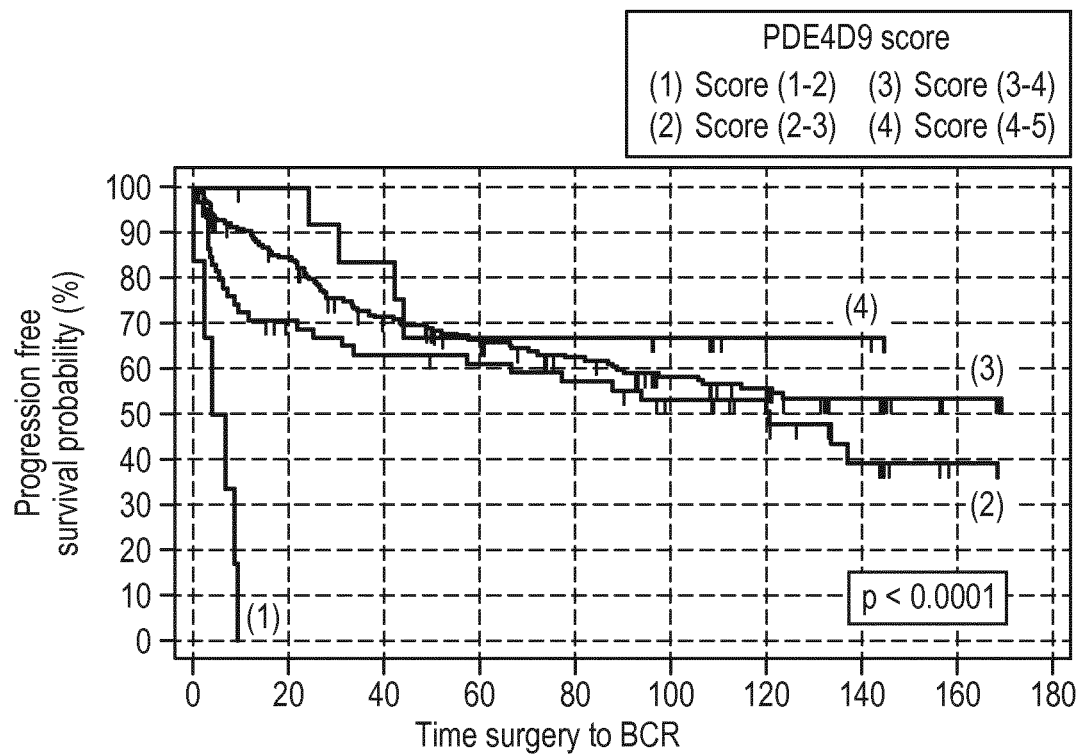
FIG. 6 shows a Kaplan Meier curve analysis of the expression based risk score based on PDE4D9 as measured on the TMPRRS2-ERG fusion negative ("TMRPRSS2-ER-") prostate cancer patient cohort (n=261 patients; 43.9% events).

FIG. 6 shows a Kaplan Meier curve analysis of the expression based risk score based on PDE4D9 as measured on the TMPRRS2-ERG fusion negative ("TMPRPRSS2-ER-") prostate cancer patient cohort (n=262 patients; 43.9% events). The PDE4D9 score was categorized into four groups: Score (1-2): all PDE4D9 scores with values between 1 and <2; Score (2-3): all PDE4D9 scores with values between 2 and <3; Score (3-4): all PDE4D9 scores with values between 3 and <4; Score (4-5): all PDE4D9 scores with values between 4 and 5. The score categories were correlated in Kaplan Meier to the BCR (biochemical recurrence) progression free survival time after surgery of the patients, which is indicated in months. The log rank p-value was determined as p<0.0001. This demonstrates that there is a significant difference in terms of BCR progression free survival for the four PDE4D9 score classes. The lower the PDE4D9 risk score the higher the associated risk to experience disease recurrence after primary treatment. The following supplementary lists indicate the number of patients at risk for each individual PDE4D9 score category class, i.e., the patients at risk at any time interval +20 months after surgery are shown per PDE4D9 class category: Score (1-2): 6, 0, 0, 0, 0, 0, 0, 0, 0, 0; Score (2-3): 59, 37, 33, 31, 29, 24, 19, 9, 1, 0; Score (3-4): 194, 145, 117, 101, 91, 73, 62, 26, 6, 0; Score (4-5): 13, 12, 10, 8, 8, 6, 2, 2, 0, 0.

Figure 7:
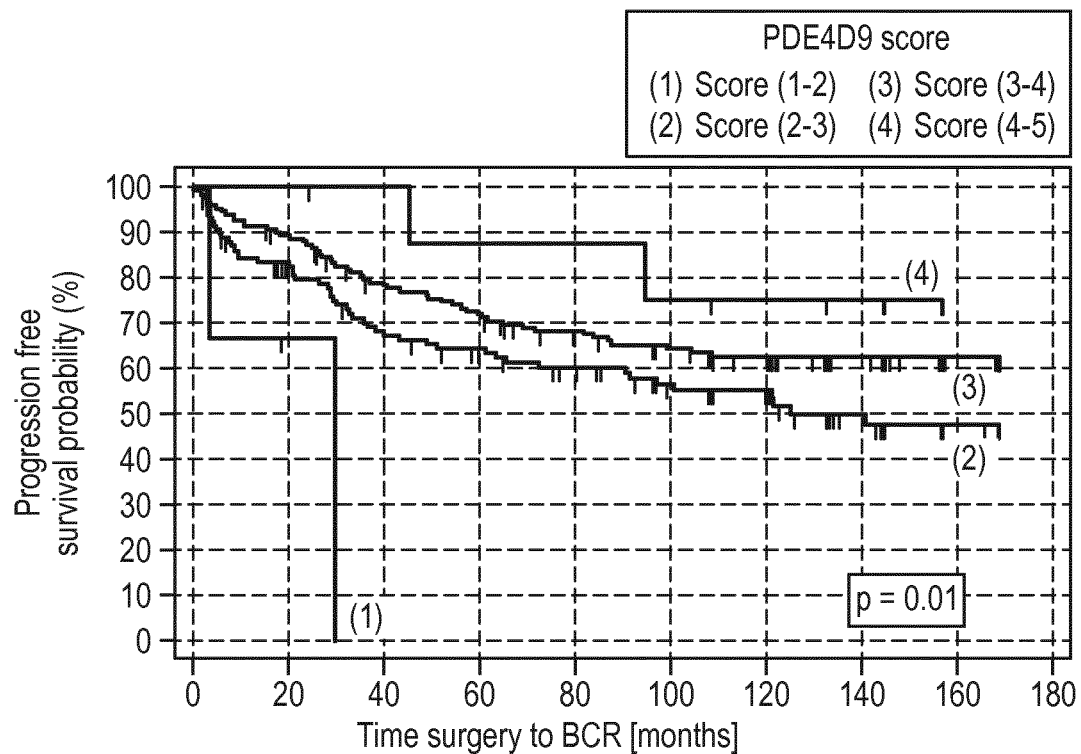
FIG. 7 shows a Kaplan Meier curve analysis of the expression based risk score based on PDE4D9 as measured on the TMPRRS2-ERG fusion positive ("TMRPRSS2-ERG+") prostate cancer patient cohort (n=282 patients; 38.3% events).

FIG. 7 shows a Kaplan Meier curve analysis of the expression based risk score based on PDE4D9 as measured on the TMPRRS2-ERG fusion positive ("TMPRPRSS2-ERG+") prostate cancer patient cohort (n=282 patients; 38.3% events). The PDE4D9 score was categorized into four groups: Score (1-2): all PDE4D9 scores with values between 1 and <2; Score (2-3): all PDE4D9 scores with values between 2 and <3; Score (3-4): all PDE4D9 scores with values between 3 and <4; Score (4-5): all PDE4D9 scores with values between 4 and 5. The score categories were correlated in Kaplan Meier to the BCR (biochemical recurrence) progression free survival time after surgery of the patients, which is indicated in months. The log rank p-value was determined as p<0.01. This demonstrates that there is limited significant difference in terms of BCR progression free survival for the four PDE4D9 score classes. The following supplementary lists indicate the number of patients at risk for each individual PDE4D9 score category class, i.e., the patients at risk at any time interval +20 months after surgery are shown per PDE4D9 class category: Score (1-2): 3, 1, 0, 0, 0, 0, 0, 0, 0, 0; Score (2-3): 119, 88, 70, 63, 56, 44, 37, 21, 2, 0; Score (3-4): 151, 131, 111, 102, 91, 80, 66, 29, 8, 0; Score (4-5): 9, 9, 8, 7, 7, 6, 5, 4, 0, 0.

The Kaplan Meier curve analyses shown in FIGS. 2 to 7 clearly show that the prognostic power of different phosphodiesterase 4D variants depends on the molecular subtype of the prostate cancer, in particular, on whether the TMPRSS2-ERG fusion status of the prostate cancer is positive or negative. In TMPRSS2-ERG fusion status positive prostate cancer, PDE4D7 was found to provide a good prognostic power (FIG. 3), which was not found to be the case in prostate cancer with negative TMPRSS2-ERG fusion status (FIG. 2). In contrast, in TMPRSS2-ERG fusion status negative prostate cancer, both PDE4D5 and PDE4D9 were found to have a suitable prognostic power (FIGS. 4 and 6), whereas this was not found to the same extend in prostate cancer with negative TMPRSS2-ERG fusion status (FIGS. 5 and 7).

Based on these findings, a combination of the CAPRA-S score with the PDE4D7 and PDE4D9 score in dependence of the TMPRSS2-ERG fusion status was developed as shown in TABLE 3 to generate a total TMPRSS2-ERG_CAPRA-S&PDE4D7& PDE4D9 post-surgical prognostic score (in the following also named just "CAPRA-S&PDE4D7&9 score" or "Total score" for the sake of brevity). The CAPRA-S score (see Cooperberg M. R. et al, column 1 in TABLE 3) is categorized into three risk groups (low risk, intermediate risk, and high risk; column 2 in TABLE 3). Each risk group is associated with an increasing number of points (low risk=1 point; intermediate risk=2 points; high risk=three points). The PDE4D7 score is categorized into four groups (PDE4D7 score category 1=PDE4D7 scores 1 to <2; PDE4D7 score category 2=PDE4D7 scores 2 to <3; PDE4D7 score category 3=PDE4D7 scores 3 to <4; PDE4D7 score category 4=PDE4D7 scores 4 to 5). Each PDE4D7 score category is associated with a decreasing number of points due to the inverse relation of PDE4D7 to risk of progression (PDE4D7 score category 1: 3 points; PDE4D7 score category 2: 2 points; PDE4D7 score category 3: 1 points; PDE4D7 score category 4: 0 points; column 3 in TABLE 3). The combination score CAPRA-S&PDE4D7 (column 4 in TABLE 3) is generated for the samples with a positive TMPRSS2-ERG fusion event and is the sum of the points given in column 2 (CAPRA-S categories) and column 3 (PDE4D7 score categories) of TABLE 3. To generate the CAPRA-S&PDE4D9 combination score the equivalent steps as for PDE4D7 are performed with the exception that this score is calculated based on PDE4D9 for the samples with a negative TMPRSS2-ERG fusion event (columns 5 and 6 in TABLE 3). The total TMPRSS2-ERG_CAPRA-S&PDE4D7&PDE4D9 score for all samples whether TMPRSS2-ERG fusion is positive or negative is built by adding the CAPRA-S&PDE4D7 and the CAPRA-S&PDE4D9 scores into a single score where every sample is associated with a score between 1 to 6 (column 7 in TABLE 3).

status dependent combination of the CAPRA-S score and the expression based risk score based on either PDE4D7 or PDE4D9 ("CAPRA-S&PDE4D7&9 score") vs. the CAPRA-S categories for the prediction of 10-year prostate cancer specific survival (PCSS) after surgery in an RP cohort with complete 10-years follow-up (radical prostatectomy; n=304 patients; 8.2% prostate cancer death events within 10 years after treatment). The respective AUCs (Area under the Curve) as well as the p-value for statistical difference between the ROC curves were determined as 0.91 vs. 0.85 and p=0.014, respectively.

Figure 11:
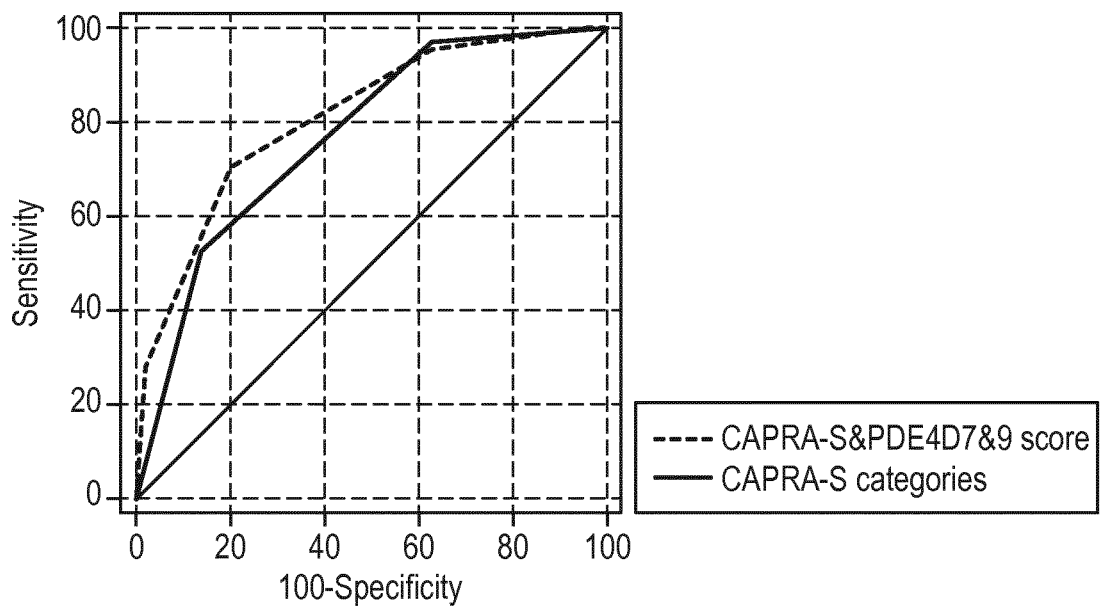
FIG. 11 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year clinical (i.e., metastases) recurrence (CR) after surgery in a RP sub-cohort with complete 10-years follow-up (radical prostatectomy; pGleason>6; n=231 patients; 26.4% BCR events within 10 years after treatment).

FIG. 11 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the

TABLE 3

Combination of the CAPRA-S score with the PDE4D7 and PDE4D9 score in dependence of the TMPRSS2-ERG fusion status (SC = score category).

| CAPRA-S points | CAPRA-S category | TMPRSS2-ERG positive | | TMPRSS2-ERG negative | | Total score |
|---|---|---|---|---|---|---|
| | | PDE4D7 score | CAPRA-S& PDE4D7 score | PDE4D9 score | CAPRA-S& PDE4D9 score | |
| 0 | low (1) | SC 1: 3 points | Scores 1-4 | SC 1: 3 points | Scores 1-4 | Scores 1-6 |
| 1 | | SC 2: 2 points | | SC 2: 2 points | | |
| 2 | | SC 3: 1 point | | SC 3: 1 point | | |
| | | SC 4: 0 points | | SC 4: 0 points | | |
| 3 | intermediate (2) | SC 1: 3 points | Scores 2-5 | SC 1: 3 points | Scores 2-5 | |
| 4 | | SC 2: 2 points | | SC 2: 2 points | | |
| 5 | | SC 3: 1 point | | SC 3: 1 point | | |
| | | SC 4: 0 points | | SC 4: 0 points | | |
| 6 | high (3) | SC 1: 3 points | Scores 3-6 | SC 1: 3 points | Scores 3-6 | |
| 7 | | SC 2: 2 points | | SC 2: 2 points | | |
| 8 | | SC 3: 1 point | | SC 3: 1 point | | |
| 9 | | SC 4: 0 points | | SC 4: 0 points | | |
| 10 | | | | | | |
| 11 | | | | | | |
| 12 | | | | | | |

Figure 8:
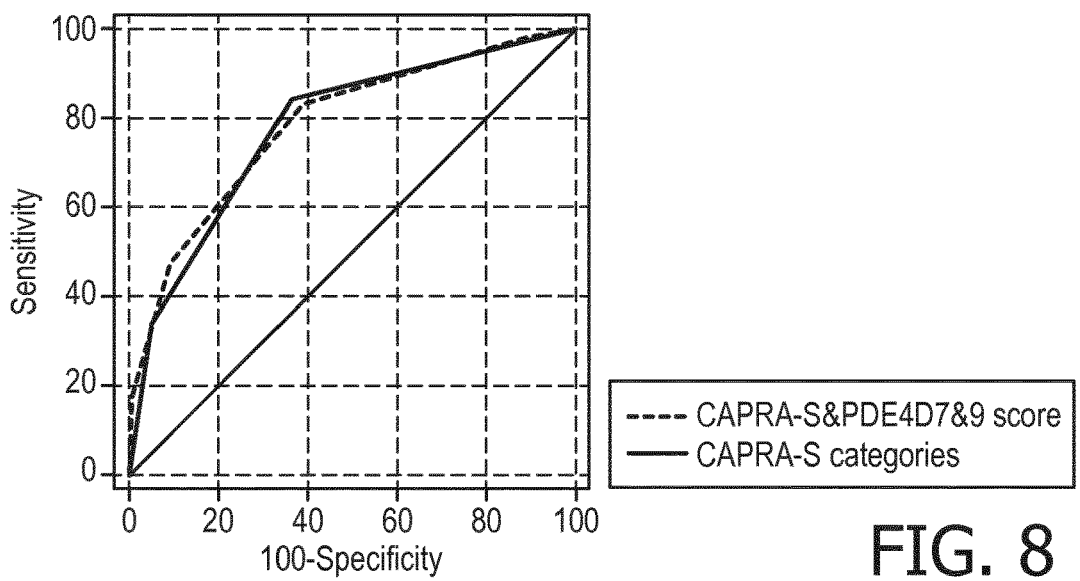
FIG. 8 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 5-year biochemical recurrence (BCR) after surgery in an RP cohort with complete 5-years follow-up (radical prostatectomy; n=482 patients; 35.5% BCR events within 5 years after treatment).

FIG. 8 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 5-year biochemical recurrence (BCR) after surgery in an RP cohort with complete 5-years follow-up (radical prostatectomy; n=482 patients; 35.5% BCR events within 5 years after treatment). The respective AUCs (Area under the Curve) as well as the p-value for statistical difference between the ROC curves were determined as 0.79 vs. 0.78 and p=0.64, respectively.

Figure 9:
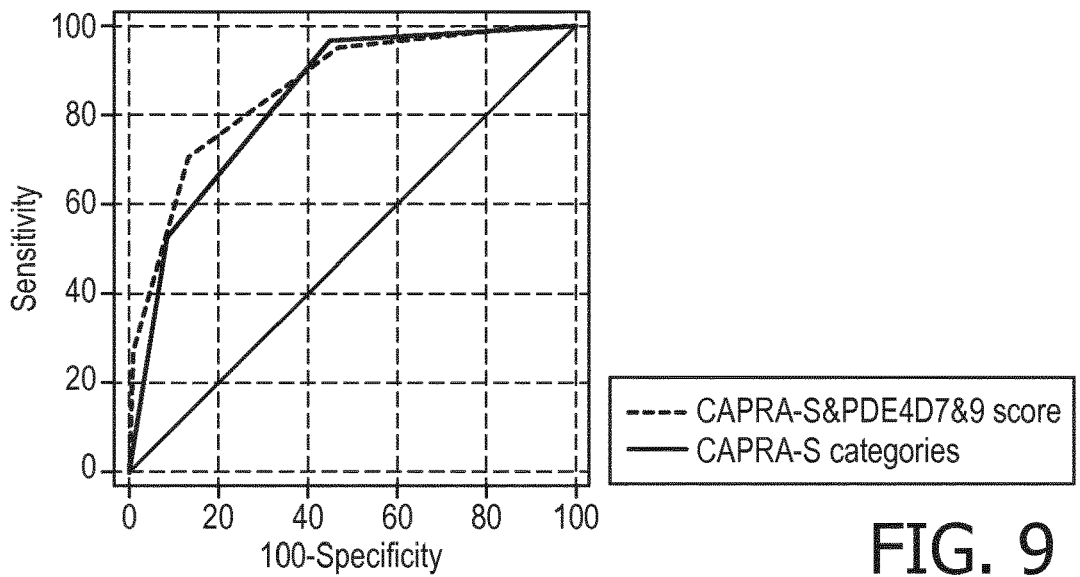
FIG. 9 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year clinical (i.e., metastases) recurrence (CR) after surgery in an RP with complete 10-years follow-up (radical prostatectomy; n=337 patients; 18.1% BCR events within 10 years after treatment).

FIG. 9 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year clinical (i.e., metastases) recurrence (CR) after surgery in an RP with complete 10-years follow-up (radical prostatectomy; n=337 patients; 18.1% BCR events within 10 years after treatment). The respective AUCs (Area under the Curve) as well as the p-value for statistical difference between the ROC curves were determined as 0.85 vs. 0.83 and p=0.13, respectively.

Figure 10:
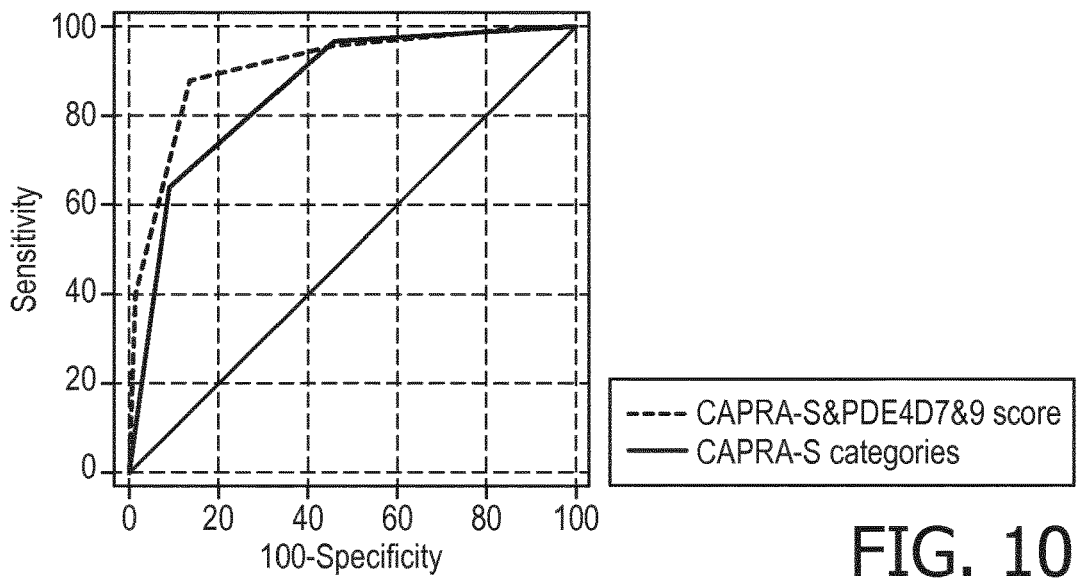
FIG. 10 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year prostate cancer specific survival (PCSS) after surgery in an RP cohort with complete 10-years follow-up (radical prostatectomy; n=304 patients; 8.2% prostate cancer death events within 10 years after treatment).

FIG. 10 shows a ROC curve analysis of the post-surgical prognostic risk score based on the TMPRSS2-ERG fusion CAPRA-S categories for the prediction of 10-year clinical (i.e., metastases) recurrence (CR) after surgery in a RP sub-cohort with complete 10-years follow-up (radical prostatectomy; pGleason>6; n=231 patients; 26.4% BCR events within 10 years after treatment). The respective AUCs (Area under the Curve) as well as the p-value for statistical difference between the ROC curves were determined as 0.8 vs. 0.76 and p=0.06, respectively.

Figure 12:
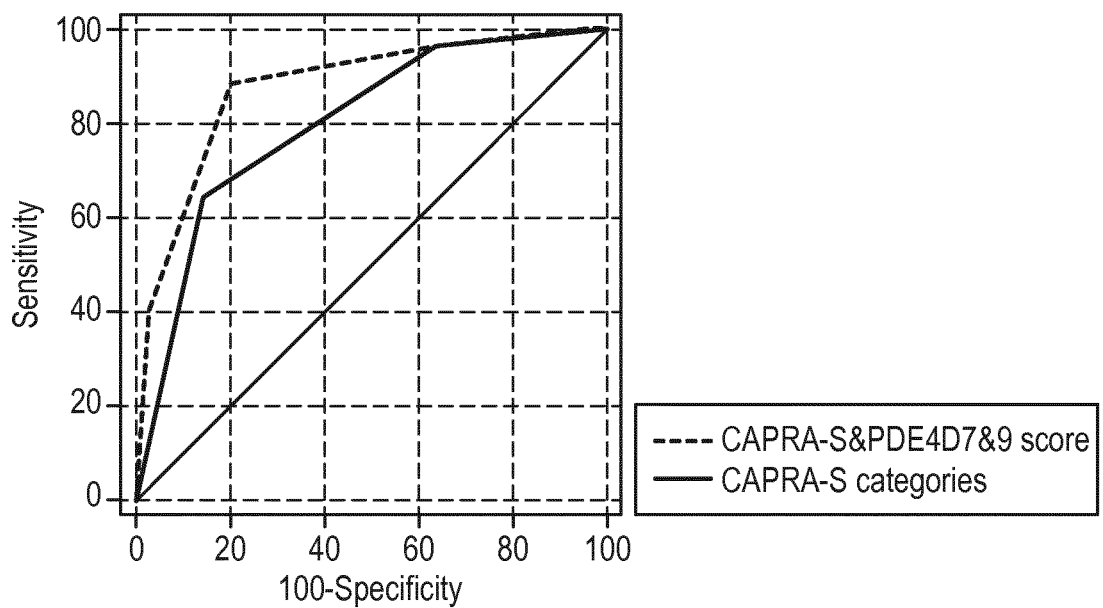
FIG. 12 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year prostate cancer specific survival (PCSS) after surgery in a RP sub-cohort with complete 10-years follow-up (radical prostatectomy; pGleason>6; n=198 patients; 12.6% prostate cancer death events within 10 years after treatment).

FIG. 12 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year prostate cancer specific survival (PCSS) after surgery in a RP sub-cohort with complete 10-years follow-up (radical prostatectomy; pGleason>6; n=198 patients; 12.6% prostate cancer death events within 10 years after treatment). The respective AUCs (Area under the Curve) as well as the p-value for statistical difference between the ROC curves were determined as 0.87 vs. 0.79 and p=0.013, respectively.

Figure 13:
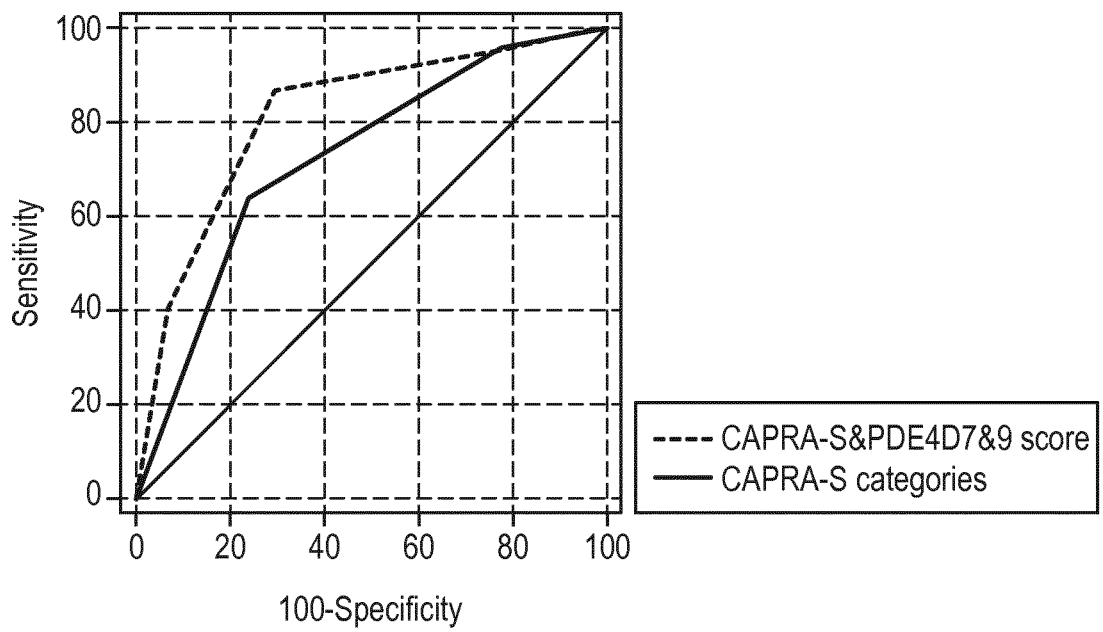
FIG. 13 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year prostate cancer specific survival (PCSS) after surgery in a RP sub-cohort with complete 10-years follow-up (radical prostatectomy; SRT=salvage radiation treatment; n=93 patients; 23.7% prostate cancer death events within 10 years after treatment).

FIG. 13 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year prostate cancer specific survival (PCSS) after surgery in a RP sub-cohort with complete 10-years follow-up (radical prostatectomy; SRT=salvage radiation treatment; n=93 patients; 23.7% prostate cancer death events within 10 years after treatment). The respective AUCs (Area under the Curve) as well as the p-value for statistical difference between the ROC curves were determined as 0.81 vs. 0.72 and p=0.03, respectively.

Figure 14:
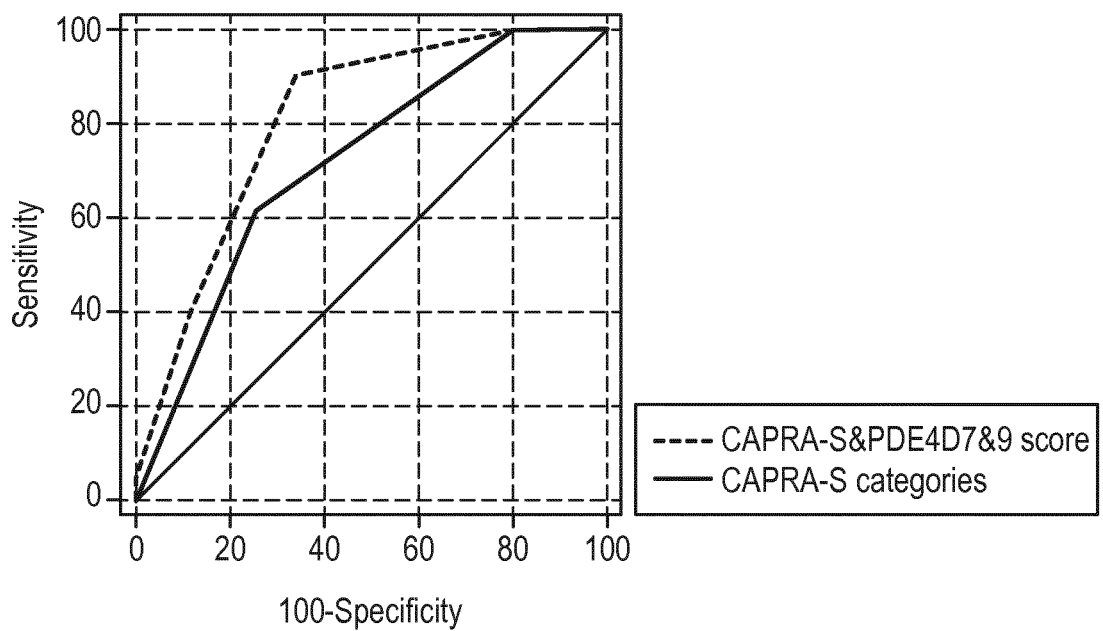
FIG. 14 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year prostate cancer specific survival (PCSS) after surgery in a RP sub-cohort with complete 10-years follow-up (radical prostatectomy; SADT=salvage androgen deprivation therapy; n=68 patients; 30.9% prostate cancer death events within 10 years after treatment).

FIG. 14 shows a ROC curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") vs. the CAPRA-S categories for the prediction of 10-year prostate cancer specific survival (PCSS) after surgery in a RP sub-cohort with complete 10-years follow-up (radical prostatectomy; SADT=salvage androgen deprivation therapy; n=68 patients; 30.9% prostate cancer death events within 10 years after treatment). The respective AUC (Area under the Curve) as well as the p-value for statistical difference between the ROC curves were determined as 0.81 vs. 0.72 and p=0.05, respectively.

The ROC curve analyses shown in FIGS. 8 to 14 show that for all analyzed cases the AUC for the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") is larger than for the CAPRA-S categories. For some cases, such as for the prediction of 10-year prostate cancer specific survival (PCSS) after surgery (FIG. 10), for the prediction of 10-year prostate cancer specific survival (PCSS) after surgery (FIG. 12), for the prediction of 10-year prostate cancer specific survival (PCSS) after surgery (FIG. 13), and for the prediction of 10-year prostate cancer specific survival (PCSS) after surgery (FIG. 14), this difference is statistically significant (significance defined as alpha<0.05).

Figure 15:
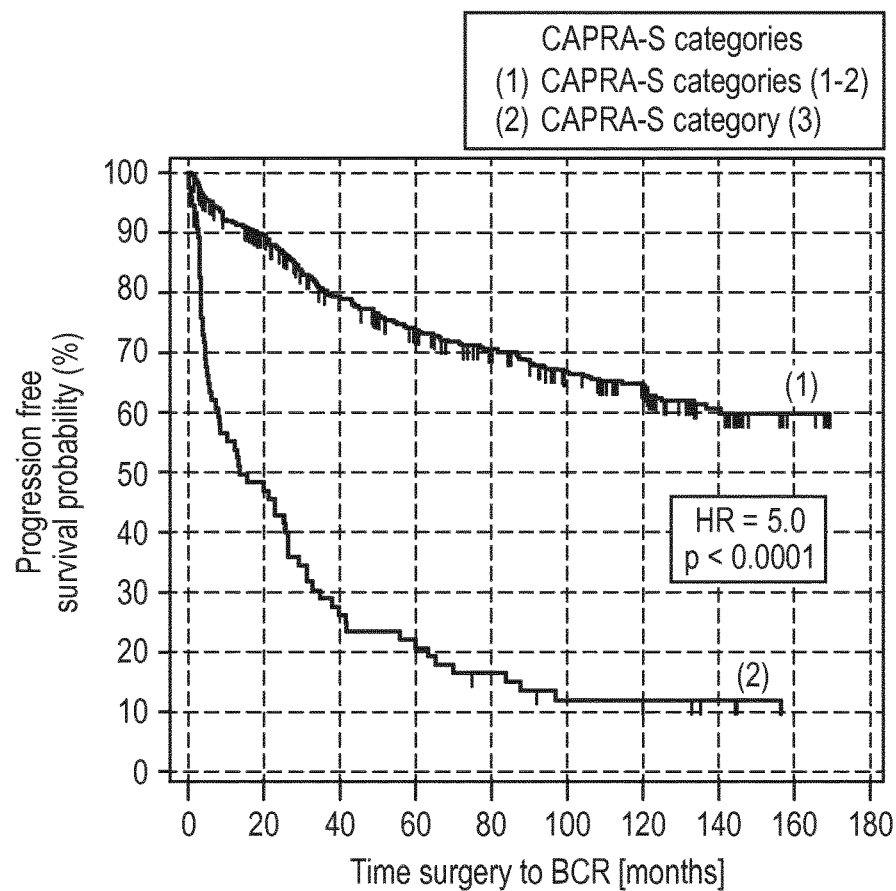
FIG. 15 shows a Kaplan Meier curve analysis of the CAPRA-S score to predict biochemical recurrence (BCR) of a prostate cancer surgery cohort (n=536 patients; 40.9% events).

FIG. 15 shows a Kaplan Meier curve analysis of the CAPRA-S score to predict biochemical recurrence (BCR) of a prostate cancer surgery cohort (n=536 patients; 40.9% events). The CAPRA-S score was categorized into two groups: low and intermediate risk (CAPRA-S score categories (1-2)) vs. high risk (CAPRA-S score category (3)). The CAPRA-S score categories (1-2) vs. score category (3) were correlated in Kaplan Meier to the BCR (biochemical recurrence) progression free survival time after surgery of the patients, which is indicated in months. The log rank p-value was determined as p<0.0001, the hazard ratio was determined as HR=5.0. The following supplementary lists indicate the number of patients at risk for the CAPRA-S score category classes analyzed, i.e., the patients at risk at any time interval +20 months after surgery are shown: CAPRA-S score categories (1-2): 461, 385, 327, 293, 224, 182, 86, 17, 0; CAPRA-S score category (3): 75, 34, 19, 16, 11, 7, 7, 4, 0, 0.

Figure 16:
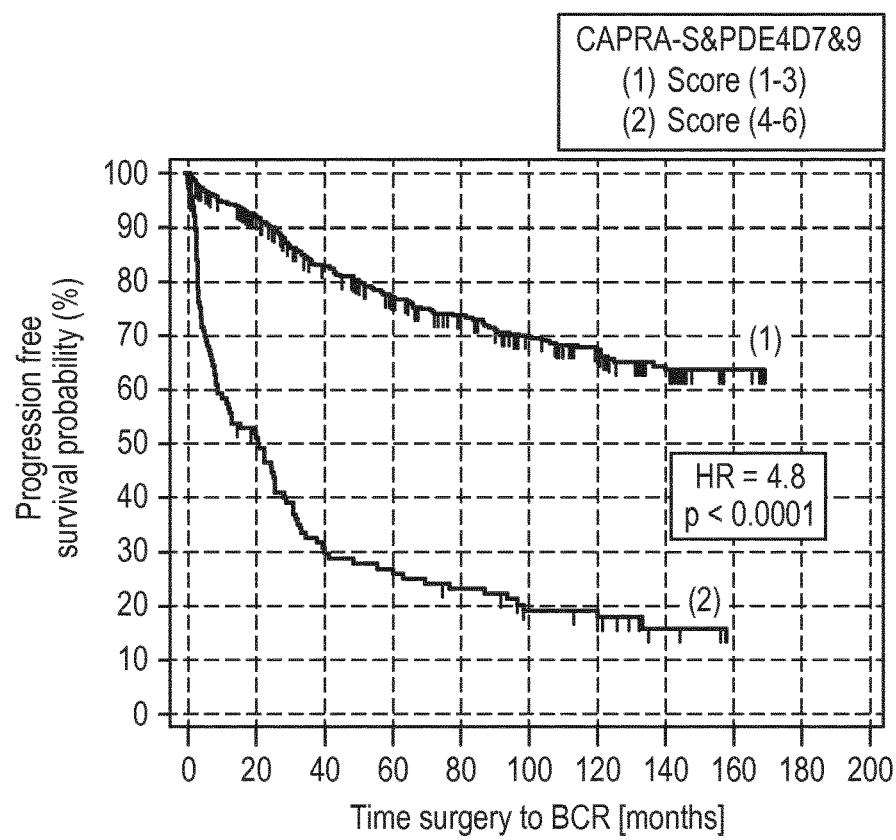
FIG. 16 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict biochemical recurrence (BCR) of a prostate cancer surgery cohort (n=536 patients; 40.9% events).

FIG. 16 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict biochemical recurrence (BCR) of a prostate cancer surgery cohort (n=536 patients; 40.9% events). The CAPRA-S&PDE4D7&9 score was categorized into two groups: scores (1-3) vs. scores (4-6). The CAPRA-S&PDE4D7&9 score categories (1-3) vs. score categories (4-6) were correlated in Kaplan Meier to the BCR (biochemical recurrence) progression free survival time after surgery of the patients, which is indicated in months. The log rank p-value was determined as p<0.0001, the hazard ratio was determined as HR=4.8. The following supplementary lists indicate the number of patients at risk for the CAPRA-S&PDE4D7&9 score category classes analyzed, i.e., the patients at risk at any time interval +20 months after surgery are shown: Score categories (1-3): 422, 363, 313, 280, 256, 214, 173, 84, 17, 0; Score categories (4-6): 114, 56, 33, 29, 24, 17, 16, 6, 0, 0.

Figure 17:
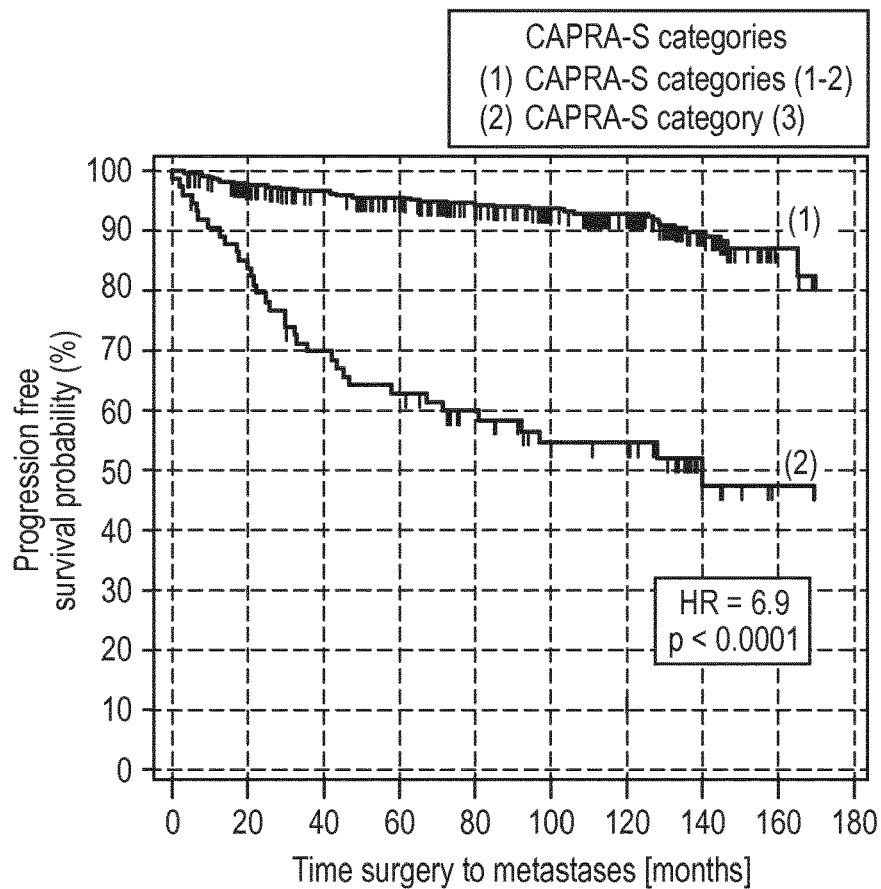
FIG. 17 shows a Kaplan Meier curve analysis of the CAPRA-S score to predict clinical (i.e., metastases) recurrence of a prostate cancer surgery cohort (n=536 patients; 13.6% events).

FIG. 17 shows a Kaplan Meier curve analysis of the CAPRA-S score to predict clinical (i.e., metastases) recurrence of a prostate cancer surgery cohort (n=536 patients; 13.6% events). The CAPRA-S score was categorized into two groups: low and intermediate risk (CAPRA-S score categories (1-2)) vs. high risk (CAPRA-S score category (3)). The CAPRA-S score categories (1-2) vs. score category (3) were correlated in Kaplan Meier to the CR (clinical recurrence) progression free survival time after surgery of the patients, which is indicated in months. The log rank p-value was determined as p<0.0001, the hazard ratio was determined as HR=6.9. The following supplementary lists indicate the number of patients at risk for the CAPRA-S score category classes analyzed, i.e., the patients at risk at any time interval +20 months after surgery are shown: CAPRA-S score categories (1-2): 460, 419, 401, 380, 352, 299, 248, 123, 19, 0; CAPRA-S score category (3): 74, 61, 50, 45, 37, 27, 25, 9, 1, 0.

Figure 18:
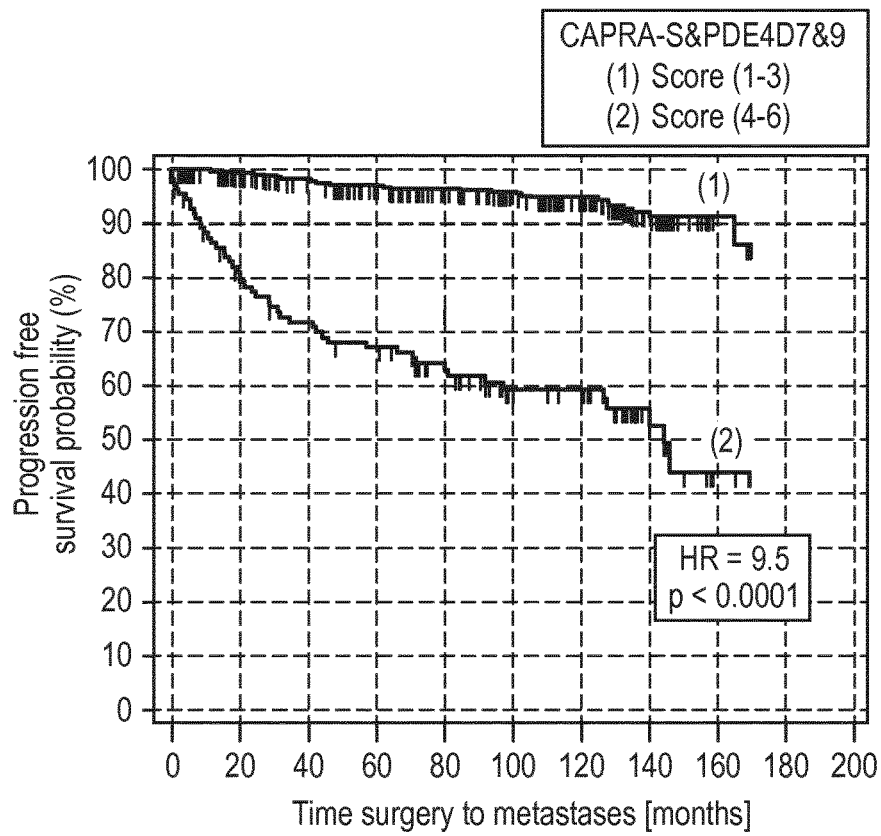
FIG. 18 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict clinical (i.e., metastases) recurrence of a prostate cancer surgery cohort (n=536 patients; 13.6% events).

FIG. 18 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict clinical (i.e., metastases) recurrence of a prostate cancer surgery cohort (n=536 patients; 13.6% events). The CAPRA-S&PDE4D7&9 score was categorized into two groups: scores (1-3) vs. scores (4-6). The CAPRA-S&PDE4D7&9 score categories (1-3) vs. score categories (4-6) were correlated in Kaplan Meier to the CR (clinical recurrence) progression free survival time after surgery of the patients, which is indicated in months. The log rank p-value was determined as p<0.0001, the hazard ratio was determined as HR=9.5. The following supplementary lists indicate the number of patients at risk for the CAPRA-S&PDE4D7&9 score category classes analyzed, i.e., the patients at risk at any time interval +20 months after surgery are shown: Score categories (1-3): 422, 393, 375, 355, 331, 285, 234, 116, 18, 0; Score categories (4-6): 112, 87, 76, 70, 58, 41, 39, 16, 2, 0.

Figure 19:
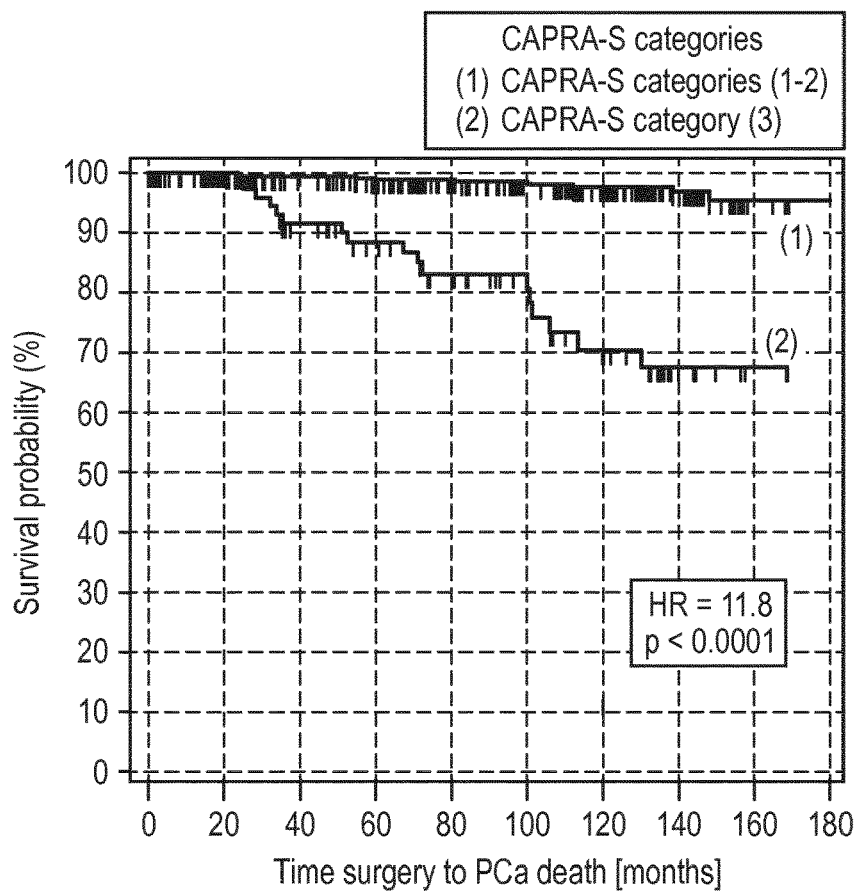
FIG. 19 shows a Kaplan Meier curve analysis of the CAPRA-S score to predict prostate cancer specific death of a prostate cancer surgery cohort (n=536 patients; 5.2% events).

FIG. 19 shows a Kaplan Meier curve analysis of the CAPRA-S score to predict prostate cancer specific death of a prostate cancer surgery cohort (n=536 patients; 5.2% events). The CAPRA-S score was categorized into two groups: low and intermediate risk (CAPRA-S score categories (1-2)) vs. high risk (CAPRA-S score category (3)). The CAPRA-S score categories (1-2) vs. score category (3) were correlated in Kaplan Meier to the PCSS (prostate cancer specific survival) progression free survival time after surgery of the patients, which is indicated in months. The log rank p-value was determined as p<0.0001, the hazard ratio was determined as HR=11.8. The following supplementary lists indicate the number of patients at risk for the CAPRA-S score category classes analyzed, i.e., the patients at risk at any time interval +20 months after surgery are shown: CAPRA-S score categories (1-2): 461, 429, 408, 386, 357, 303, 251, 130, 22, 4; CAPRA-S score category (3): 75, 71, 61, 53, 42, 34, 25, 11, 1, 0.

Figure 20:
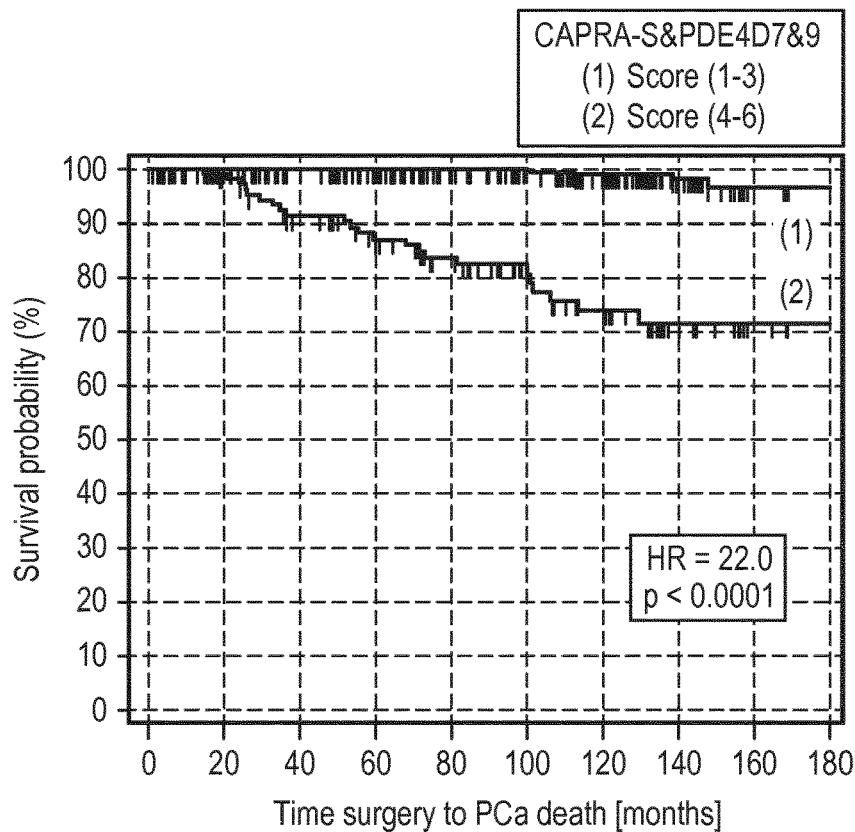
FIG. 20 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict prostate cancer specific death of a prostate cancer surgery cohort (n=536 patients; 5.2% events).

FIG. 20 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict prostate cancer specific death of a prostate cancer surgery cohort (n=536 patients; 5.2% events). The CAPRA-S&PDE4D7&9 score was categorized into two groups: scores (1-3) vs. scores (4-6). The CAPRA-S&PDE4D7&9 score categories (1-3) vs. score categories (4-6) were correlated in Kaplan Meier to the PCSS (prostate cancer specific survival) progression free survival time after surgery of the patients, which is indicated in months. The log rank p-value was determined as $p<0.0001$, the hazard ratio was determined as HR=22.0. The following supplementary lists indicate the number of patients at risk for the CAPRA-S&PDE4D7&9 score category classes analyzed, i.e., the patients at risk at any time interval +20 months after surgery are shown: Score categories (1-3): 422, 395, 378, 359, 334, 288, 237, 123, 20, 3; Score categories (4-6): 114, 105, 91, 80, 65, 49, 39, 18, 3, 1.

Figure 21:
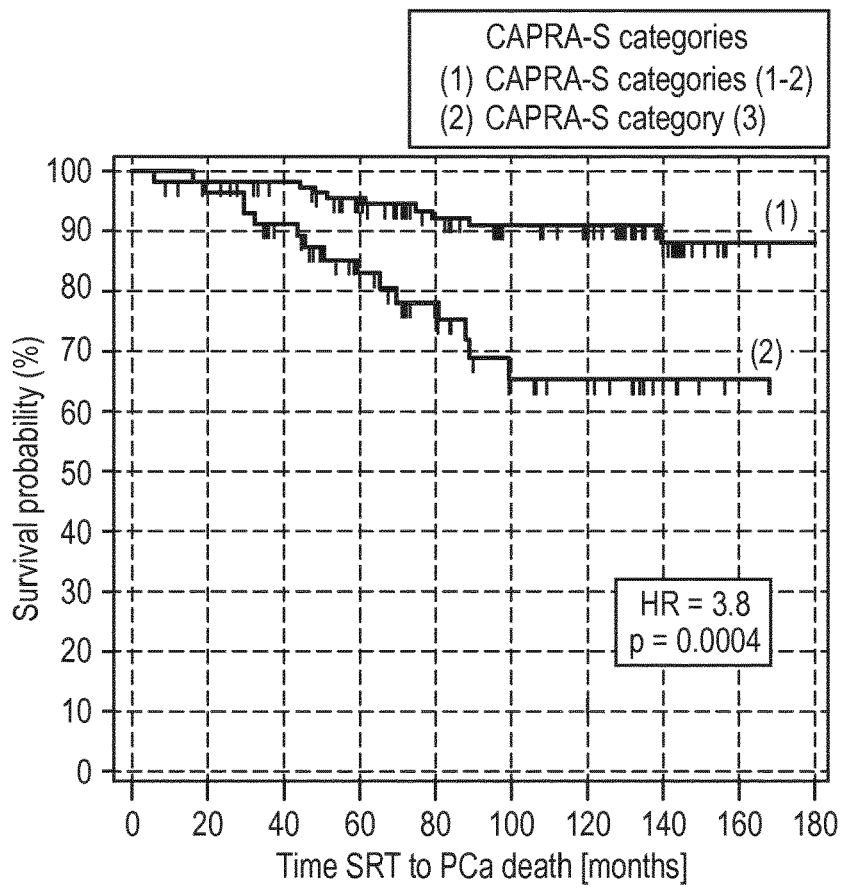
FIG. 21 shows a Kaplan Meier curve analysis of the CAPRA-S score to predict prostate cancer specific death of a prostate cancer surgery cohort after salvage radiation treatment (SRT; n=173 patients; 14.5% events).

FIG. 21 shows a Kaplan Meier curve analysis of the CAPRA-S score to predict prostate cancer specific death of a prostate cancer surgery cohort after salvage radiation treatment (SRT; n=173 patients; 14.5% events). The CAPRA-S score was categorized into two groups: low and intermediate risk (CAPRA-S score categories (1-2)) vs. high risk (CAPRA-S score category (3)). The CAPRA-S score categories (1-2) vs. score category (3) were correlated in Kaplan Meier to the PCSS (prostate cancer specific survival) progression free survival time after SRT of the patients, which is indicated in months. The log rank p-value was determined as $p<0.0001$, the hazard ratio was determined as HR=3.8. The following supplementary lists indicate the number of patients at risk for the CAPRA-S score category classes analyzed, i.e., the patients at risk at any time interval +20 months after surgery are shown: CAPRA-S score categories (1-2): 115, 112, 106, 96, 81, 61, 53, 29, 6, 4; CAPRA-S score category (3): 58, 54, 47, 37, 27, 18, 15, 6, 1, 0.

Figure 22:
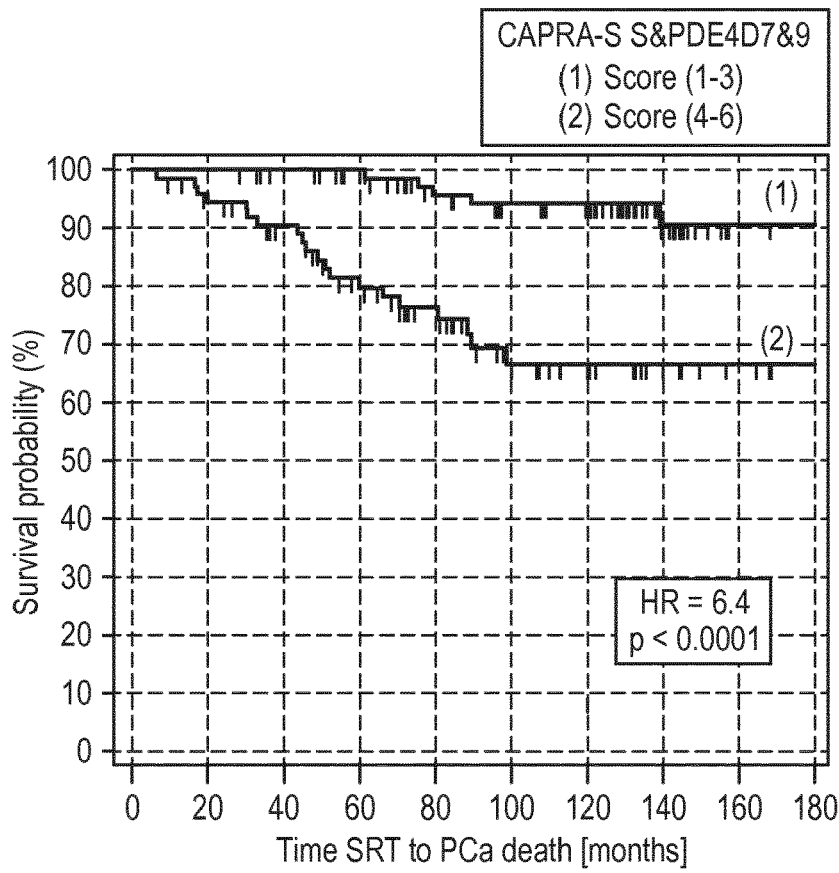
FIG. 22 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict prostate cancer specific death of a prostate cancer surgery cohort after salvage radiation treatment (SRT; n=173 patients; 14.5% events).

FIG. 22 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict prostate cancer specific death of a prostate cancer surgery cohort after salvage radiation treatment (SRT; n=173 patients; 14.5% events). The CAPRA-S&PDE4D7&9 score was categorized into two groups: scores (1-3) vs. scores (4-6). The CAPRA-S&PDE4D7&9 score categories (1-3) vs. score categories (4-6) were correlated in Kaplan Meier to the PCSS (prostate cancer specific survival) progression free survival time after surgery of the patients, which is indicated in months. The log rank p-value was determined as $p<0.0001$, the hazard ratio was determined as HR=6.4. The following supplementary lists indicate the number of patients at risk for the CAPRA-S&PDE4D7&9 score category classes analyzed, i.e., the patients at risk at any time interval +20 months after surgery are shown: Score categories (1-3): 93, 93, 89, 82, 70, 56, 49, 25, 4, 3; Score categories (4-6): 80, 73, 64, 51, 38, 23, 19, 10, 3, 1.

Figure 23:
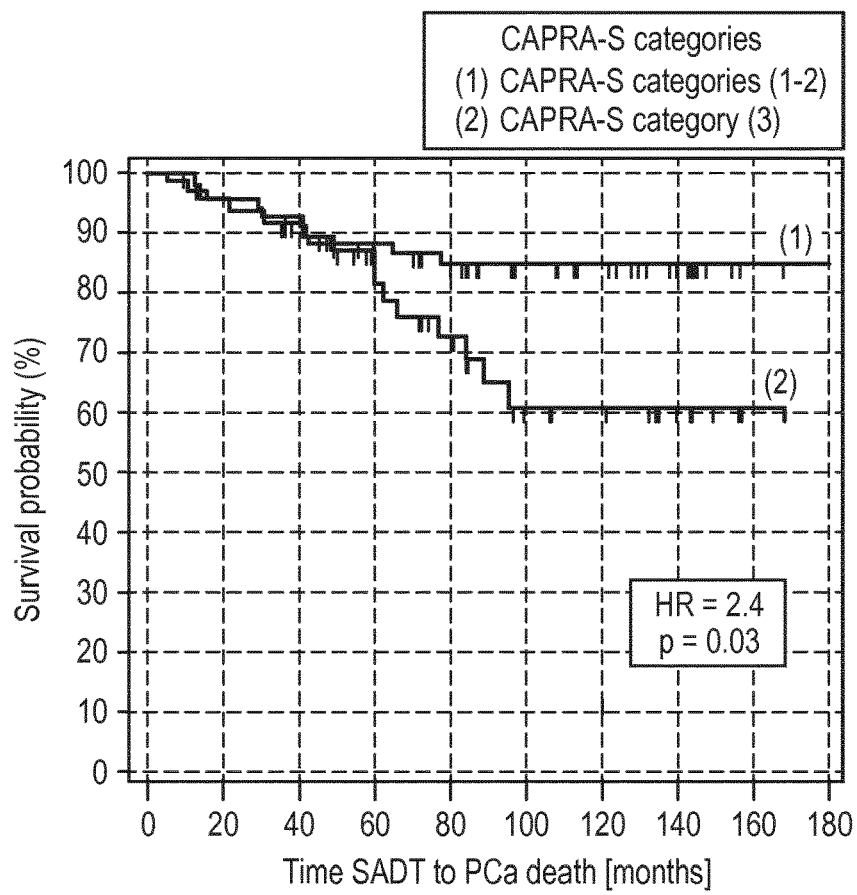
FIG. 23 shows a Kaplan Meier curve analysis of the CAPRA-S score to predict prostate cancer specific death of a prostate cancer surgery cohort after salvage androgen deprivation therapy (SADT; n=118 patients; 20.3% events).

FIG. 23 shows a Kaplan Meier curve analysis of the CAPRA-S score to predict prostate cancer specific death of a prostate cancer surgery cohort after salvage androgen deprivation therapy (SADT; n=118 patients; 20.3% events). The CAPRA-S score was categorized into two groups: low and intermediate risk (CAPRA-S score categories (1-2)) vs. high risk (CAPRA-S score category (3)). The CAPRA-S score categories (1-2) vs. score category (3) were correlated in Kaplan Meier to the PCSS (prostate cancer specific survival) progression free survival time after SADT of the patients, which is indicated in months. The log rank p-value was determined as $p=0.03$, the hazard ratio was determined as HR=2.4. The following supplementary lists indicate the number of patients at risk for the CAPRA-S score category classes analyzed, i.e., the patients at risk at any time interval +20 months after surgery are shown: CAPRA-S score categories (1-2): 68, 65, 62, 56, 49, 37, 32, 24, 5, 4; CAPRA-S score category (3): 50, 46, 40, 31, 21, 13, 11, 6, 1, 0.

Figure 24:
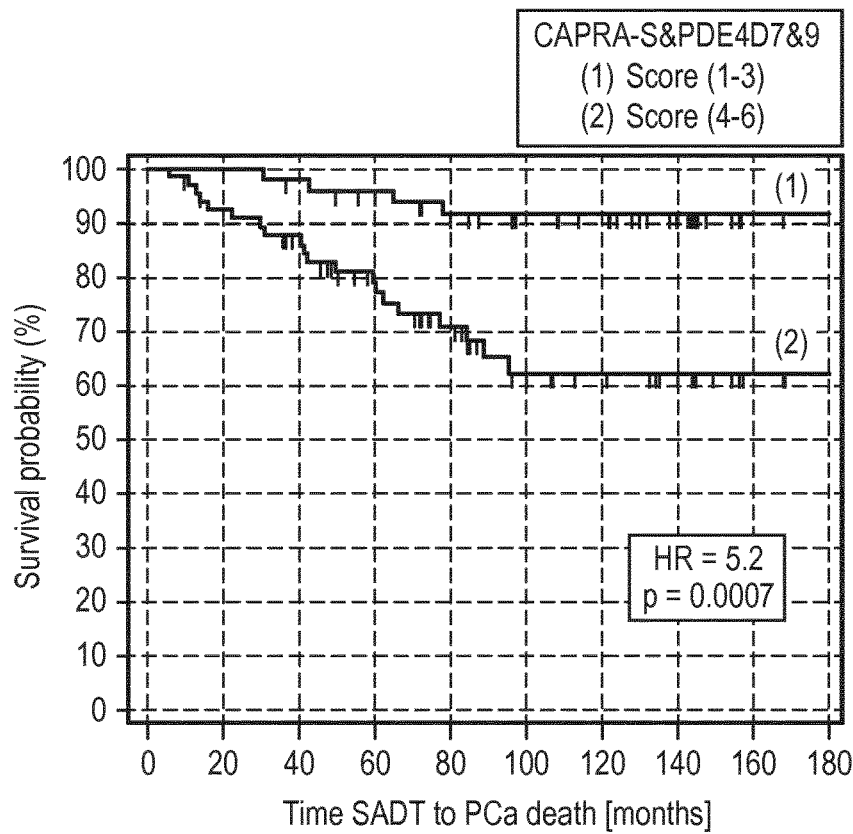
FIG. 24 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict prostate cancer specific death of a prostate cancer surgery cohort after salvage androgen deprivation therapy (SADT; n=118 patients; 20.3% events).

FIG. 24 shows a Kaplan Meier curve analysis of the post-surgical prognostic risk score based on the TMPRSS2-ERG fusion status dependent combination of the CAPRA-S score and the expression based risk score based on either PDE4D7 or PDE4D9 ("CAPRA-S&PDE4D7&9 score") to predict prostate cancer specific death of a prostate cancer surgery cohort after salvage androgen deprivation therapy (SADT; n=118 patients; 20.3% events). The CAPRA-S&PDE4D7&9 score was categorized into two groups: scores (1-3) vs. scores (4-6). The CAPRA-S&PDE4D7&9 score categories (1-3) vs. score categories (4-6) were correlated in Kaplan Meier to the PCSS (prostate cancer specific survival) progression free survival time after SADT of the patients, which is indicated in months. The log rank p-value was determined as $p=0.0007$, the hazard ratio was determined as HR=5.2. The following supplementary lists indicate the number of patients at risk for the CAPRA-S&PDE4D7&9 score category classes analyzed, i.e., the patients at risk at any time interval +20 months after surgery are shown: Score categories (1-3): 51, 51, 49, 45, 40, 32, 28, 20, 4, 3; Score categories (4-6): 67, 60, 53, 42, 30, 18, 15, 10, 2, 1.

FIGS. 15 to 20 demonstrate an increase in hazard ratio in patient groups with lower vs. higher risk of progression to the various tested clinical endpoints (BCR, metastases, prostate cancer death) when comparing the CAPRA-S score categories to the CAPRA-S&PDE4D7&9 score categories. FIGS. 21 to 24 show the increased hazard ratio equivalent to FIGS. 19 and 20 but now for men undergoing salvage radiation treatment (SRT) and/or salvage androgen deprivation therapy (SADT).

While the analyses shown in FIGS. 8 to 24 above are provided for the case where the post-surgical prognostic risk score is determined based on the TMPRSS2-ERG fusion status dependent combination of the CAPRA-S score and the expression based risk score based on either PDE4D7 or PDE4D9 ("CAPRA-S&PDE4D7&9 score"), comparable results are also obtained if the post-surgical prognostic risk score is determined based on the TMPRSS2-ERG fusion status dependent combination of the CAPRA-S score and the expression based risk score based on either PDE4D7 or PDE4D5 ("CAPRA-S&PDE4D7&5 score"), i.e., if in TABLE 3 a CAPRA-S&PDE4D5 combination score based on the CAPRA-S score and PDE4D5 is used instead of the CAPRA-S&PDE4D9 combination score if the TMPRSS2-ERG fusion status is negative.

While the TMPRSS2-ERG fusion status can be determined in a biological sample obtained from a subject e.g. by performing PCR on the biological sample, it is also possible to obtain this information e.g. from sequencing data using algorithms such as RNA-Seq.

Other variations to the disclosed realizations can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

One or more steps of the method illustrated in FIG. 1 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the one or more steps of the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 1, can be used to implement one or more steps of the method of risk stratification for therapy selection in a patient with prostate cancer is illustrated. As will be appreciated, while the steps of the method may all be computer implemented, in some embodiments one or more of the steps may be at least partially performed manually.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any reference signs in the claims should not be construed as limiting the scope.

The invention relates to a method of post-surgical risk stratification of a prostate cancer subject, comprising determining a transmembrane protease, serine 2-ETS-related gene (TMPRSS2-ERG) fusion status in a biological sample obtained from the subject, determining a gene expression profile for each of one or more phosphodiesterase 4D variants in a biological sample obtained from the subject, determining an expression based risk score for the subject based on the gene expression profile for a selected phosphodiesterase 4D variant, and determining a post-surgical prognostic risk score for the subject based on the expression based risk score and post-surgical clinical variables of the subject, wherein the selected phosphodiesterase 4D variant is selected depending on the TMPRSS2-ERG fusion status, wherein, if the TMPRSS2-ERG fusion status is positive, the selected phosphodiesterase 4D variant is selected to be a first phosphodiesterase 4D variant, and, if the TMPRSS2-ERG fusion status is negative, the selected phosphodiesterase 4D variant is selected to be a second phosphodiesterase 4D variant. This may allow for an improved stratification of the subject in a post-surgical setting that may result in better post-surgical, secondary treatment decisions. For instance, the post-surgical prognostic risk score may allow to make better recommendations on whether to select a specific post-surgical, secondary treatment for certain sub-populations of prostate cancer patients.

The Attached Sequence Listing, Entitled 2017PF02537_Sequence Listing_ST25 is Incorporated Herein by Reference, in its Entirety.

The invention claimed is:

1. A method of post-surgical risk stratification of a prostate cancer subject that has previously undergone prostate surgery, comprising:
   determining a transmembrane protease, serine 2-ETS-related gene (TMPRSS2-ERG) fusion status in a biological sample obtained from the prostate cancer subject, wherein the determined TMPRSS2-ERG fusion status is either positive or negative,
   determining, based on the determined TMPRSS2-ERG fusion status, a gene expression profile for a selected phosphodiesterase 4D variant in a biological sample obtained from the prostate cancer subject, wherein, when the determined TMPRSS2-ERG fusion status is positive the selected phosphodiesterase 4D variant is phosphodiesterase 4D variant 7 (PDE4D7), and when the TMPRSS2-ERG fusion status is negative the selected phosphodiesterase 4D variant is selected to be phosphodiesterase 4D variant 9 (PDE4D9),
   determining an expression based risk score for the prostate cancer subject based on the gene expression profile for the selected phosphodiesterase 4D variant,
   determining a post-surgical Cancer of the Prostate Risk Assessment (CAPRA-S) score for the prostate cancer subject, wherein the CAPRA-S score comprises the following post-surgical clinical variables of the prostate cancer subject: (i) a prostate-specific antigen (PSA) level; (ii) a pathologic Gleason score (pGS); (iii) surgical margins (SM); (iv) an extracapsular extension (ECE); (v) a seminal vesicle invasion (SVI); and (vi) a lymph node invasion (LNI),
   determining a post-surgical prognostic risk score for the prostate cancer subject based on a combination of: (i) the determined expression based risk score and (ii) the determined CAPRA-S score,
   stratifying, using the determined post-surgical prognostic risk score for the prostate cancer subject, the prostate cancer subject into a risk group comprising a high risk of disease and disease recurrence after primary treatment, and
   administering a post-surgical, secondary prostate cancer treatment to the prostate cancer subject stratified in the risk group, wherein the post-surgical, secondary treatment is selected from the group consisting of: radiation therapy, hormonal therapy, chemotherapy, immunotherapy, or any combination thereof.

2. The method of claim 1, wherein the CAPRA-S score is categorized, wherein depending on the category a number of points, preferably in the range from 1 to 3, are added in the post-surgical prognostic risk score.

3. The method of claim 1, wherein the expression based risk score is a value in a predefined range, wherein depending on the value a number of points, preferably in the range from 0 to 3, are added in the post-surgical prognostic risk score.

4. The method of claim 1, further comprising:
   normalizing the gene expression profile for the selected phosphodiesterase 4D variant with respect to one or more reference genes selected from the group consisting of: *Homo sapiens* hypoxanthine phosphoribosyltransferase 1 (HPRT1), Tubulin-Alpha-1b (TUBA1B), *Homo sapiens* pumilio RNA-Binding Family Member (MIM1), and *Homo sapiens* TATA box binding protein (TBP), wherein the expression based risk score is determined based on the normalized gene expression profile.

5. The method of claim 4, wherein the one or more reference genes comprise at least two, or at least three, or all of HPRT1, TUBAIB, PUM1, and TBP.

6. The method of claim 1, wherein the expression based risk score is determined with a scoring function, based on the gene expression profile for the selected phosphodiesterase 4D variant, the scoring function having been derived from gene expression profiles for biological samples of prostate cancer subjects.

7. The method of claim 4, wherein the determining of the gene expression profile for the selected phosphodiesterase 4D variant comprises performing RT-qPCR on RNA extracted from the biological sample, wherein a Cq value is determined for the selected phosphodiesterase 4D variant and for each of the one or more reference genes, and wherein the determining of the expression based risk score includes normalizing the Cq value for the selected phosphodiesterase 4D variant using the Cq value for each of the one or more reference genes and computing the expression based risk score as a linear function of the normalized Cq value.

8. A method of treating a prostate cancer subject that has previously undergone prostate surgery, comprising:
   (a) receiving a post-surgical prognostic risk score and stratified risk group for the prostate cancer subject, wherein the stratified risk group is a high-risk risk group comprising a high risk of disease and disease recurrence after primary treatment, and wherein the post-surgical prognostic risk score and stratified risk group are determined by:
   (1) determining a transmembrane protease, serine 2-ETS-related gene (TMPRSS2-ERG) fusion status in a biological sample obtained from the prostate cancer subject, wherein the determined TMPRSS2-ERG fusion status is either positive or negative;
   (2) determining, based on the determined TMPRSS2-ERG fusion status, a gene expression profile for a selected phosphodiesterase 4D variant in a biological sample obtained from the prostate cancer subject, wherein, when the determined TMPRSS2-ERG fusion status is positive the selected phosphodiesterase 4D variant is-phosphodiesterase 4D variant 7 (PDE4D7), and when the TMPRSS2-ERG fusion status is negative the selected phosphodiesterase 4D variant is selected to be phosphodiesterase 4D variant 9 (PDE4D9);

(3) determining an expression based risk score for the prostate cancer subject based on the gene expression profile for a selected phosphodiesterase 4D variant;

(4) determining a post-surgical Cancer of the Prostate Risk Assessment (CAPRA-S) score for the prostate cancer subject, wherein the CAPRA-S score comprises the following post-surgical clinical variables of the prostate cancer subject: (i) a prostate-specific antigen (PSA) level; (ii) a pathologic Gleason score (pGS); (iii) surgical margins (SM); (iv) an extracapsular extension (ECE); (v) a seminal vesicle invasion (SVI); and (vi) a lymph node invasion (LNI), (5) determining a post-surgical prognostic risk score for the prostate cancer subject based on a combination of: (i) the determined expression based risk score (ii) the determined CAPRA-S score; and post-surgical clinical variables of the prostate cancer subject, (6) stratifying, using the determined post-surgical prognostic risk score for the prostate cancer subject, the prostate cancer subject into the high-risk risk group when the determined post-surgical prognostic risk score for the prostate cancer subject is low; and (b) administering a post-surgical, secondary prostate cancer treatment to the prostate cancer subject since the prostate cancer subject is stratified in the high-risk risk group comprising a high risk of disease of disease recurrence after primary treatment, wherein the post-surgical, secondary prostate cancer treatment is selected from the group consisting of: radiation therapy, hormonal therapy, chemotherapy, immunotherapy or any combination thereof.

* * * * *